United States Patent [19]

Takatori et al.

[11] Patent Number: 5,553,196
[45] Date of Patent: Sep. 3, 1996

[54] METHOD FOR PROCESSING DATA USING A NEURAL NETWORK HAVING A NUMBER OF LAYERS EQUAL TO AN ABSTRACTION DEGREE OF THE PATTERN TO BE PROCESSED

[75] Inventors: Sunao Takatori; Ryohei Kumagai; Koji Matsumoto; Makoto Yamamoto, all of Tokyo, Japan

[73] Assignees: Yozan, Inc., Tokyo; Sharp Corporation, Osaka, both of Japan

[21] Appl. No.: 461,538

[22] Filed: Jun. 5, 1995

Related U.S. Application Data

[63] Continuation of Ser. No. 243,448, May 16, 1994, abandoned, which is a continuation of Ser. No. 721,822, Jun. 26, 1991, abandoned, which is a continuation-in-part of Ser. No. 504,809, Apr. 5, 1990, abandoned.

[30] Foreign Application Priority Data

| Apr. 5, 1989 | [JP] | Japan | 1-084783 |
| Apr. 28, 1989 | [JP] | Japan | 1-107150 |
| May 6, 1989 | [JP] | Japan | 1-112818 |
| May 6, 1989 | [JP] | Japan | 1-112819 |
| May 6, 1989 | [JP] | Japan | 1-112820 |
| May 6, 1989 | [JP] | Japan | 1-112821 |
| May 23, 1989 | [JP] | Japan | 1-127953 |
| May 16, 1989 | [JP] | Japan | 1-120249 |
| May 16, 1989 | [JP] | Japan | 1-120250 |
| May 16, 1989 | [JP] | Japan | 1-120251 |
| May 16, 1989 | [JP] | Japan | 1-120252 |
| May 16, 1989 | [JP] | Japan | 1-120253 |
| May 17, 1989 | [JP] | Japan | 1-121583 |

[51] Int. Cl.⁶ ................................................. G06F 15/18
[52] U.S. Cl. ........................ 395/24; 395/22; 395/23; 395/26; 395/27
[58] Field of Search .......................... 395/22, 23, 24, 395/26, 27

[56] References Cited

U.S. PATENT DOCUMENTS

| 3,287,649 | 9/1963 | Rosenblatt | 395/24 |
| 3,496,382 | 5/1967 | Hendrix | 395/24 |
| 3,602,888 | 12/1968 | Nishiyama | 395/24 |
| 4,805,225 | 2/1989 | Clark | 395/21 |
| 4,897,811 | 1/1990 | Scofield | 395/21 |
| 4,897,814 | 1/1990 | Clark | 395/27 |
| 4,914,603 | 4/1990 | Wood | 395/24 |
| 4,918,618 | 4/1990 | Tomlinson, Jr. | 395/23 |

(List continued on next page.)

OTHER PUBLICATIONS

Y. Le Cun, "Handwritten Digit Recognition", IEEE Communication Magazine, Nov. 1989.
D. J. Burr, "A Neural Network Digit Recognizer", Proceedings of the 1986 IEEE International Conference on Systems, Man, and Cybernetics, 1986, pp. 1621–1625.
S. Y. Kung, "Parallel Architectures for Artificial Neural Nets" Proceedings of the International Conference on Systolic Arrays, 1988, pp. 163–174.
Richard P. Lippmann, "An Introduction to Computing with Neural Nets", IEEE ASSP Magazine, Apr. 1987, pp. 4–22.
Philip D. Wasserman, "Neural Computing, Theory and Practice", 1989.
David E. Rumelham & James L. McClelland, "Parallel Distributed Processing", vol. 1, MIT Press, Cambridge, Mass.
Gail A. Carpenter, "Neural Network Models for Pattern Recognition and Associative Memory", Neural Networks, vol. 2, pp. 243–257, 1989.
Gonzalez et al, "Digital Image Processing" Addison–Wesley publishing company, 1987.

*Primary Examiner*—George B. Davis
*Attorney, Agent, or Firm*—Cushman, Darby & Cushman

[57] ABSTRACT

There is provided a layer construction of neural layers according to the abstraction degree of data to be processed, and data is inputted to a neural layer corresponding to its abstraction degree.

9 Claims, 27 Drawing Sheets

U.S. PATENT DOCUMENTS

| | | | |
|---|---|---|---|
| 4,933,872 | 6/1990 | Vanderburg et al. | 395/22 |
| 4,941,122 | 7/1990 | Weideman | 395/24 |
| 4,951,239 | 8/1990 | Andes et al. | 395/23 |
| 4,954,963 | 9/1990 | Penz et al. | 395/23 |
| 4,979,126 | 12/1990 | Pao et al. | 395/24 |
| 5,023,729 | 6/1991 | Kumagai | 358/457 |
| 5,040,230 | 8/1991 | Takatori et al. | 395/22 |
| 5,048,100 | 9/1991 | Kuperstein | 364/807 |
| 5,050,095 | 9/1991 | Samad | 395/23 |
| 5,146,549 | 9/1992 | Kumagai | 395/138 |
| 5,159,645 | 10/1992 | Kumagai | 382/22 |
| 5,195,171 | 3/1993 | Takatori et al. | 395/24 |
| 5,251,269 | 10/1993 | Körner et al. | 395/24 |

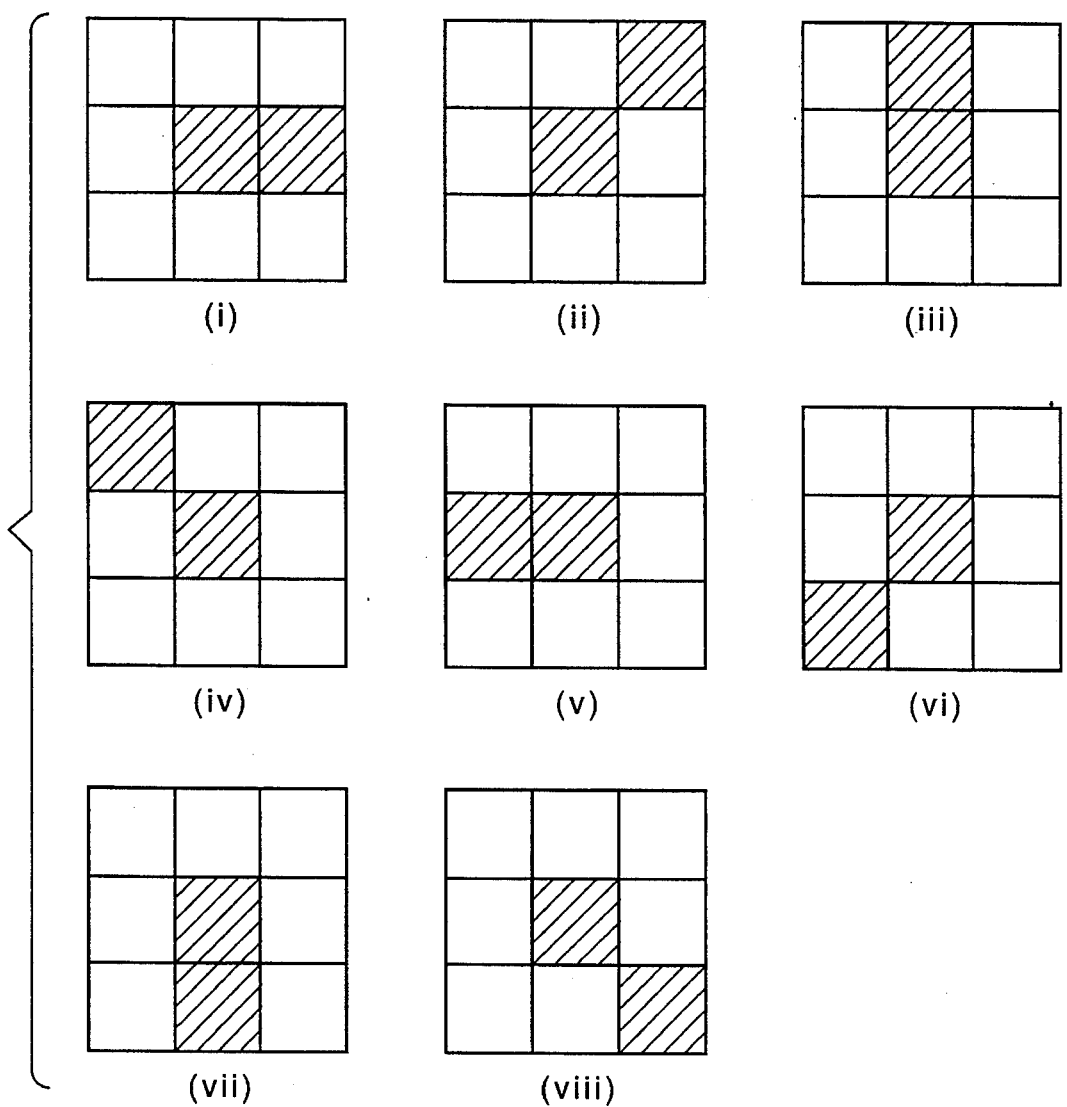

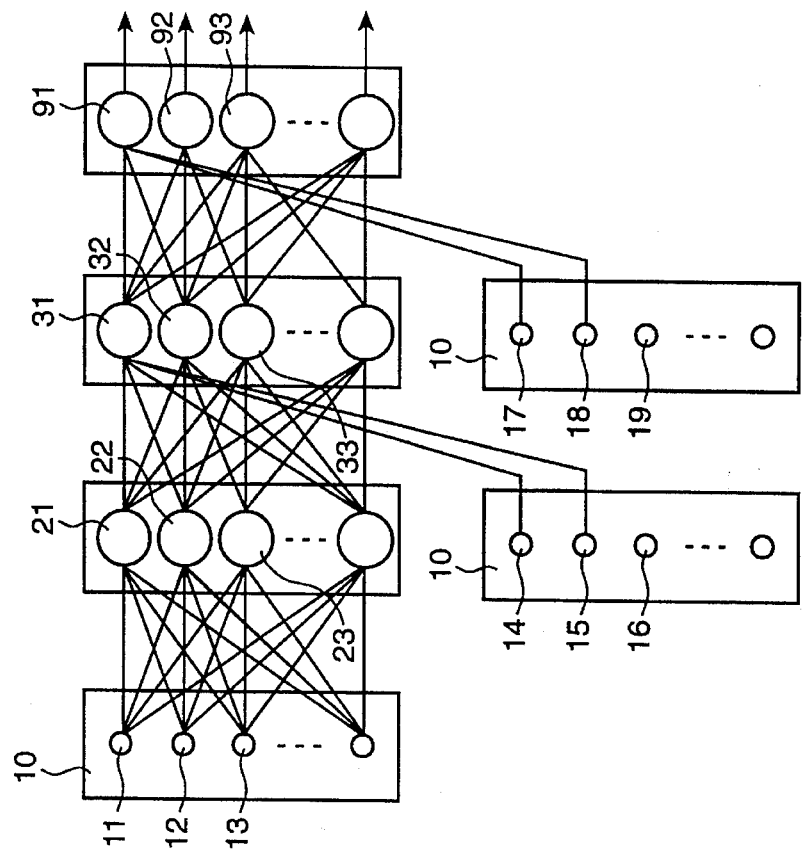
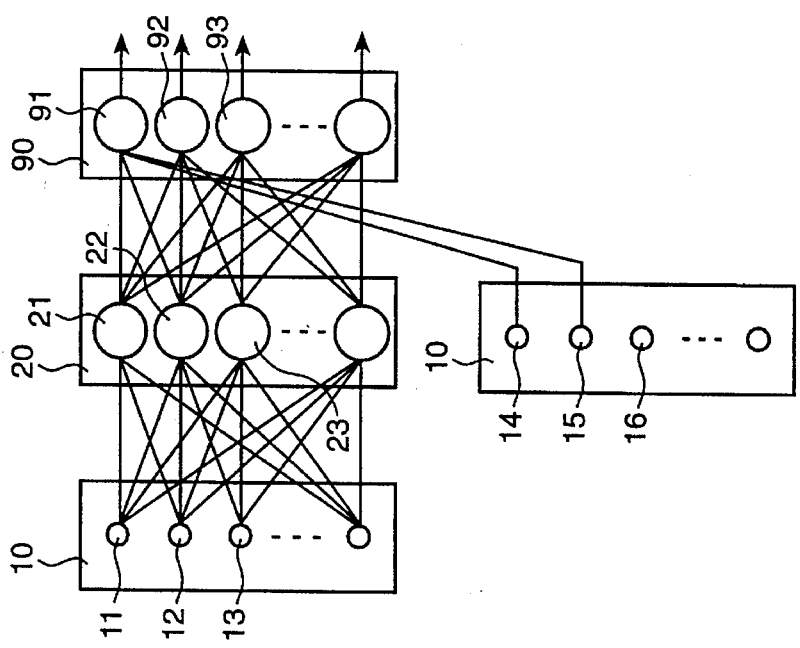

Fig. 37(a)
|   |   |   |   |   |   |
|---|---|---|---|---|---|
|   | 0 | 0 | 0 | 7 |   |
| 1 |   |   |   |   | 6 |
| 2 |   |   |   |   | 6 |
| 2 |   |   |   |   | 6 |
| 2 |   |   |   |   | 5 |
|   | 3 | 4 | 4 | 4 |   |
Fig. 37(b)
|   |   |   |   |   |   |
|---|---|---|---|---|---|
| 0 | 0 | 0 | 0 | 0 | 6 |
| 2 |   |   |   |   | 6 |
| 2 |   |   |   |   | 6 |
| 2 |   |   |   |   | 6 |
| 2 |   |   |   |   | 6 |
| 2 | 4 | 4 | 4 | 4 | 4 |
Fig. 38
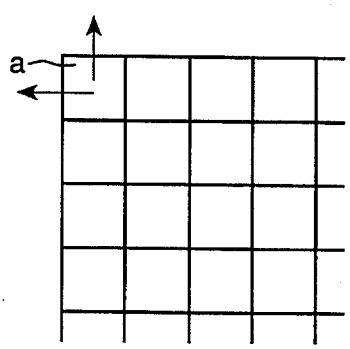
Fig. 39
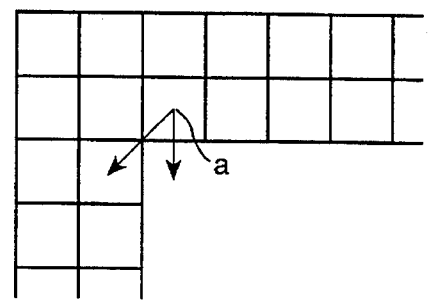

| QUADRANT | TOP POINTS OF CONVEX HULL | x-COORDINATE | y-COORDINATE | CHAIN CODE |
|---|---|---|---|---|
| I | ○ | $x_1$ | $y_1$ | $c_1$ |
| I | × | $x_2$ | $y_2$ | $c_2$ |
| ⋮ | ⋮ | ⋮ | ⋮ | ⋮ |
| II | ○ | $x_k$ | $y_k$ | $c_k$ |
| ⋮ | ⋮ | ⋮ | ⋮ | ⋮ |
| IV | ○ | $x_n$ | $y_n$ | $c_n$ |

*Fig. 54*
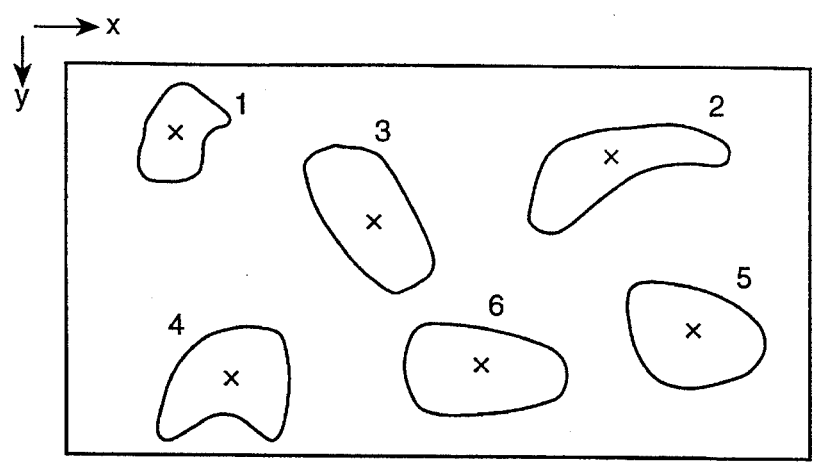
*Fig. 55*
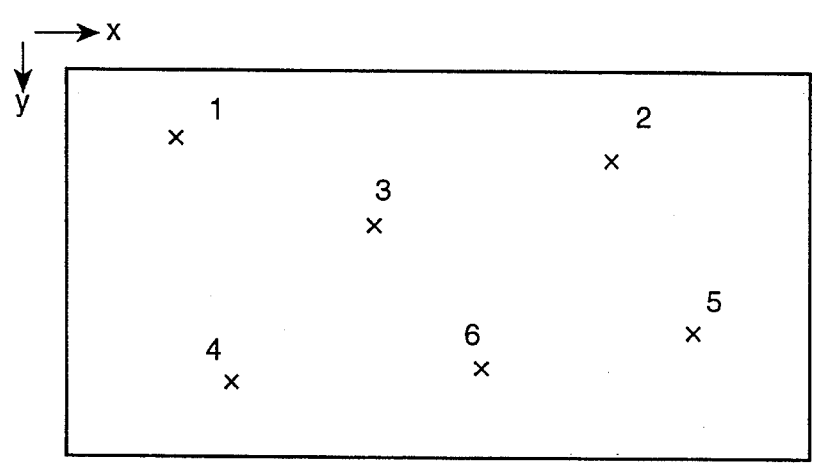
*Fig. 56*
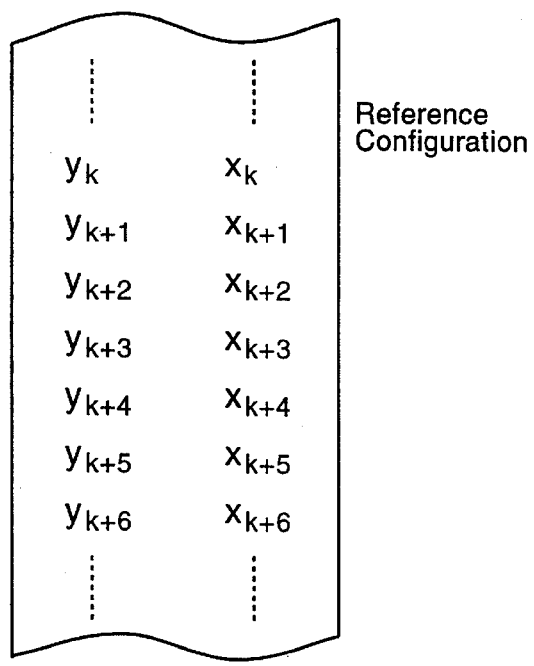
*Fig. 57*

METHOD FOR PROCESSING DATA USING A NEURAL NETWORK HAVING A NUMBER OF LAYERS EQUAL TO AN ABSTRACTION DEGREE OF THE PATTERN TO BE PROCESSED

This application is a continuation of application Ser. No. 08/243,448, filed on May 16, 1994, now abandoned which is a continuation of application Ser. No. 07/721,822 filed Jun. 26, 1991, now abandoned which is a CIP of application Ser. No. 07/504,809 filed Apr. 5, 1990, now abandoned.

BACKGROUND OF THE INVENTION

1. Field of the Invention

The present invention relates to a data processing system consisting of a neural network for configuration of voice recognition from data or voice.

2. Description of the Related Art

The neural network in this kind of data processing system consists of layers including neuron model (neuron, hereinafter) 1 in parallel, as shown in FIG. 3. In neuron 1, data DI1, DI2, DT3, ... DIn to be inputted to neuron 1 from the outside are multiplied by weights W1, W2, W3, ..., Wn, respectively. Data D0 is outputted corresponding to the comparison result between the sum of them and threshold "θ". There are various manners to compare them. One of them, for example, is settled that the output data D0 becomes "1" when the sum is equal or more than the threshold "θ" and the output data D0 becomes "0" when it is less then the threshold "θ".

A neural layer is constructed by arranging multiple neurons such as that shown in FIG. 4 in parallel. An input data for an image processing system comprising such neural layers is inputted to the first neural layer. The input data is a pixel data of a configuration.

It is difficult for such an image processing system to realize a practical system because numerous neurons are necessary to execute necessary recognition processing from all pixel data. It is separative theory from organism processing that pixel data itself is inputted to neural network.

Therefore, there has never been clarified the relationship between the data processing to be performed in a neural network and the capacity or construction of neural network. Accordingly, it has been unknown if constructed neural network achieve the expected performance until an experiment result is obtained.

DP matching method the most practical method for acoustic recognition, a successful result is reported of recognition ratio of 85%.

In DP matching, characteristics of frequency and power are extracted, then a pattern matching is performed between reference phonetic pattern and inputted data, for recognition. (Processes referred to here as "characteristic extraction" are also referred to as "feature extraction.") The rule for the pattern matching must be determined according to a plurality of sampling data. It causes a limitation of recognition facility.

The present invention is invented so as to solve the above problems and has an object to provide an image recognition system possible to process various kinds of characteristic variable in high recognition ratio.

SUMMARY OF THE INVENTION

Data processing system according to the present invention comprises a characteristics output means for outputting the characteristics of input data and plurality of neurons parallelly arranged as well as connected to the output means, each of the neurons multiplies the output from the output means by weights and compare a summation of the multiplication result with a threshold in order to output a data according to the comparison. The neurons are arranged as a plurality of neural layers in response to an abstraction ratio of the characteristics.

A recognition portion with neurons of number as little as possible performs recognition processing in high speed exactly with a little memory.

BRIEF DESCRIPTION OF THE DRAWINGS

FIG. 7(a) shows 3×3 convolution for an image processing.

FIG. 7(b) shows pixels' density.

FIG. 8(a) shows the third embodiment of a neural network.

FIG. 8(b) shows the fourth embodiment of the neural network.

FIGS. 37(a) and 37(b) show a process of an inner peripheral.

FIG. 38 shows a process of giving chain codes to an outer peripheral.

FIG. 39 shows a process of giving chain codes to an inner peripheral.

FIG. 54 shows an example of a configuration to be processed.

FIG. 55 shows centroids of a configuration in FIG. 54.

FIG. 56 shows a table of coordinates of centroids.

FIG. 57 partially shows the table in FIG. 56 in detail.

DETAILED DESCRIPTION OF THE PREFERRED EMBODIMENTS

Hereinafter, the present invention is described below with referring to the attached drawings.

Figure 1:
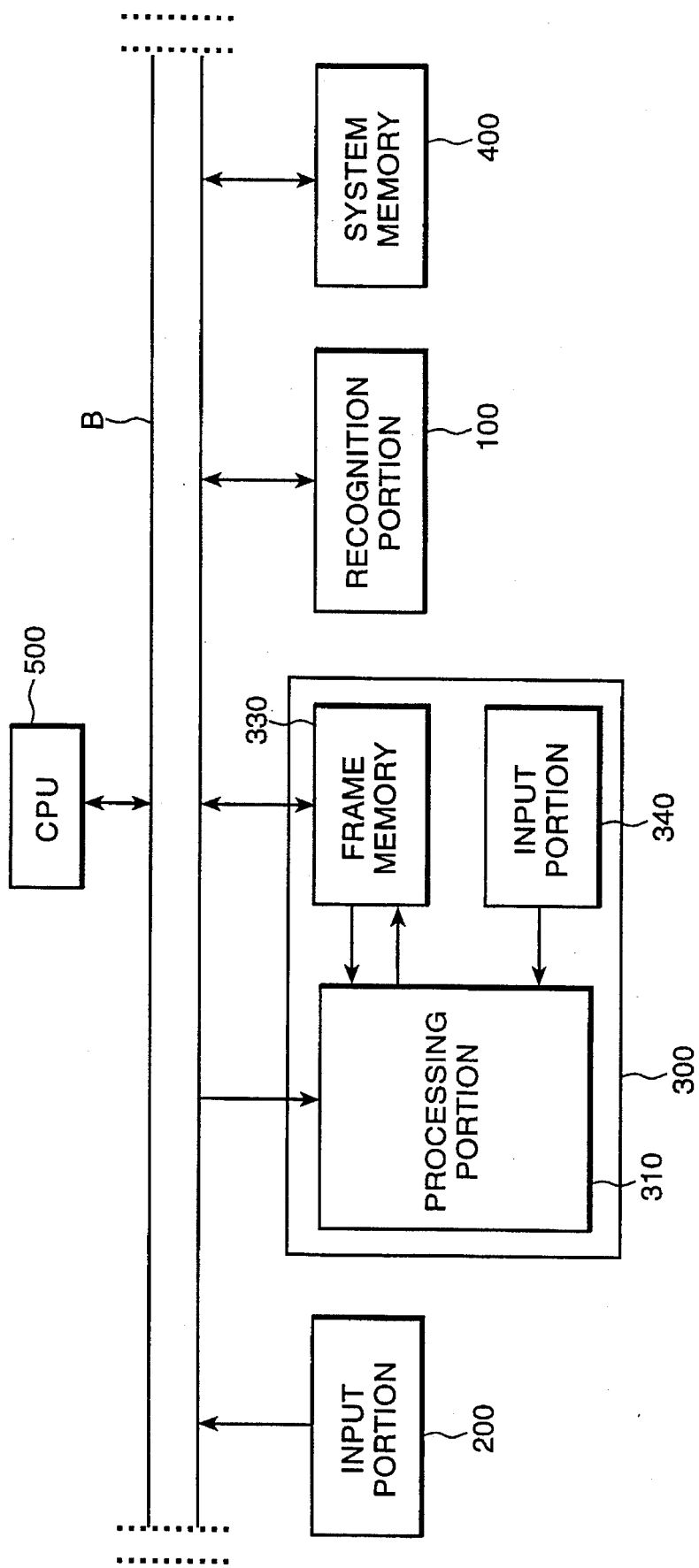
FIG. 1 is a block diagram of an image processing system in which an embodiment of the present invention is applied.

FIG. 1 shows an image processing system as a data processing system for an image data.

Figure 2:
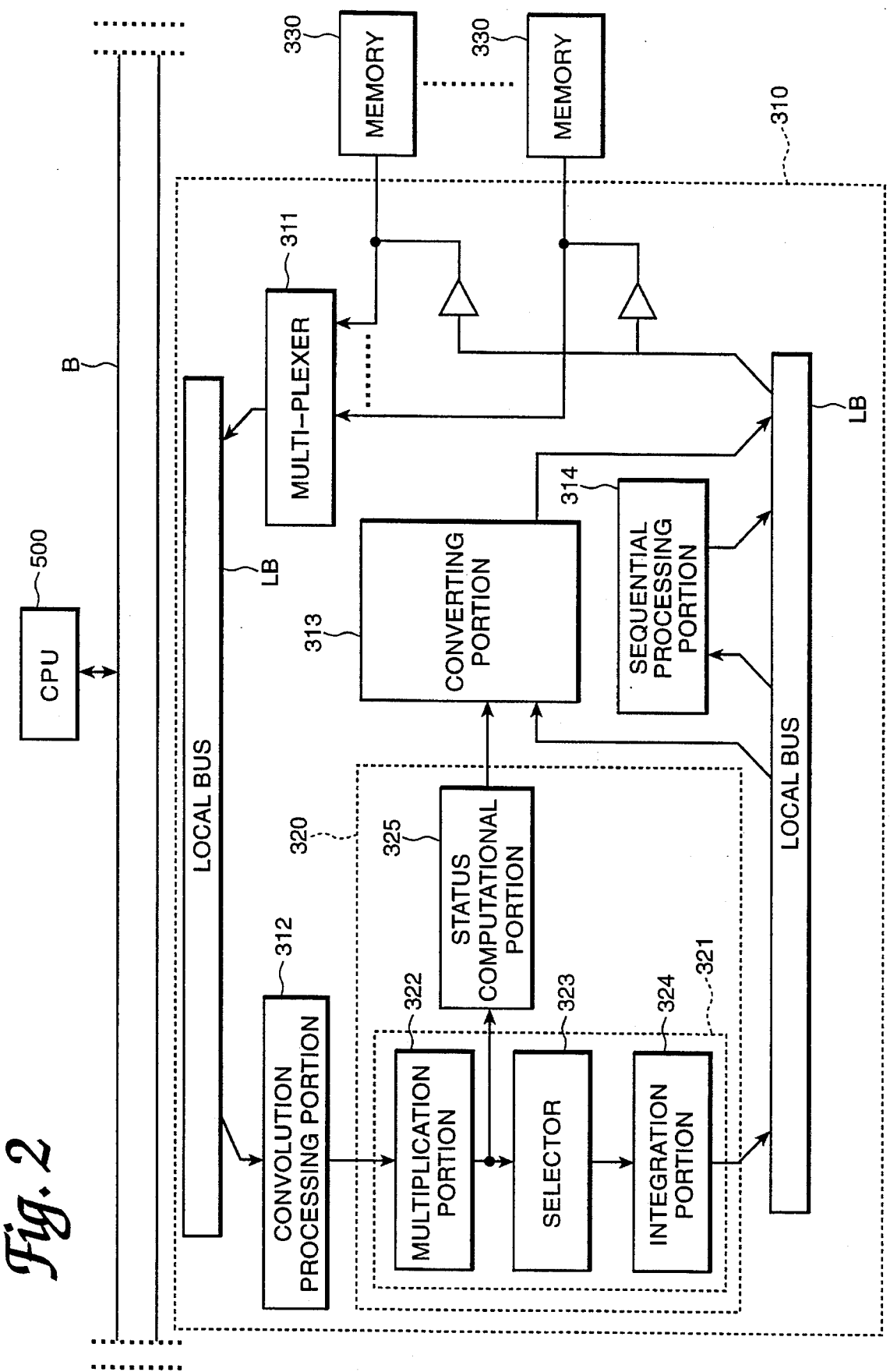
FIG. 2 is a block diagram of characteristics processing portion.

The image processing system consists of image input portion 200, an image processing portion 300 and a recognition portion 100, which are connected through system bus with one another as well as with a CPU 500. The image input portion includes input apparatus, such as in image scanner, and an I/O. The I/O includes a data compression means and a data holding means, if desired. Image processing portion 300 consists of processing portion 310 for characteristics extraction portion and a frame memory 330 for holding an image. An image input portion 340 is provided therein, if desired. The recognition portion 100 performed image recognition according to extracted data by the image processing portion 300. A plurality of neural layers are constructed. The output of the neural layer is held in a memory. FIG. 2 shows the processing portion 310 which transmits data, selectively passed through a multiplexer 311 from the frame memory 330, through a local bus LB to a convolution processing portion 312. The convolution processing portion holds data in a area of a predetermined size, for example 3×3. The held data are output parallelly to the computational portion 320. The computational portion consists of a numerical computational portion 321 and status computational portion 325. The output of convolution processing portion is inputted to the numerical portion 321. The portion 321 has multiplication portion 322, selector 323 and integration portion 324, which are connected successively. Differential and other operator processing are performed in the numerical portion 321. The portion performs multiplication of densities of each pixel by weights and integration of the multiplication result. Weights with different absolute values are not multiplied to the same pixel data, according to experience of the inventor. Therefore, the number of kernels of multiplication is minimized. The number of selectors and gates following the kernels is also minimized. The numerical portion has highest performance with minimum size of circuit. Data in the numerical portion 321 is transmitted to the status computational portion 325. The portion 325 performs the following processes for judgment.

I) Judgment whether the center pixel is to be processed or not.

II) Judgment whether there is a pixel in 8-neighborhood different in density from the center pixel.

III) Judgment which of pixels in 8-neighborhood is equal to or different from the center pixel.

IV) Number of TFDE for calculating Euler number.

V) Identification ratio in comparison with a predetermined pattern.

VI) Others.

The status computation is performed simultaneously with and independently from the numerical computation. The both circuits are efficiently constructed and improved in process speed. The output of the status computational portion is itself a important characteristics data.

The converting portion 313 consists of a static RAM and a light computational portion such as full adder connected to a branch of an output of the RAM. The output of the light computational portion is fed back to an data input of the RAM. The converting portion performs repeatedly the same calculation for the same data, accumulation, successive comparison and other complex calculation by a small circuit.

The output of computational portion 320 and converting portion 313 are returned through the local bus for output to one of the frame memory.

A sequential processing portion 314 is connected to the local bus for labeling, thinning and other sequential processing. The sequential processing portion consists of a line memory, ratch and logical portion. Pixels on the previous scan line to the objective scan line can be reviewed.

such a processing portion, various characteristics values can be calculated in high speed and they can be supplied to recognition portion 100 as important data. When dual port memory is applied as frame memory 330, data can be read out or written in high speed.

Figure 3:
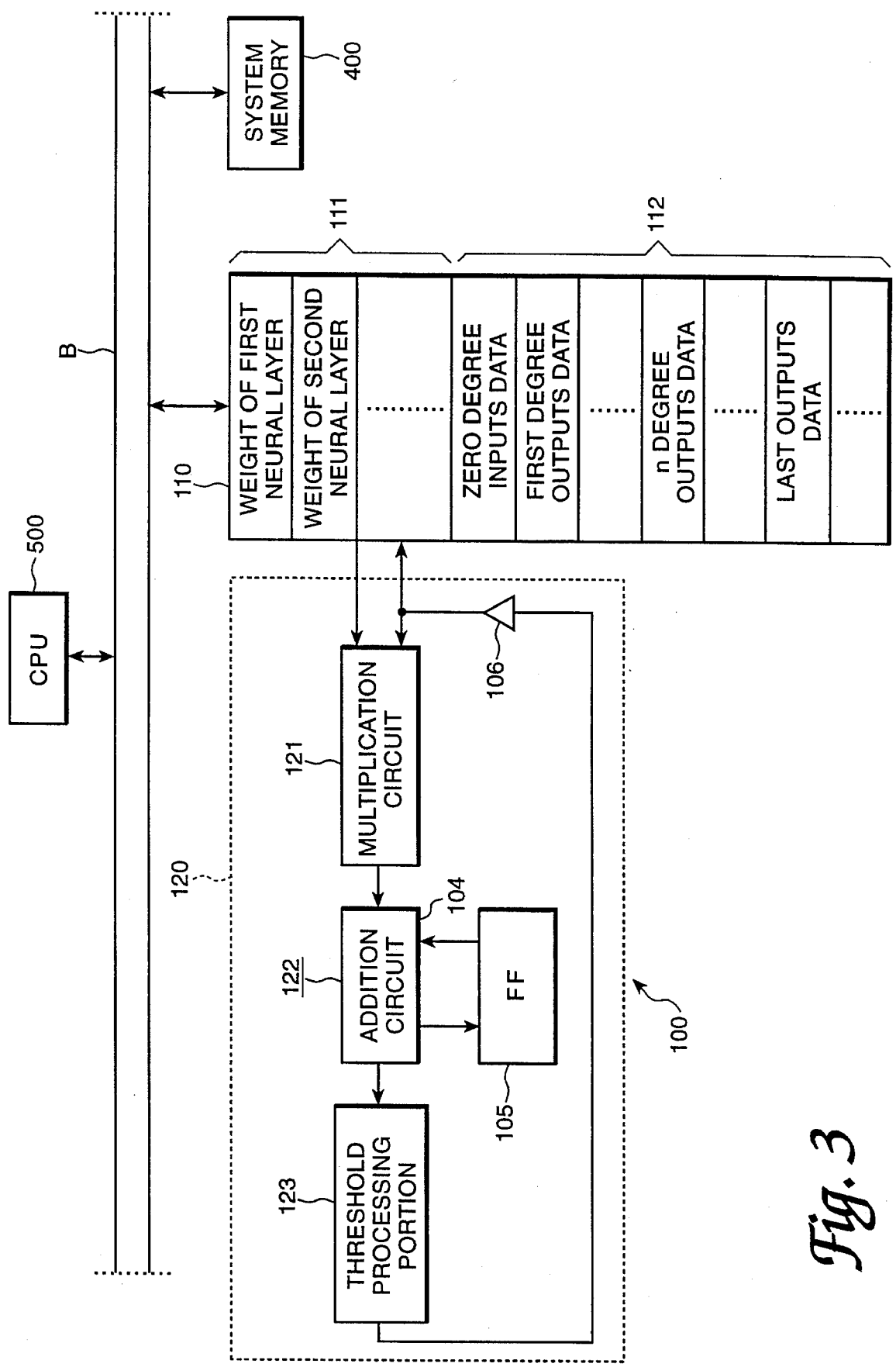
FIG. 3 is a block diagram of recognition portion.

Recognition portion 100 is described referring to FIG. 3.

Recognition portion 100 outputs the process result to data memory 110 as the final output data through system bus B, or by processing the inputted data from input system connected to recognition portion 100, that is, from image processing portion 300.

Figure 4:
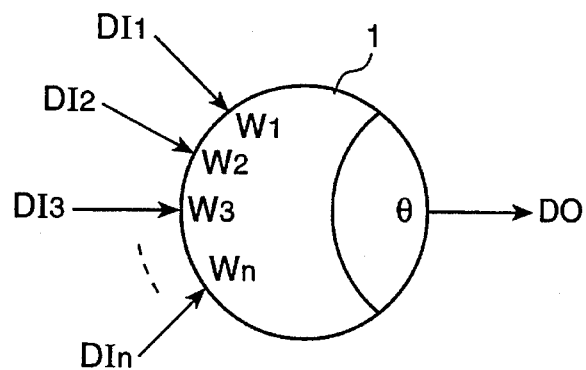
FIG. 4 is a schematic diagram of a neuron of general type.
Figure 5:
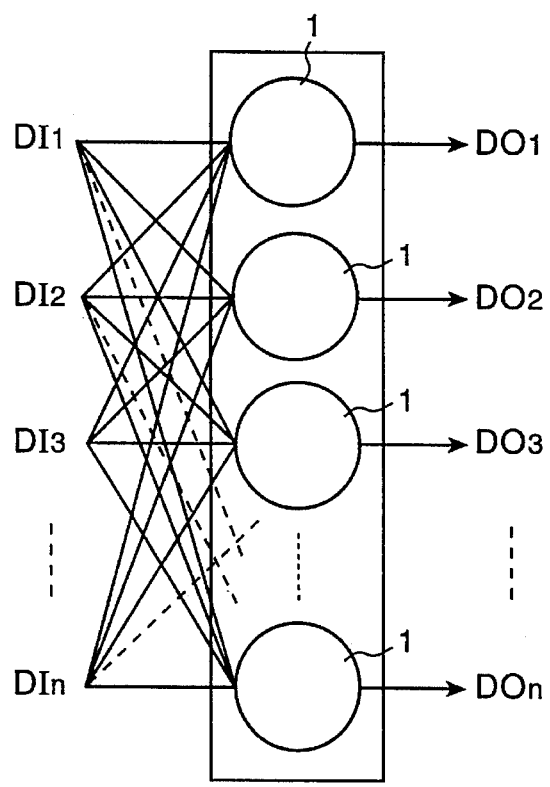
FIG. 5 is a schematic diagram of a neural layer.

A neural network is structured in recognition portion 100. Describing briefly a neural network, it is structured by layers by settling neuron 1 in FIG. 4 parallelly as in FIG. 5 and is also connected to neurons in other layers or in the same layer. "Neuron 1" s send and receive data by connecting each other: the last output data can be obtained from the neuron in the last step of layer. As to data processing in neuron 1, data DI1, DI2, DI3 ... DIn are multiplied by W1, W2, W3 ... Wn, respectively, and the total sum of them and threshold are compared.

Various method can be applied for the comparison method. For example, it is settled that output data DO is "1" when the sum is more than θ and DO is "0" when the sum is less than θ. It is expressed as formula (1), where "f" is normalized function.

$$DO = f\{(\Sigma(W_i \times DI_i) - \theta\} \quad (1)$$

Recognition portion 100 comprises an output data generating portion 120 which performs association of neural network. The computation of linear-threshold-function ($\Sigma W_i A_i - \theta$) of each neuron is performed in output data generating portion 120. Each portion in output data generating portion 120 is controlled by CPU 500.

The multiplication of $W_i A_i$ is executed in multiplication circuit 121 in output data generating portion 120. Each computation result of $W_i A_i$ is inputted to accumulation circuit 122, successively, and $\Sigma W_i A_i$ is performed.

Accumulated circuit 122 consists of an addition circuit 104 and flip-flop 105 which is connected to the circuit 104 for constructing a feed-back line of the circuit 104. Once an addition result is held in flip-flop 105, accumulation is performed by adding the next input of $W_i A_i$ to the addition result held. The computation result of $\Sigma W_i A_i$ is inputted to threshold processing portion 123, which performs a computation ($\Sigma W_i A_i - \theta$). Normalizing of the computation result of ($\Sigma W_i A_i - \theta$) and others are performed in the portion 123. And the final data is outputted from the portion 123 through buffer 106 to the memory 110.

Multiplication circuit 121 has two input lines for parallelly inputting weight data, and input or output data. Buffer 106 is connected to one of the input lines, which used as bi-directional line for inputting as well as outputting. Buffer 106 has high impedance when data is transmitted from data memory 110 to multiplication circuit 121.

For the first neural layer, input data of abstraction degree of "0" as well as weights thereof are given. For the second neural layer, input data of degree of "1" and weights thereof are given. The output of the n-th neural layer, that is n-th output data, becomes the input of the (n+1)th neural layer. In data memory 110, weight data are stored in synapse weight area 111 and input and output data are stored in input and output data area 112. The threshold of each neuron to be settled in the threshold processing portion 123 is stored in data memory 110 or system memory 101 and transmitted to threshold processing portion 123 before beginning the computation of each neuron.

Here, an embodiment to output thinning data of a configuration is described as an output of processing portion 310.

Thinning is the processing to convert a configuration into a curved line with the width of one pixel, which is considered to be effective method to recognize a configuration. But at the present, it is not used practically: the study for classifying profiles of cars is the only one to advance it. Generally, it takes time to perform thinning. Some processing method generates break line or needless line.

Thinning configuration in image processing portion 300 is explained below.

When an independent point of one pixel or a line with width of one pixel is exist, their characteristics are disappeared by deleting them to perform thinning. When an end point of the line is deleted, other pixels are deleted sequentially and all pixels of the line are deleted at last: it means that the characteristics of the image are disappeared. Therefore, the independent points and the end points should not be deleted.

When two or more configurations are connected by one pixel, the topology of the image is changed if the connecting pixel is deleted. The connection condition is evaluated by 8-connectedness and the number of connectedness of the pixel connecting two or more configurations is two or more. Therefore, the pixel should not be deleted unless the number of connectedness is 1.

Figure 18:
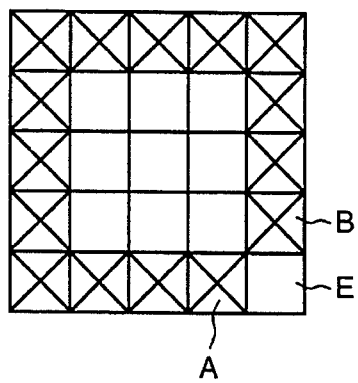
FIG. 18 and 19 show a thin tail generated through an image processing.
Figure 19:
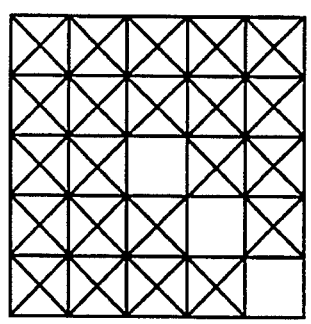

FIG. 18 shows a square processed one time for thinning. When a square with predetermined pixel value ("1", for example) exists, the process of thinning is: (1) the pixel value of boundary pixels (marked by "X" in the figure) are changed into the value of peripheral pixels ("0", for example), (2) the value of the next boundary pixels are changed into "0" from "1" by one scan sequentially. When the scan line advances rightward and generated after upper scan lines, the lower right boundary pixels of the square, that is, the pixel finally scanned of a configuration becomes end point after other boundary pixels have already processed and it cannot be deleted. Therefore, if the two pixels to the upper left of the pixel also remained a needless line extending down and rightward is generated as in FIG. 19. For preventing the above needless line, the present invention applies parallel processing for end point judgment. Parallel processing means that in one scan the pixels whose pixel values are changed in the scan are recognized as they do not change yet. In FIG. 18, the pixels whose values are changed and marked "X" are not changed, yet, the upper and left pixels of pixel "E" that is pixel "A" and "B" are recognized to exist and "E" is not end point. Then the pixel "E" is changed to background pixel by the first scan, and the upper left pixel is changed to background pixel by the next scan. It means that the needless line is prevented.

Sequential processing contrasts parallel processing. In this processing, pixels whose pixel values changed are evaluated by the densities given by the processing.

The parallel processing for end point has a disadvantage. A line parallel or perpendicular to the scan line with width of two pixels, as in FIG. 20, is deleted by parallel processing above.

Figure 20:
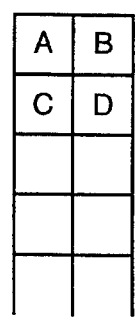
FIG. 20 shows a vertical line with a width of two pixels.

In FIG. 20, the upper left point "A" of the line perpendicular to the scan line with a width of two pixels is not the independent or end point and has number of connectedness of "1", as well as it is boundary pixel. The pixel value of pixel "A" is changed into the pixel value of the peripheral pixel ("0", for example). The right neighbor "B" of pixel "A" is deleted because pixel "A" is deemed to remain in the parallel processing and the processing for the end point is performed: unless pixel "A" does not exist, it is remains as an end point. The next processing for pixel "C" and "D" on the second step, advanced one scan to the parallel direction of scan line is as follows. First, pixel "C" is deleted because of the boundary pixel. Next, pixel "D" is also deleted because pixel "D" is judged if it is a boundary pixel or not, regarding as pixels "A", "B" and "C" exist. The line perpendicular to the scan line with the width of two pixels is at last deleted in this way. Such a problem occurs in the same way to the line with two pixels parallel to the scan line. Rules for processing a two pixel line parallel to perpendicular to the scan line are proposed by the present invention to prevent such disappearance, as follows.

Figure 21:
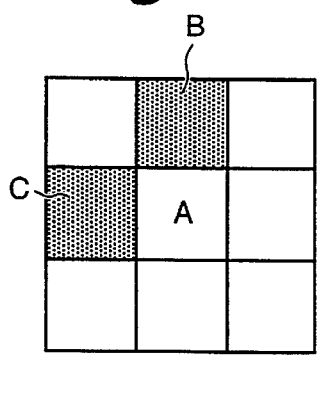
FIG. 21 shows the first judgment condition for an area of 3×3.
Figure 22:
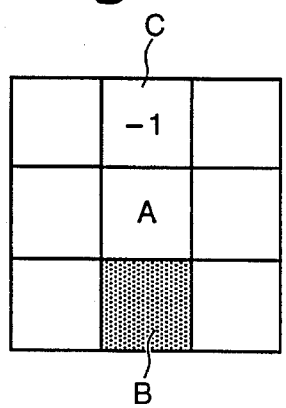
FIG. 22, 23, 24 and 25 show from the second to the fifth judgment conditions.
Figure 23:
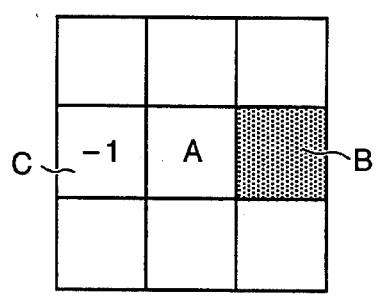
Figure 24:
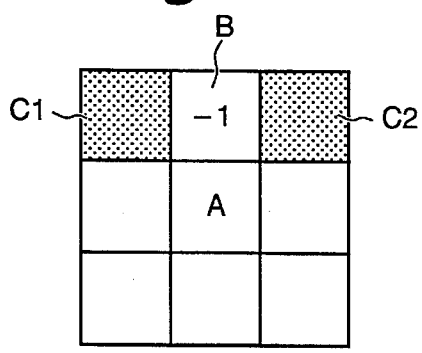
Figure 25:
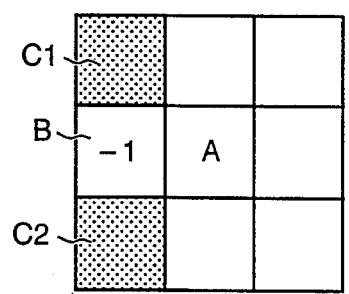

- a-i) When the upper and left neighbor of the center pixel A are background pixels ("0", for example), pixels A to be processed is given an index density. The index density is a density different from the density to be given to a pixel in a configuration or background. The index density may be "−1" for example, as shown in FIG. 21.
- a-ii) When pixel A in FIG. 22 is not processed by the rule a-i), the pixel is processed so that the pixel remains when the upper neighbor C is an indexed pixel and the lower neighbor B is a background pixel in the meaning of sequential processing.
- a-iii) When pixel A in FIG. 23 is not processed by the rules a-i), pixel A is processed to as to remain when the left neighbor C is an indexed pixel and the right neighbor B is a background pixel in the meaning of sequential processing.
- a-iv) When pixel A in FIG. 24 is not processed by neither the rules a-i) to a-iii), pixel A is processed so as to be given an index density when the upper neighbor B is an indexed pixel in the meaning of sequential processing and both of the right and left neighbors C1 and C2 are background pixels in the meaning of sequential processing.
- a-v) When pixel A in FIG. 25 is not processed by neither of the rules from a-i) to a-iii), pixel A is processed so as to be given an index density when the left neighbor B is indexed pixel in the meaning of sequential processing and both of the upper and lower neighbors C1 and C2 are background pixels in the meaning of sequential processing.

The pixel given the indexed density in one process cycle is changed to background pixel in the next process cycle.

The above rules from a-i) to a-v) are applicable for the case that a scan line advances rightward and is generated after upper scan line.

The rules are generalized for any manners of scan lines, as described in b-i) to b-v).

- b-i) When a pixel to which the current pixel follows along the scan line is a background pixel or an indexed pixel, in the meaning of parallel processing, as well as, when a pixel on the previous scan line and positioned corresponding to the current pixel is a background pixel or an indexed pixel in the meaning of parallel processing, the current pixel is given an index density.
- b-ii) When the current pixel is not processed according to the rule b-i), when the pixel on the previous scan line and positioned corresponding to the current pixel is an indexed pixel in the meaning of the sequential processing, as well as when the pixel on the following scan line and positioned corresponding to the current pixel is a background pixel in the meaning of sequential processing, the current pixel remain as it is.
- b-iii) When the current pixel is not processed according to the rules b-i), when the pixel which the current fixed follows is an indexed pixel in the meaning of sequential processing, as well as, when the pixel following the current pixel is a background pixel, the current pixel remains as it is.
- b-iv) When the current pixel is not processed according to the rules b-i), b-ii) or b-iii), when the pixel on the previous scan line and positioned corresponding to the current pixel is an indexed pixel in the meaning of sequential processing, as well as, when the pixel to which the current pixel follows and the pixel following to the current pixel along the previous scan line are background pixels, the current pixel is given a index density.
- b-v) When the current pixel is not processed according to the rules b-i), b-ii) and b-iii), when the pixel to which the current pixel follows is an indexed pixel along the scan line in the meaning of sequential processing, as well as, when the pixel on the previous and the following scan lines and positioned corresponding to the pixel which the current pixel follows are background pixels, the current pixel is given an index density.

The processing according to the rules a-i) to a-v) are described, hereinafter, referring to FIGS. 26 to 28.

Figures 26A, 26B, 27A, 27B, 28A, 28B:
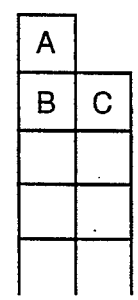
FIG. 26(a) shows the process result of the vertical line with the width of two pixels.
FIG. 26(b) shows the process result of the horizontal line with the width of two pixels.
FIG. 27(a) shows a configuration of a 2-pixels' vertical line added one pixel.
FIG. 27(b) shows a configuration of 2-pixels' horizontal line added one pixel.
FIG. 28(a) shows a process result of the configuration of FIG. 27(a).
FIG. 28(b) shows a process result of the configuration of FIG. 27(b).

The configuration in FIG. 26(a) is a two pixels vertical line and is to be processed by the rules a-i) and a-iii). First, the upper left end pixel is processed to be given an index density, such as "−1" according to the rule a-i) The right neighbor of the first pixel is processed to be maintained as it is, according to the rule a-iii). Therefore, the vertical two pixels line is processed in thinning to be a one pixel line consisting of the right side pixels except for the bottom pixel.

The configuration in FIG. 26(b) is a two pixels horizontal line and is to be processed by the rules a-i) and a-ii). First, the upper left end pixel is processed to be given an index density, such as "−1" according to the rule a-i) The pixels on the upper line are deleted except for the left end pixel above. On the lower line, the left end pixel remains as it is according to the rule a-ii), such as "1". The pixels other than the left end pixel are remained as they are. Therefore, the pixels on the lower line are remained except for the right end pixel.

The configuration in FIG. 27(a) consists of a two pixels vertical line and a pixel A attached from upward to the upper left end pixel of the two pixel line. It is corresponding to the conditions a-i) and a-iv). The configuration added a pixel right side is processed in the same way.

If a conventional end point judgment rule is applied to this configuration, the density of pixel a is changed to that of background pixels because it is not an end point having lower neighbors B and C. On processing the two pixels line, the density of the left end pixel B is changed to that of background pixels because the upper neighbor A is deemed to exist. Finally the total configuration is deleted.

For prevent this deletion, pixel A is given an index density according to the rule a-i), the pixel B is also given the index density according to the rule a-iv). By this processing, the configuration is processed to be a one pixel line consisting of right side pixels except for the right bottom pixel.

A configuration consisting of a two pixels vertical line and a pixel attached from upward to the upper right end pixel of the line can be processed similarly to the above.

The configuration of FIG. 27(b) consists of a horizontal two pixels line and one pixel a attached from leftward to the upper left end pixel of the line. It is corresponding to the condition a-i) and a-v). The configuration added a pixel on the lower side is processed in the same way. If a conventional end point judgment rule is applied to this configuration, the density of pixel A is changed to that of background pixels because it is not an end point, having right neighbors B and C. On processing the two pixels line, the density of the pixel B is changed to that of background pixels because the left neighbor "A" is deemed to exist. Then the density of the total pixels on the upper line are changed to that of background pixels. As for the lower line, the left end pixel C is deleted because the upper left neighbor A is deemed to exist. Then the density of the total pixels on the lower line are changed to that of background pixel. So the two pixels line is at last completely deleted.

For prevent this deletion, the pixel A is given a index density according to the rule a-i), as shown in FIG. 28(b). The pixel B is also given an index density according to the rule a-v). Therefore, the configuration is processed in thinning to be a configuration consisting of lower one pixel line except for the right end pixel.

As mentioned above, since a two pixels line is thinned to be one pixel line without generating needless line, the thinning performance is excellent. The process speed is high because one boundary layer is processed in one process cycle.

In the embodiment above, the processing is described for a configuration with one density different from that of background pixels in an image. When it is applied to a configuration with many kinds of density values—a configuration with labeling numbers in every group, for example—, it is of course performed in the same way by regarding each labeling number as the density of pixel to be processed and performing thinning in the same way to each group or to only the groups with necessary labeling numbers. Image processing portion 300 outputs in high speed such clear thinned data. It takes the processing time of half of the maximal width of an original configuration multiplied scanning time. When an image with 512×512 pixels is processed 40 msec per 1 pixel, the processing time takes about 0.1 sec if the maximal width is 20 pixels. As the thinned configuration is high-quality condensed data of the configuration topology, a recognition processing can be performed with the minimal number of neurons in recognition portion 100. Various data can be considered to give a recognition portion, as the pixels themselves after thinning, the coordinates and the number of the end points and the branch points, the number of branch, the number of loops, curvature, inflection points, vectorized thinned pixels, etc.

Described below is a neural network to recognize a configuration based on thinned data.

A neural network is settled in recognition portion 100 in FIG. 1, which has layers according to the abstraction degree of thinned data as described later.

Though the processing to be executed in a neural network is very complicated, the first embodiment of the neural network in the present invention and the first principal idea are explained assuming simple logical computation is performed.

Figure 6A:
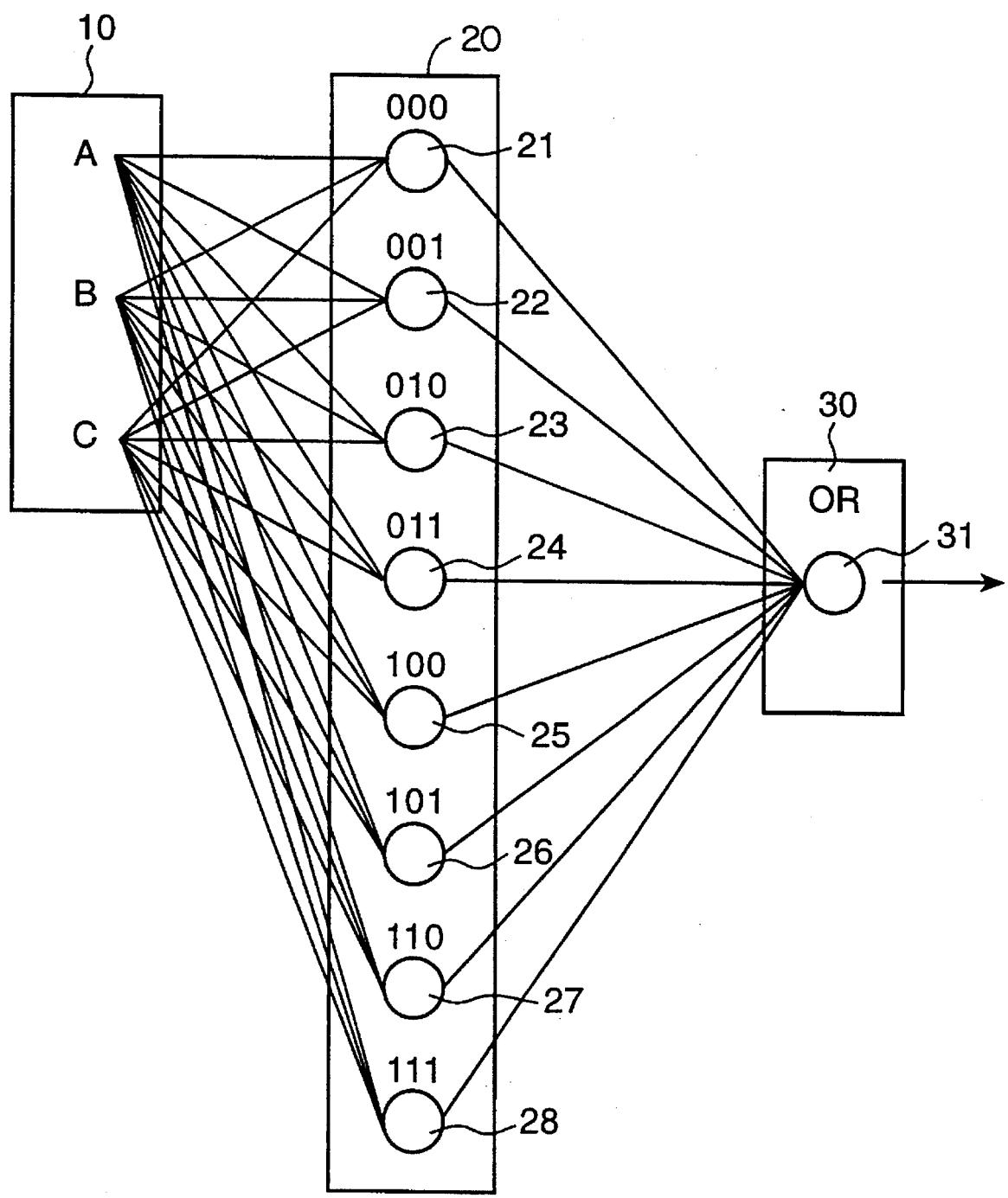
FIG. 6(a) shows a comparative embodiment.
Figure 6B:
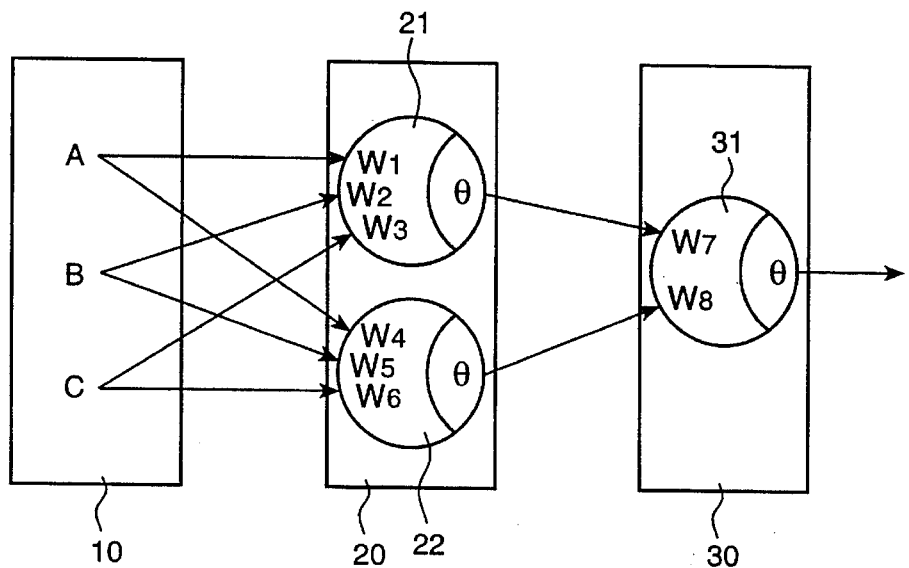
FIG. 6(b) shows another comparative embodiment.
Figure 6C:
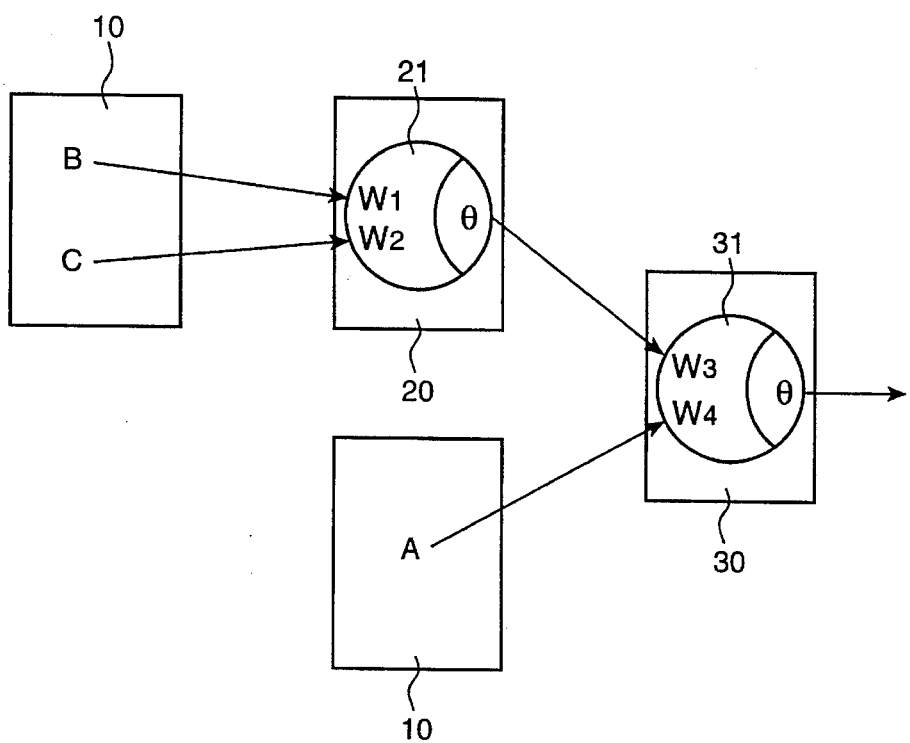
FIG. 6(c) shows the first embodiment of a neural network according to the present invention.

FIGS. 6(a)–6(c) show a neural network which performs the logic computation of (10).

$$A \times (B+C) \qquad (2)$$

FIGS. 6(a) and (b) show comparative embodiments and FIG. 6(c) shows the first embodiment of a neural network. The eight neurons from 21 to 28 are located in the first neural layer 20. The number is the same as the number of combinations of A, B and C in the data group 10, that is, $2^3$.

Neuron 31 performs a logical OR (logic sum) on the outputs from 21 to 28 of the first neural layer 20. Neuron 31 is located in the second neural layer 30. Data such as "000" is generated as bit patterns by neurons A, B and C. These neurons output "1" when bit patterns shown for each neuron are inputted.

In the present data processing system, the number of neurons is 9 and number of synapses is 32: neurons and synapses work inefficiently and increased memory capacity is required. Furthermore, processing time is increased necessarily.

FIG. 6(b) corresponds an expanded formula (3) of formula (2) for simplifying the computation.

$$A \times B + A \times C \qquad (3)$$

The first neural layer 20 comprises neuron 21 for processing the computation of A×B and neuron 22 for processing the computation of A×C. The second neural layer 30 comprises neuron 31 for performing a logical OR on the outputs of neurons 21 and 22.

In neuron 21, weights from W1 to W3 corresponding to data A, B and C, respectively, are W1=1, W2=1 and W3=0 so that output is "1" when formula (4) is satisfied.

$$AW1+BW2+CW3 >= 2 \qquad (4)$$

Threshold θ=2 in this case. Here, W4=1, W5=0, W6=1 and θ=2 in neuron 22, and W7=1, W8=1 and θ=1 in neuron 31.

In the neural network in FIG. 6(b), the number of neurons is 3 and that of synapses is 8. The neurons and synapses work more efficiently than the data processing system in FIG. 6(a). They work even more efficiently by using the system of the present invention, shown in FIG. 6(c).

FIG. 6(c) shows the first embodiment comprising the first neural layer 20 and the second neural layer 30. Data B and C are inputted to the first neural layer 20. Data A is directly inputted to the second neural layer 30. A neuron 21 for computing (B+C) is located in the first neural layer 20. A neuron 31 for computing A×(B+C) is settled in the second neural layer 30. Neuron 21 outputs "1" for example when WI=1, W2=1, θ=1 and formula (5) is satisfied.

$$BW1+CW2 >= 1 \qquad (5)$$

Neuron 31 Outputs "1" for example when W3=1, W4=1, =2 and formula (6) is satisfied, where Y1 is the output of neuron 21.

$$Y1W3+AW4 >= 2 \qquad (6)$$

The number of neurons is 2 and the number of synapsis is 4. I t means that the neurons and synapses work efficiently than those in FIG. 6(b).

Basic idea of the present invention is described below.

As for formula (2), data B and C are combined together by an operator "+(OR)". The computation result and data A are combined together by an operator "x (AND)". Essentially (data B and C) and (data A) should not be evaluated on the same level. If it is to be carried out on the same level, the performance becomes inefficient as in FIGS. 6(a) and 6(b).

Here, it is assumed that the processing of neuron is expressed only by the following formula.

$$\Sigma W_i A_i - \theta \qquad (7)$$

where, Wi is a weight, Ai is an input data
and θ is threshold.

It is assumed that how far a data is abstracted can be defined, and here, it is defined as "abstraction degree". It can be defined that an output data of a neuron is higher in abstraction degree than input data. It is also defined that data connected by an operator with each other are the same in abstraction degree to each other.

The degree of data B and C are the same and that of data A is higher by one degree than them in formula (2). Here, the degree of data A is "1" when those of data B and C are "0".

Considering the relationship between the degrees of the data and the layer of neural layer, only 0-degree data is inputted in neural layer 20 and only 1-degree data is inputted in neural layer 30 in FIG. 6(c). Therefore, it is clear that neural layer 20 and 30 may be related to the degrees of input data. Hereinafter, a layer has degree same as that of input data thereof.

Neurons and synapses work most profitably as well as efficiently by classifying data to be inputted to each layer into groups according to degree of data and by inputting the data of each degree to corresponding neural layer.

It is also possible to process data using a layer with lower degree than the degree of the data as described referring to FIGS. 7(a) and 7(b). However, neurons and synapses work inefficiently in this case. Accordingly, the degree of each data should be defined as high as the data can take.

One data might be used in plural degrees, in a formula (A+B)×B etc. One data may be inputted to one or more neural layers.

Figure 7C:
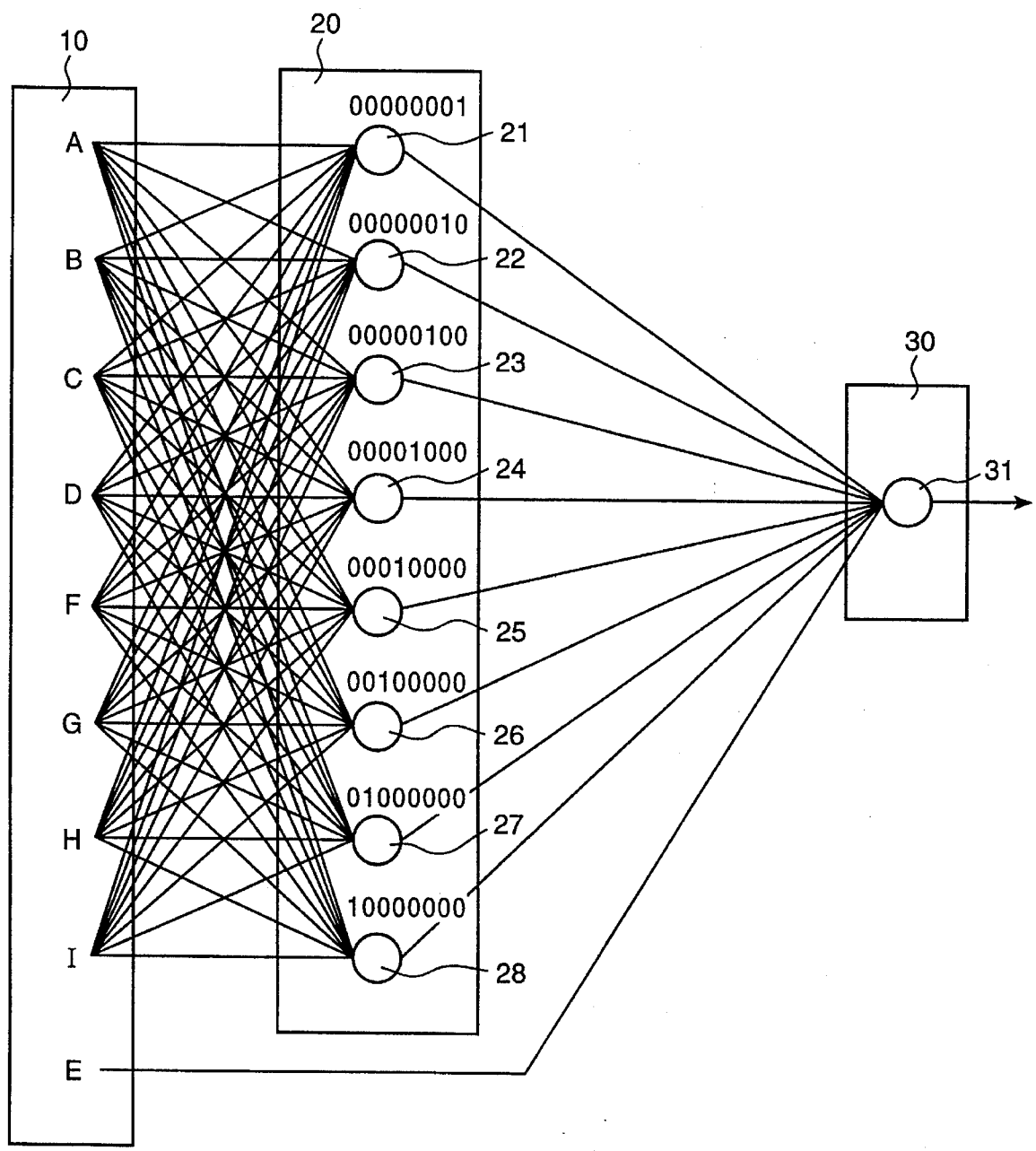
FIG. 7(c) shows the second embodiment of the neural network for recognizing end points.

FIGS. 7(a) to 7(c) show neural network for judging and points of a configuration as examples to explain "abstraction degree" which is the original meaning of the "degree".

Various definitions of an end point of a configuration can be considered. Here, in 3×3 convolutions (FIG. 7(a)), the center pixel (pixel "E" in FIG. 7(a)) is defined to be an end point when one of patterns in FIG. 7(b) from (i) to (viii) is generated. The judgment for an end point is defined as follows. When one of pixels except center pixel, from A to D or from F to I has configuration density ("1" for example) and the center pixel "E" has configuration density, the center pixel "E" is defined as an "edge point". It is not defined as an "edge point" in other cases.

The neural network for the judgment is structured as shown in FIG. 7(c), which is the second embodiment of the neural network. The neural network comprises the first neural layer 20 which consists of eight neurons from 21 to 28 and the second neural layer 30 which consists of one neuron 31. The data of pixels from A to D and from F to I are input to the first neural layer 20, and the data of pixel E is inputted to the second neural layer 30.

Neurons from 21 to 28 in the first neural layer judge if only A, only B, only C . . . is the configuration density "1" respectively. Neuron 31 in the second neural layer 30 outputs "1" when one of neurons from neuron 21 to 28 outputs "1" and pixel E is the configuration density "1". When each pixel data from A to D and from F to I is considered to be 0-degree data, the output of neuron 31 is the second-degree data. Accordingly, when the data of each pixel or the various characteristics values are the input data, the end point data can be regarded as second-degree data if each pixel data is considered to be 0-degree data. Various data such as the number of groups, number of holes, Euler number, texture characteristics value, etc. are output in image processing portion 300. Considering the degree of these data, they are to be input to the appropriate neural layer directly.

FIG. 8(a) shows the third embodiment of the neural network. The neural network in this embodiment comprises data group 10, neural layer 20 and 90. Neural layer 90 is an output layer to output an output data outside of data processing system.

Data group 10 comprises data 11, 12, 13 . . . in the first group and data 14, 15, 16 . . . in the second group. The data in data group 10 is classified into two groups of the first and second, according to the degrees thereof.

Neural layer 20 comprises neurons 21, 22, 23 . . . . Output layer 90 comprises neurons 91, 92, 93 . . . . Each neuron in neural layer 20 is connected to each neuron of output layer 90. Data 11, 12, 13. . . in the first group are inputted to each neuron in neural layer 20. Data 14, 15, 16 . . . in the second group are inputted to each neuron in output layer 90.

Each neuron in neural layer 20 compares the sum of each inputted data multiplied by weights with a threshold so as to output an output data "1" or "0" according to the comparison result as shown in the formula (1), for example. Each neuron in output layer 90 calculates the sum of neurons in neural layer 20 and the data 14, 15, 16 . . . in the second group, both of which are multiplied by weights. It outputs a data value of "1" or "0" according to the comparison result between the sum and threshold in the same way of the neurons in neural layer 20.

Data 11, 12, 13 . . . in the first group is, 0-degree data indicating that a pixel is "1" (black, for instance) or "0" (white, for instance). Data 14, 15, 16 . . . in the second group is the data of higher degree indicating characteristics of a pixel.

In the third embodiment, the data in the first group—that is the data of lower degree—is inputted to the neurons in neural layer 20. The data in the second group - that is the data of higher degree—is inputted to the neurons in output layer 90. Accordingly, the neurons in neural layer 20 perform lower processing, that is the processing on the data of a pixel itself. The neurons in output layer 90 perform processing of higher degree, that is the processing on various characteristics of a pixel.

In the third embodiment, the number of the synapses, that is, the connection between input elements and neurons or between neurons, and the number of neurons also decrease. For that reason, the data of higher degree is inputted directly to output layer 90, and is not inputted to neural layer 20. When the number of synapses decreases, the memory capacity may be decreased because the number of computation of neuron decreases. The computation speed becomes higher and the number of weight data decreases, too. When the number of neurons decrease, the number of threshold decreases and the number of computation decreases as well as the memory capacity becomes small, consequently, the computation speed becomes higher. It is possible to process by a memory with small capacity at high speed, in the present embodiment. An efficient data processing system with simple circuit is derived from it.

FIG. 8(b) shows the fourth embodiment of the neural network. The embodiment comprises three input data groups 10, neural layer 20, 30 and output layer 90.

Input data group 10 comprises 11, 12, 13 . . . in the first group, 14, 15, 16 . . . in the second group and 17, 18, 19 in the third group. Input data groups are classified into three kinds, different from the third embodiment. The first neural layer 20 comprises neurons 21, 22, 23 . . . and the second neural layer 30 comprises neurons 31, 32, 33 . . . . Output layer 90 comprises neuron 91, 92, 93 . . . . Each neuron in the first neural layer 20 is respectively connected to each neuron in the second neural layer 30, which is respectively connected to each neuron in output layer 90.

The data 11, 12, 13 . . . in the first group are respectively connected to each neuron in the first neural layer 20. The data 14, 15, 16 . . . are respectively connected to each neuron in the second neural layer 30. The data 17, 18, 19 . . . are respectively connected to each neuron in output layer 90.

Each neuron outputs an output data value of "1" or "0" in response to each inputted data according to the formula (1).

The data 11, 12, 13 . . . in the first group are the 0-degree data. The data 14, 15, 16 . . . in the second group are the first degree data. The data 17, 18, 19 . . . in the third group are the second degree data. The data of rather high degree is inputted to the second neural layer 30 and the data of higher degree is inputted to the output layer 90.

The number of synapses and neurons decrease in the fourth embodiment similar to the third embodiment. Therefore, the same advantages in the third embodiment are obtained.

Figure 9A:
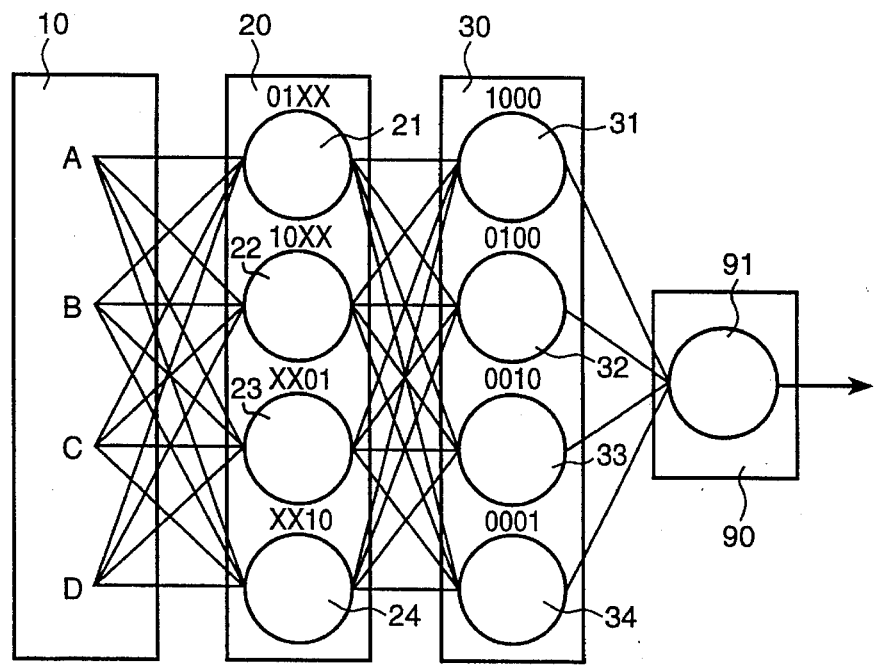
FIG. 9(a) shows a comparative embodiment.
Figure 9B:
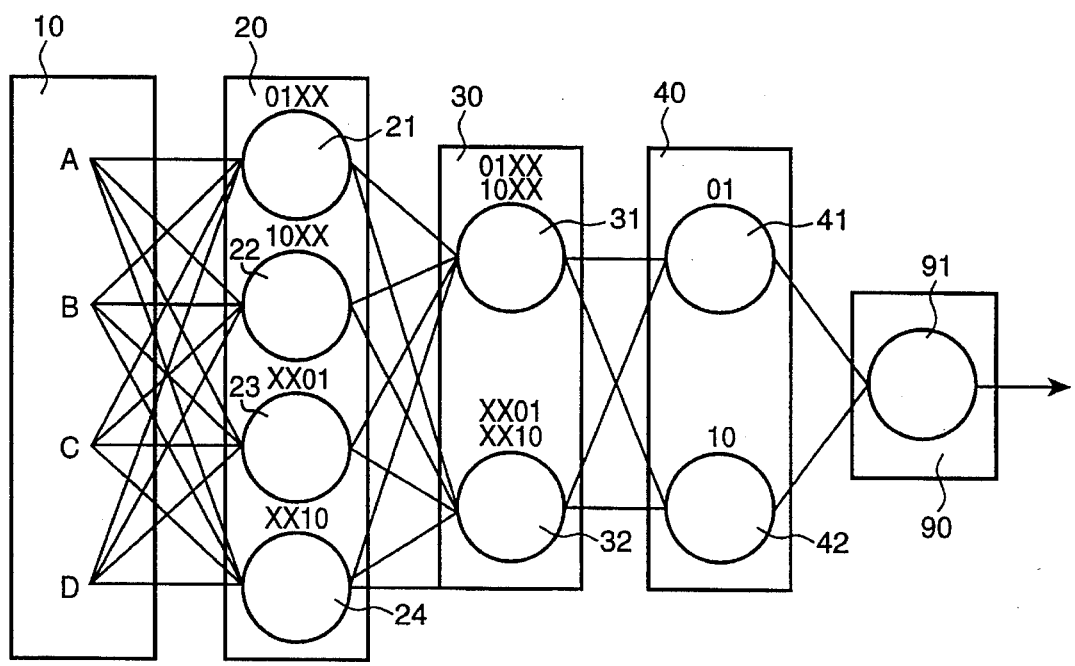
FIG. 9(b) shows the fifth embodiment of the neural network.

FIGS. 9(a) and 9(b) show the fifth embodiment through comparative example. These show cases where input data is processed according to the computation of $$(A \oplus B) + (C \oplus D) \tag{8}$$

where, $\oplus$ shows "exclusive or";

A, B, C and D are the digital values of "1" or "0";

the results of this logical computation are outputted as digital values of "1" or "0".

FIG. 9(a) shows a comparative example, comprising a data group 10 from which input data is outputted, the first neural layer 20, the second neural layer 30 and output layer 90. Input data group 10 includes input data A, B, C and D. The first neural layer 20 comprises four neurons 21, 22, 23 and 24. The second neural layer 30 comprises four neurons 31, 32, 33 and 34. Data from A to D are inputted to each neuron in the first neural layer 20, which is connected to each neuron in neural layer 30 of the second neural layer. Output layer 90 comprises a neuron 91, to which each neuron in the second neural layer 20 is connected.

Neuron 21 in the first neural layer 20 has weights and threshold for the each input data. It outputs an output data "1" when the sum of multiplication of each input data by the weight is equal to or exceeds threshold, and outputs "0" when the sum is smaller than the threshold. In the same way, neuron 22, 23 and 24 output "1" or "0" in response to the input data. Each neuron in the second neural layer 30 outputs "1" or "0" in the same way as the first neural layer 20.

Neuron 91 in output layer 90 outputs "1" or "0" according to the output data from the second neural layer 30 in the same way.

The result of logical computation $(A \oplus B) \oplus (C \oplus D)$ is "1" when data A does not coincide with B, and C coincides with D; or when A coincides with B and C does not coincide with D. Otherwise, it becomes "0". Each neuron in FIG. 9(a) is constructed as follows.

Neuron 21, 22, 23 and 24 in the first neural layer 20 output "1" when A, B, C and D are 4 bits patterns of "01xx" "10xx" "xx01" and "xx10", respectively. They output "0" for other inputs. Here, "xx" means to ignore the data on the location of 4 bits patterns.

Neuron 31 in the second neural layer 30 outputs "1" when only neuron 21 in the first neural layer 20 outputs "1". Otherwise, it outputs "0". Neuron 32 outputs "1" when only neuron 22 in the first neural layer 20 outputs "1". Otherwise, it outputs "0". Neuron 33 outputs "1" when only neuron 23 in the first neural layer 20 outputs "1". Neuron 34 outputs "1" when only neuron 24 in the first neural layer 20 outputs "1".

On the other hand, neuron 91 in output layer 90 outputs "1" when at least one neuron in the second neural layer 30 output(s) "1".

When the input data of A, B, C and D are "0001" as bit pattern, only neuron 23 in the first neural layer 20 outputs "1" and other neurons of 21, 22, and 24 output "0". Consequently, neuron 33 in the second neural layer 30 outputs "1" and neuron 91 in output layer 90 outputs "1". Similarly, when a bit pattern consisting of A, B, C and D are "0010", "0100", "1000", "1110", "1101", "1011" or "0111", one of neurons in the second neural layer outputs "1" and neuron 91 in output layer 90 outputs "1".

FIG. 9(b) shows the fifth embodiment of the present invention, comprising input data group 10, the first neural layer 20, the second neural layer 30, the third neural layer 40 and output layer 90. Input data group 10 consists of input data A, B, C and D. The first neural layer 20 comprises four neurons of 21, 22, 23 and 24. The second neural layer 30 comprises two neurons 31 and 32. The third neural layer 40 comprises to neurons 41 and 42. Output layer 90 comprises a neuron 91. Data from A to D in input data group are inputted to the neurons in the first neural layer 20, which are connected to the neurons in the second neural layer 30.

Neurons in the second neural layer 30 are connected to the neurons in the third neural layer 40, which are connected to the neuron in output layer 90.

All neurons in neural layers 20, 30, 40 and in output layer 90 output "1" or "0" according to inputted data, similarly to the case in FIG. 9(a).

Neurons 21, 22, 23 and 24 in the first neural layer 20 output "1" when 4 bits pattern of A, B, C and D are "01xx", "10xx", "xx01" or "xx10" is outputted, respectively. Otherwise, they output "0". Neuron 31 in the second neural layer 30 outputs "1" when a neuron 21 or 22 in the first neural layer 20 outputs "1" Otherwise, it outputs "0" Neuron 32 outputs "1" when neuron 23 or 24 in the first neural layer 20 outputs "1". Otherwise, it outputs "0". Neuron 41 in the third neural layer 40 outputs "1" when only neuron 32 in the second neural layer 20 outputs "1". Otherwise, it outputs "0". Neuron 42 outputs "1". when only neuron 31 in the second neural layer 30 outputs "1". Otherwise, it outputs "0". Neuron 91 in output layer 90 outputs "1" when at least one neuron in the third neural layer 40 output (s) "1".

When input data of A, B, C and D is a bit pattern of "0001" only neuron 23 in the first neural layer 20 outputs "1" and other neurons 21, 22 and 24 output "0". Consequently, only neuron 32 in the second neural layer 30 outputs "1" and neuron 42 in the third neural layer 40 outputs "1". Accordingly neuron 91 in output layer 90 outputs "1". In the same way, when a bit pattern of A, B, C and D is "0010", "0100", "1000", "1110", "1101", "1011" or "0111", one of neurons in the second neural layer 30 outputs "1". Consequently, one neuron in the third neural layer 40 outputs "1" thereby one neuron in the fourth neural layer 40 outputs "1". Therefore, neuron 91 in output layer 90 outputs "1".

As easily understood in FIG. 9(a) of comparative example, the number of synapses is 36 and the number of neurons is 10. In the embodiment in FIG. 9(b), the number of synapses is 30 and the number of neurons is 10. When inputted data is processed by logical computation of (A⊕B)⊕(C⊕D), 36 synapses are necessary in the comparative example; on the other hand, only 30 synapses are necessary in the present embodiment.

The number of synapses decreases about 20% by the present embodiment. Each embodiment above has similar advantages. That is, the number of synapses and the capacity of memory is decreased and the speed of computation become higher by increasing number of neural layers and by setting number of neurons in a neural layer less than the number of neurons in the previous neural layer.

Figure 10A:
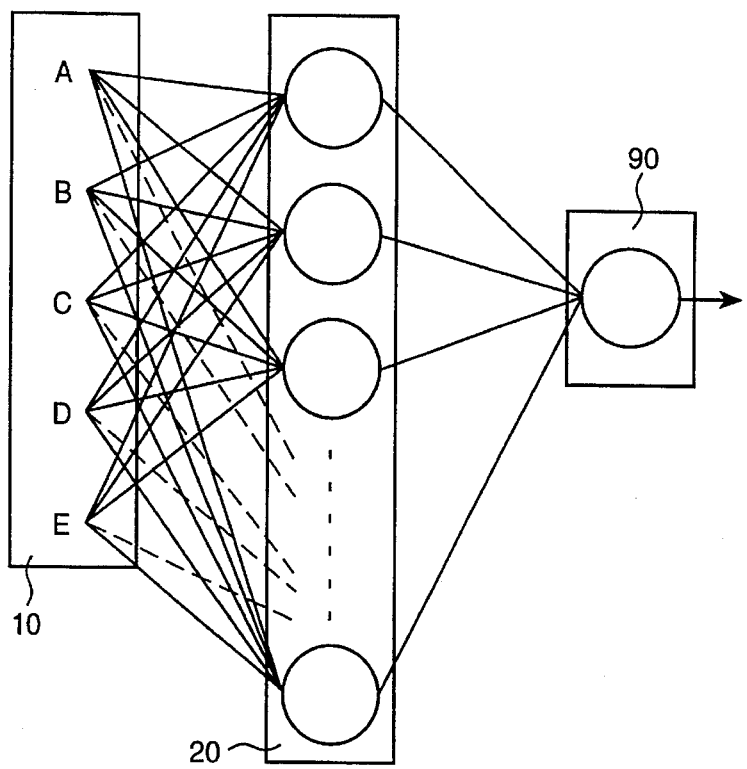
FIG. 10(a) shows a comparative embodiment.
Figure 10B:
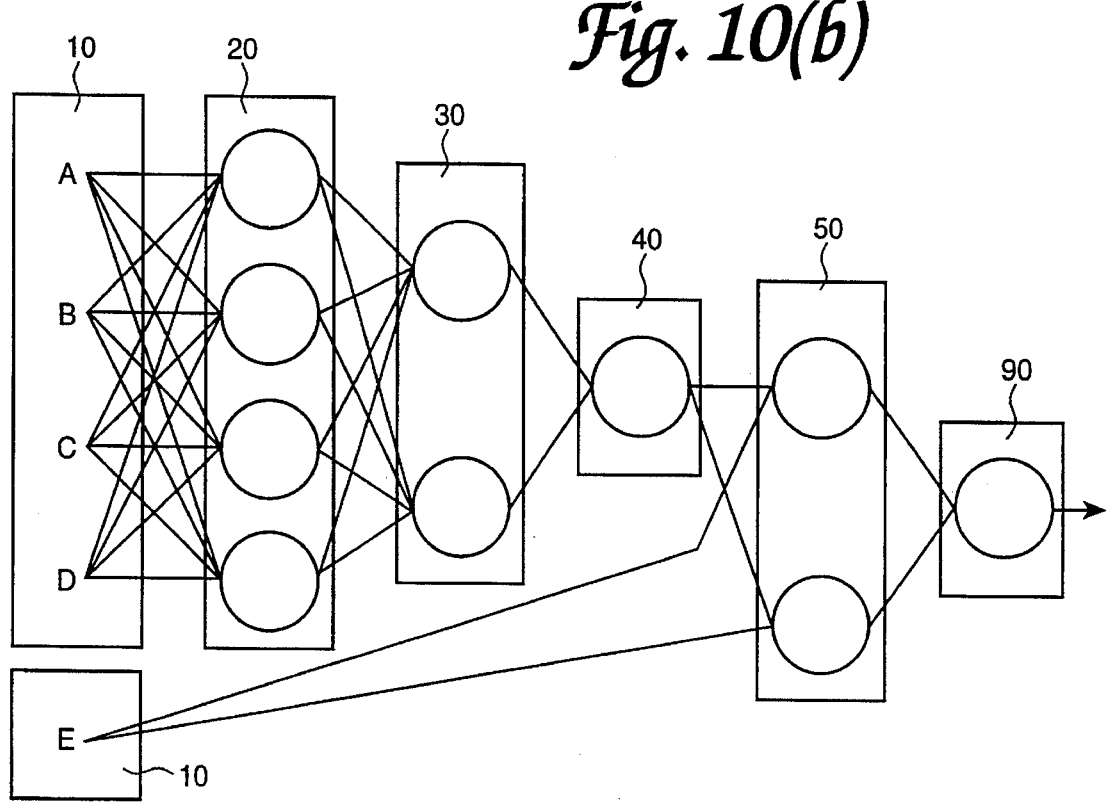
FIG. 10(b) shows the sixth embodiment of the neural network.

FIGS. 10(a) and 10(b) show the sixth embodiment with comparative example. This example shows a case that input data is processed by the formula (9).

$$\{(A\oplus B)\beta(C\oplus D)\}\oplus E \tag{9}$$

FIG. 10(a) shows the comparative example. Input data group 10 comprises five data from A to E, the first layer 20 comprises 15 neurons and output layer 90 comprises one neuron. In the comparative example, each term of expanded formula of the formula (9) is inputted to each neuron in neural layer 20. All the data is processed as 0-degree data.

FIG. 10(b) shows the sixth embodiment of the present invention, which comprises input data group 10, the first neural layer 20, the second neural layer 30, the third neural layer 40, the fourth neural layer 50 and output layer 90. The first neural layer 20 and the second neural layer 30 perform the processings according to (A⊕B) and (C⊕D). The third neural layer 40 performs the processings according to {(A⊕B)⊕(C⊕D)}. The final result is computed with {(A⊕B)⊕(C⊕D)}⊕E in the fourth neural layer 50 and output layer 90.

As understood by the comparison between FIGS. 9(a) and 9(b), the number of synapses and the number of neurons in the comparative example are 80 and 16, respectively: the number of synapses and the number of neurons in the present embodiment are 32 and 10, respectively. The number of synapses decreases into 40% and the number of neurons decreases into 60% approximately. Therefore, the same advantages in the above embodiment can be obtained in the present embodiment.

As grasped from the above explanation, the layer structure comprising input data group, neural layers and output layer have to be constructed with the most appropriate way corresponding to degree necessary for the data processing and degree of input data. The input data is inputted to the appropriate layer corresponding to the structure of the layer. "Degree" s here means the abstract degree of the data and the processings as stated above.

Weights have to be settled as a suitable value through learning of neurons for performing the above processes. Therefore, in the present embodiment, the weights are changed along time so as to follow exponential function, as described later. There are three methods classified roughly as described in Japanese Patent Sho 63-297541. They are called here Mode I, Mode II and Mode III.

In Mode I, the weights of neurons are corrected according to the outputs of the neurons. This method for correction is effective when the objective value of the outputs of each layer is clear. When a neuron generates an output corresponding to an input and when the output is coincident with or near the objective value, the relationship between the input that output is to be reinforced. This is equivalent to the weight enhancement of the synapse inputted significant inputs. On Mode I, since the objective value of the output of each neuron is clear, the output of each neuron and the objective value can be compared with each other. When both of them coincide each other or near enough—on the binary input, for example, the weight of the synapse inputted "1" is enhanced.

Figure 11:
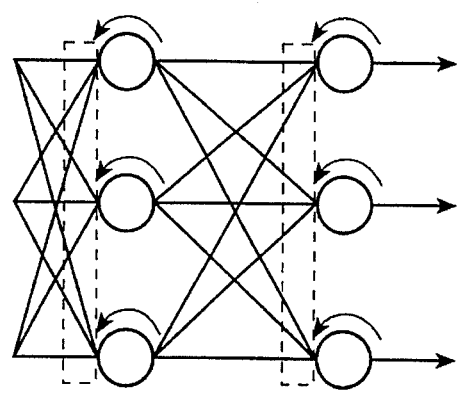
FIG. 11 shows a data processing system for processing the learning of mode I.
Figure 12:
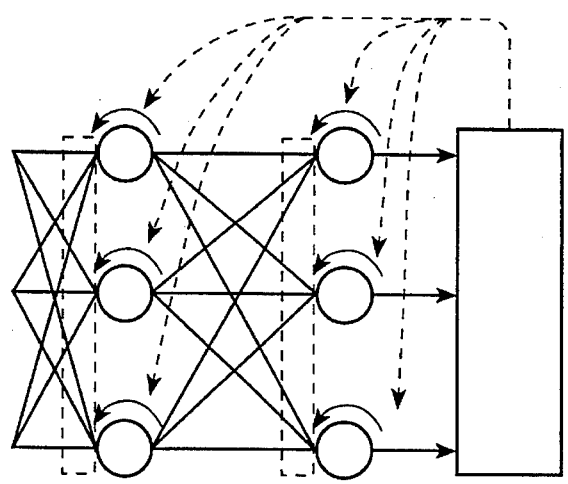
FIG. 12 shows a data processing system for processing the learning of mode II.

Mode II is shown in FIG. 12. The weight of neuron is corrected according to the last output evaluation. The method fro correction is effective on the case for judging the processings of the data processing system with the wide view. Hamming distance between the last output of the output layer and the objective value, evaluation of Pythagorean distance and sensitized evaluation are effective for evaluation of—the Mode II. When the output is coincident with or near enough to the objective value on the evaluation, the relationship between the input and output have to be reinforced. At that time, the weight of each synapse inputted "1" for example, is increased Mode III is the method to correct weight when learning of memorizing inputs as it is. The relationship between an input and the output generated first on the input is reinforced. That is, in the structure in FIG. 11, the weight of synapse inputted "1", of the neuron outputted "1" in response to the input, is increased.

Figure 13:
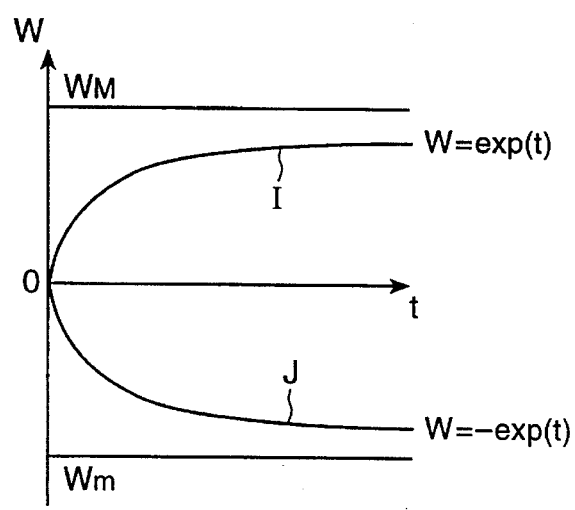
FIG. 13 shows a weight change in response to time.

Inventors assume that the weight change of a neuron of a neuron is the change of electrical potential of membrane of neuron cell of an organism. It seems that the learning in data processing system becomes efficient as seen in organism neurons when the weight is set similarly to the electrical potential of membrane of neural cell of an organism. It also seems that the weight is expressed with exponential function, similarly to well-known RLC circuit, when the weight change in the same way of electrical potential of membrane. The weight W" is expressed by the formula (10) as shown in FIG. 13.

$$W = +-\exp(b) \tag{10}$$

where, "t" is the learning time of each neuron, hat is, the time of learning.

In the formula (10), when a synapse is stimulated, the mark is +. As shown with the solid line I, weight W starting from 0, becomes larger rapidly at first. Next, as time passes from the start of learning, the smaller the change of weight becomes and converges the maximum $W_M$. On the other hand, when a synapse is inhibited, the mark is −. As shown with the solid line J, weight W starting from 0, becomes smaller rapidly at first. Next, as time passes from the start of learning, the smaller the change of weight becomes and converges the minimum Wm.

Since there is a little data correlation of the synapse just after starting learning, the weight W is set small. Since the data correlation become closer after that, weight W become bigger promptly: consequently the convergence by learning is expedited. When weight W is big already after learning, the synapse has strong data correlation sufficiently until the learning. If the weight is changed frequently, the convergence by learning is blocked because of variations. Here, as weight W is set to change little, enough convergence is performed.

Conventionally, there have been stimulated neuron and inhibited neuron for the characteristics of neuron's outputs. It has been necessary to investigate in detail considering the processings to set them adequately in a data processing system. That is, it has been complicated to combine inhibited neuron and stimulated one in a data processing system. The present embodiment makes it possible to realize both of synapses of inhibited or stimulated only by selecting the sign of weight W of a synapse's characteristics. Accordingly, the circuit has more simple structure and higher flexibility. Data separation is improved by the existence of an inhibited neuron, as mentioned by Rosenblatt. ("The Perceptton: a probabilistic model for information storage and organization in the brain" Psychological Review 65, pp386–408, Rosenblatt, 1958)

The efficiency of learning in data processing system improves by the present embodiment and therefore, the last output data is converged and stabilized quickly. As mentioned above, the characteristics of neurons inhibited or stimulated is obtained only by changing the sign of plus or minus of a weight W. Accordingly, the data processing system obtains flexibility in circuit.

The change according to time passing of weight W is not necessary to be set with a expotential function. It may be expressed by polygonal line approximately.

From the seventh to the ninth embodiments of a neural network are described below, as well as the second principle of the present invention.

Figure 14A:
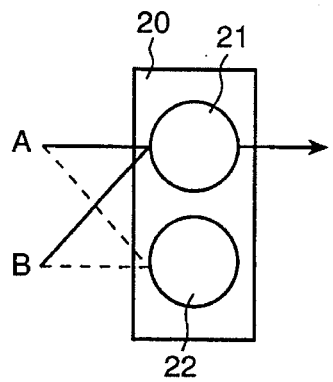
FIG. 14(a) shows the seventh embodiment of the neural network.

FIG. 14(a) shows the seventh embodiment of the present invention, which has obtained performance for processing of a logic computation of (A+B), from a proper learning.

The data processing system comprises one neural layer 20 in which neurons of the same number as the data, that is 2 neurons of 21 and 22, are set. Data A and B are inputted to the neurons 21 and 22 respectively. Neurons 21 and 22 have connection portions for data input lines, for which weight of synapse "Wi" s and threshold θs are given. The weight Wi changes due to learning so that neurons come to perform an expected processing. In this embodiment, only one neuron 21 performs the logic computation of (A+B) and the other neuron 22 does not work substantially. That is to say, the following computation is performed. It is set that W1=1, W2=1 and θ=1 in neuron 21, for instance. Neuron 21 outputs an output data "1" when $$AW1+BW2>=1$$

On the other hand, it is set that W3=0, W4=0 and θ=1 in neuron 22, for instance. Therefore, the formula below is always true.

$$AW3+BW4<1$$

It means that the value of AW3+BW4 does not exceed the threshold θ and output data "0" is outputted.

When at least one of data A and B is "1", neuron 21 outputs an output data "1" and neural network of the present invention executes the logic computation (A+B).

Figure 14B:
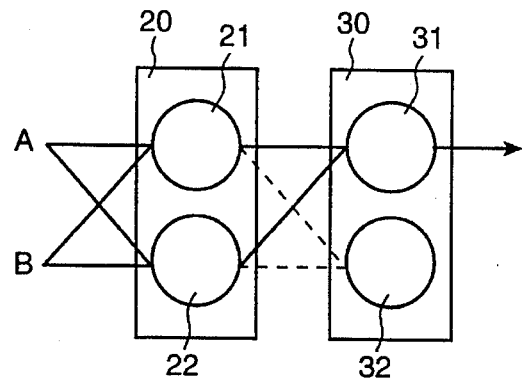
FIG. 14(b) shows the eighth embodiment of the neural network.

FIG. 14(b) shows the eighth embodiment of the present invention. The neural network executes a logic computation of (A ⊕B). The data processing system comprises 2 neural layer 20 and 30. Neurons 21 and 22 are included in the first neural layer 20; neurons 31 and 32 are included in the second-final-layer 30. Data A and B are inputted to the neurons 21 and 22, respectively, in the first neural layer 20.

Logic computation of (A⊕B) is expanded as $(\overline{A}B+A\overline{B})$. Neuron 21 performs the processing of $(\overline{A}B)$ and neuron 22 performs the processing of $(A\overline{B})$ in neural layer 20. Here, it is set that W1=−1, W2=1 and θ=1 in neuron 21, for instance. Neuron 21 outputs and output data "1" when the following formula is satisfied.

$$AW1+BW2>=1$$

On the other hand, it is settled that W3=1, W4=−1 and θ=1 in neuron 22, for instance. Neuron 22 outputs an output data "1" when the following formula is satisfied.

$$AW3+BW4>=1$$

Neuron 31 in neural layer 30 executes the processing of $(\overline{A}B+A\overline{B})$. It is settled that W5=1, W6=1, θ=1, the output of neuron 21 is Y1 and that of neuron 22 is Y2, for instance. Neuron 31 outputs "1" when the following formula is satisfied.

$$Y1W5+Y2W6>=1$$

Neuron 32 does not work substantially.

Neuron 31 outputs an output data "1" when only one of data A or B is "1" and outputs "0" when both of them are "1" or "0" The neural network of this embodiment executes the logic computation of (A⊕B).

Figure 14C:
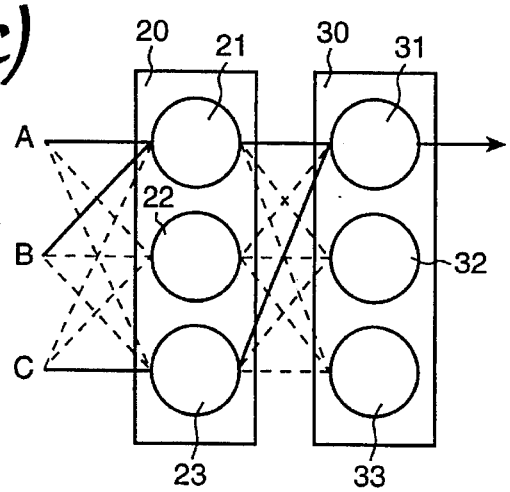
FIG. 14(c) shows the ninth embodiment of the neural network.

FIG. 14(c) shows the ninth embodiment of the present invention. The neural network comes to perform a logic computation of (A+B)C through learning. It comprises two neural layer 20 and 30. The first neural layer 20 includes neurons 21, 22 and 23 and the next neural layer 30 includes neurons 31, 32 and 33. Data A, B and C are inputted to the neurons 21, 22 and 23, respectively, in the first neural layer 20.

In neural layer 20, neuron 21 processes (A+B), neuron 22 does not work substantially and neuron 23 outputs an input data C as it is. That is, it is set that W1=1, W2=1, W3=0 and θ=1 in neuron 21, for instance. Neuron 21 outputs the output data "1" when the following formula is satisfied.

$$AW1+BW2+CW3>=1$$

Neuron 22 does not work substantially, whose weights W4, W5 and W6 are settled 0 and threshold θ is settled 1. It is settled that W7=0, W8=0, W9=1 and θ=1 in neuron 23, for instance. Neuron 23 outputs an output data "1" when the following formula is satisfied.

$$AW7+BW8+CW9>=1$$

Otherwise, it outputs an output data "0".

Neuron 31 in neural layer 30 processes (A+B)C according to the output data of neurons 21 and 23 in neural layer 20. It is settled that W11=1, W12=0, W13=1, θ=2, the output of neuron 21 is Y1, the output of neuron 22 is Y2 and the output of neuron 23 is Y3. Neuron 31 outputs an output data "1" when the following formula is satisfied.

$$Y1W11+Y2W12+Y3W13>=2$$

Neurons 32 and 33 do not work substantially.

Neuron 31 outputs an output data "1" when at least one of data A and B is "1" and data C is "1". The neural network of this embodiment execute a logic computation (A+B)C.

Here, the second basic concept of the present invention is described.

Data A and B in the seventh embodiment are connected by a logic operator of "+(OR)". The logic computation (A+B) is executed in a neural layer 20.

Data A and B are connected by "⊕(EX–OR)" in the eighth embodiment. The logic computation (A⊕B) is expanded as ($\overline{A}B+A\overline{B}$). $\overline{A}B$ and $A\overline{B}$ are executed in the first neural layer 20, that is, a logic computation of operator "x (AND)" is performed. Next, ($\overline{A}B+A\overline{B}$)—the logic computation of the action factor (+(OR)"—is executed in the second neural layer 30. The logic computation of the eighth embodiment is executed through 2 neural layers.

Data A and B are connected by an operator "+(OR)" in the ninth embodiment: this logic computation is executed in the first neural layer 20. The result of the logic computation is connected to data C by an operator "x (AND)". The logic computation (A+B)C is executed in the second neural layer 30. The logic computation of the ninth embodiment is executed through 2 neural layers.

When the processing of data processing system is expressed by the logic computation factors "AND" and "OR" the number of neural layers is increased according to the number of logic computation operators or the construction of logic computation.

The degree of each data is as described above. According to the definition, in the eighth embodiment to perform logic computation (A⊕B) assuming data A and B to be 0-degree, processing of $\overline{A}B$ and $A\overline{B}$ are performed in each neuron 21 and 22 in the first neural layer 20 and the first-degree output is inputted to the neuron in the second neural layer 30. In the second neural layer 30, the processing of ($\overline{A}B+A\overline{B}$) is performed and the second-degree data is outputted. It means that the last output data is the second-degree, and that the logic computation (A⊕B) is executed in two neural layers: the number of the layers is equal to the degree of the last output data minus the degree of an input data.

Inventors suppose that the number of neural layers can be decided by judging how higher the degree of the last output data than that of the input data is. That is, they suppose that the number of neural layers is equal to the degree of the last output data minus the degree of an input data. This is the second principle. A degree is an abstraction degree of data, as mentioned, which is decided according to the characteristics of data: for example as to image recognition, pixel data is 0-degree, and the data of end point, number of holes and Euler number have higher degree than pixel data. When data of end point is calculated from pixel data, it is possible to set neural layers of the numbers equal to the degree of end point data minus the degree of pixel data, considering the degree of end point data—that is the abstraction degree—. The embodiment in this case is described later referring FIG. 16 and FIG. 17.

Figure 15:
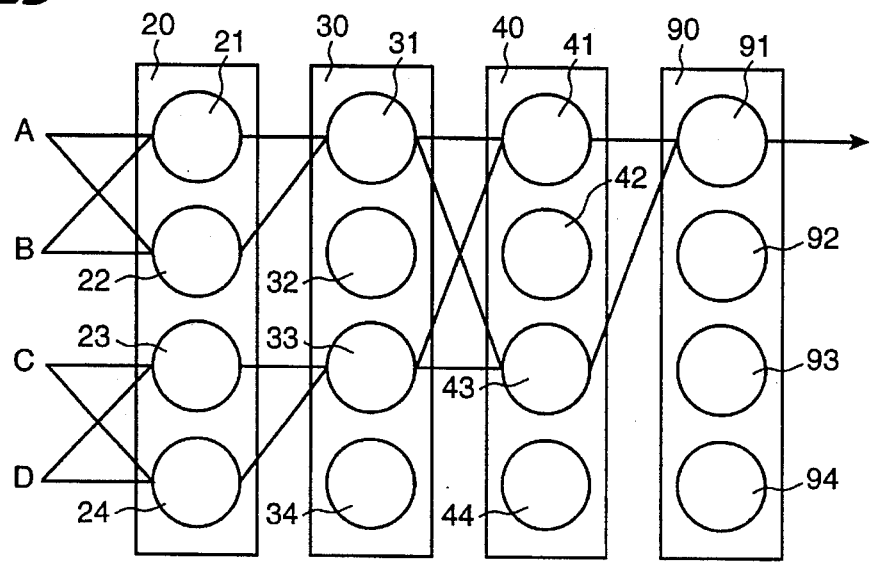
FIG. 15 shows the tenth embodiment of the neural network.

FIG. 15 shows the tenth embodiment of the present invention. It shows the case that input data A, B, C and D are processed according to the logic computation of (A⊕B)⊕(C⊕D)

through learning. Where, A, B, C and D are the digital values of "1" or "0", and the result of logic computation is outputted as the digital value of "1" or "0", also.

This embodiment comprises 4 neural layers of 20, 30, 40 and 90. The last neural layer 90 is the output layer to output the last output data. The first neural layer 20 comprises 4 neurons of 21, 22, 23 and 24; the second neural layer 30 comprises 4 neurons of 31, 32, 33 and 34; the third neural layer 40 comprises 4 neurons of 41, 42, 43 and 44; the output layer 90 comprises 4 neurons of 91, 92, 93 and 94. Each data from A to D are inputted to each neuron in the first neural layer 20. Each neuron is connected to each neuron in the neighbor neural layer. The lines which do not perform substantially are omitted in the figure for simplification. Each neuron has weight Wi by which inputted data is multiplied, the threshold θ. Neuron outputs an output data "1" when the sum of multiplication of each input data and weight is equal to or more than the threshold θ; it outputs the output data "0" when the sum is less than the threshold θ according to the formula (1) above.

For a logic computation (A⊕B), being expanded as ($\overline{A}B+A\overline{B}$), neuron 21 processes ($\overline{A}B$) and neuron 22 processes ($A\overline{B}$) in neural layer 20. For a logic computation (C⊕D), being expanded as ($\overline{C}D+C\overline{D}$), neuron 23 processed ($\overline{C}D$) and neuron 24 processed ($C\overline{D}$).

Neuron 21 outputs an output data "1" when the formula below is satisfied.

$$AW21+BW22+CW23+DW24>=1$$

where, W21=−1, W22=1, W23=0, W24=0 and θ=1. Neuron 22 outputs an output data "1" when the formula below is satisfied.

$$AW25+BW26+CW27+DW28>=1$$

where, W25=1, W26=−1, W27=0, W28=0 and θ=1. The weights "Wi" s and threshold s of neurons 23 and 24 are settled, similarly to the above.

Neuron 31 in neural layer 30 processes ($\overline{A}B+A\overline{B}$), which outputs the output data "1" when the formula below is satisfied.

$$KW31+LW32+MW33+NW34>=1$$

where, W31=1, W32=1, W33=0, W34=0, θ=1, the output of neuron 21, 22, 23 and 24 is K, L, M and N, respectively. Similar to the above, neuron 33 processes ($\overline{C}D+C\overline{D}$), which outputs "1" when at least one of outputs of neurons 23 and 24 is "1". The weights "Wi" s of neurons 32 and 34 are set to 0 and do not work substantially.

Accordingly, neuron 31 outputs the result of (A⊕B) and neuron 33 outputs the result of (C⊕D).

Here, the outputs of neuron 31, 32, 33 and 34 are defined as E, F, G and H, respectively. Neuron 41 in neural layer 40 processes ($\overline{E}G$) and neuron 43 processes ($E\overline{G}$). Neuron 41 outputs an output data "1" when the formula below is satisfied.

$$EW41+FW42+GW43+HW44>=1$$

where, W41=−1, W42=0, W43=1, W44=0 and θ=1. Likewise, neuron 43 outputs an output data "1" when the formula below is satisfied.

$$EW45+FW46+GW47+HW48>=1$$

where, W45=1, W46=0, W47=−1, W48=0 and θ=1. Neuron 42 and 44, whose weights "Wi" s are settled 0, do not work substantially.

Neuron 91 in the output layer 90 processes ($\overline{E}G+E\overline{G}$) and outputs an output data "1" when the formula below is satisfied.

$$PW91+QW92+RW93+SW94>=1$$

where, W91=1, W92=0, W93=1, W94=0, θ=1, the outputs of neurons 41, 42, 43 and 44 are P, Q, R and S, respectively.

Neurons 92, 93 and 94 do not work substantially. In this way, the neurons which do not work substantially can be omitted when an objective usage is limited and the number of output data is clarified.

From the mention above, neuron 91 outputs the result of (E⊕G), that is the result of (A⊕B)⊕(C⊕D).

The degree of output data of the logic computations (A⊕B) and (C⊕D) are "2", because the operator "⊕(EX-OR)" is substituted by two operators of "AND" and "OR". Therefore, the degree of output data is 4 in the logic computation (A⊕B)⊕(C⊕D); this logic computation is processed through 4 neural layers which have neurons as many as the number of input data, that is 4.

Figure 16:
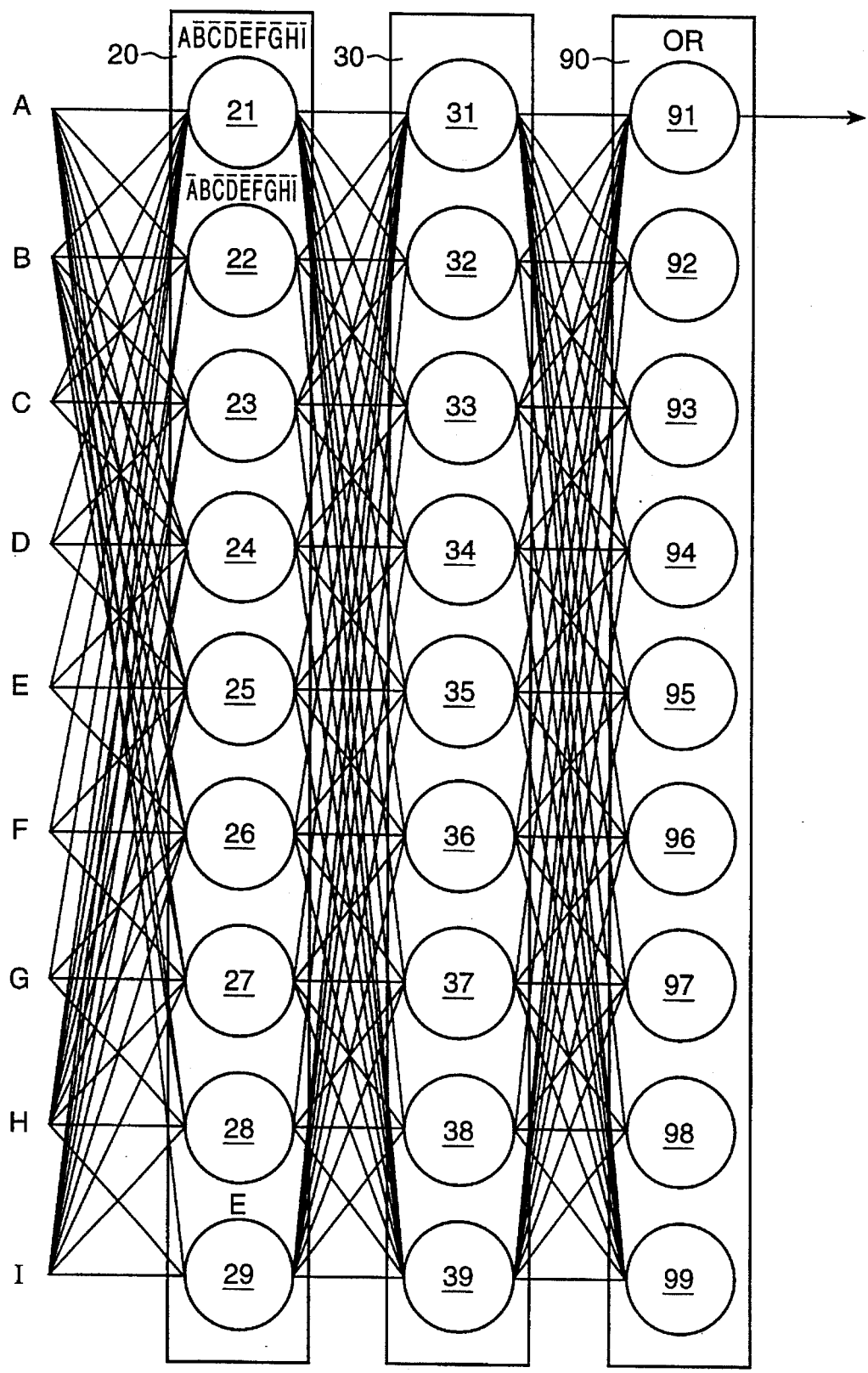
FIG. 16 shows the eleventh embodiment of the neural network.

A data processing system for judging end point of a configuration is shown in FIGS. 7(a)–7(b) and FIG. 16.

In this case, in 3×3 convolution (FIG. 7(a)), the center pixel (pixel E in FIG. 7(a)) is an end point when one of patterns from(b) (i) to (viii) is generated. When one of pixels except for the center pixel, among A to D and F to I, is the density of a configuration (for example "1"), and the center pixel E is the density of a configuration, the center pixel is the "end point". Otherwise, it is not "end point".

The data processing system for such judgment is constructed as shown in FIG. 16, for example, which shows the eleventh embodiment of the present invention. This data processing system comprises the first neural layer 20 which has 9 neurons from 21 to 29, the second neural layer 30 which has 9 neurons from 31 to 39 and the output layer 90 which has 9 neurons from 91 to 99. The pixel data from A to I are inputted to the first neural layer 20.

Neuron 21 in the first neural layer 20 outputs an output data "1" when only pixel A is "1" in the pixel A to I except the pixel E. Similarly, neurons 22, 23, 24, 25, 26, 27 and 28 output an output data "1" when only pixel B, C, D, F, G, H and I are "1", respectively. Therefore, when one of pixels from A to d and F to I is "1", one of neurons from 21 to 28 outputs an output data "1". On the other hand, neuron 29 outputs the data of pixel E as it is.

Neuron 31 in the second neural layer 30 outputs an output data "1" when the outputs of neurons 21 and 29 are "1" that is when pixels A and E are "1". Likewise, neurons from 32 to 38 output an output data "1" when pixel B and E are "1" when pixels C and E are "1" when pixels D and E are "1" when pixels F and E are "1" when pixels G and E are "1" when pixels H and E are "1" and when pixels I and E are "1" respectively Neuron 39 does not concern the judgment of the end point, substantially.

Neuron 91 in output layer 90 outputs an output data "1" when at least one of neurons from 31 to 38 in the second neural layer 30 outputs an output data "1e" that is when at least one of patterns in FIG. 7(b) from (i) to (viii) is generated. The center pixel E is judged as an end point on this occasion. Neurons from 92 to 99 do not concern the judgment of the end points, substantially.

When the pixel data from A to I are defined as 0-degree data, the output of neuron 91 is the third degree data and three steps of logic computations are constructed for judging end points. The computation is as follows. In neural layer 20, logical multiplication is performed for judging if only one of pixels in A to D and F to I if "1" or not, for example (A$\overline{BCDFGHI}$) in neuron 21. In neural layer 30, logical multiplication is performed for judging is only one of pixels in A to D and F to I is "1" or not, for example (A$\overline{BCDFGH}$ I·E) in neuron 31. In neural layer 90, logical sum is defined for judging if E is "1" and one of pixels in A to D and F to I is "1".

The judgment of end points can be performed by a logical sum for judgment if E is "1" and one of pixels in A to D and F to I is "1" in neural layer 30. Therefore, it is possible to judge end points through 2 neural layers. When the difference of degrees between output data and input data is 3, the judgment of end point is executed by setting at most 3 neural layers, without fail.

Figure 17:
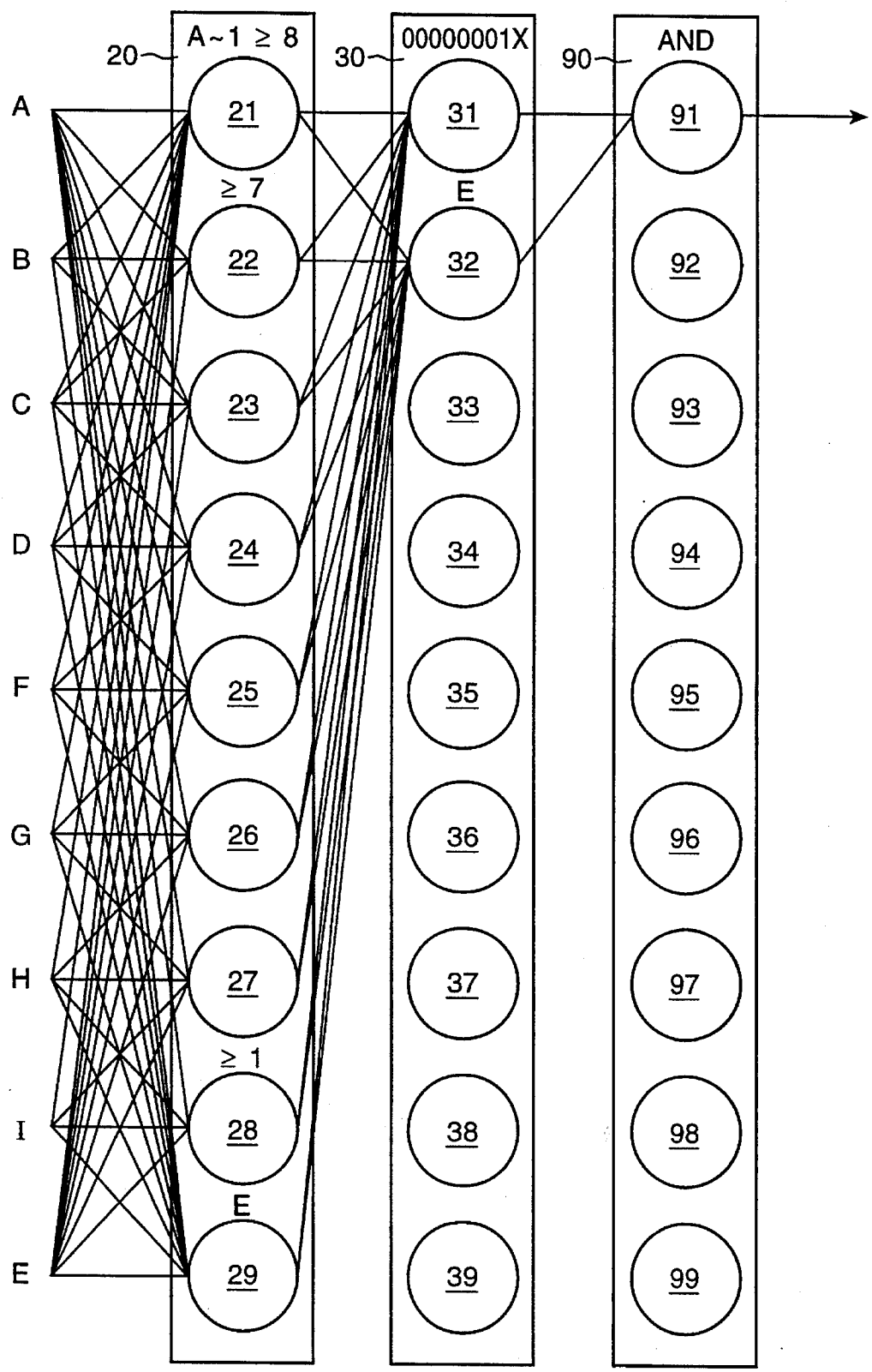
FIG. 17 shows the twelfth embodiment of the neural network.

FIG. 17 shows the twelfth embodiment of the present invention. The present neural network comprises the first neural layer 20 which has 9 neurons from 21 to 29, the second neural layer 30 which has 9 neurons from 31 to 39 and the output layer 90 which has 9 neurons from 91 to 99. The data of pixels from A to I are inputted to the first neural layer 20.

Neuron 21 in the first neural layer 20 outputs an output data "1" when 8 or more pixels from A to D and F to I are "1". Neuron 22 outputs an output data "1" when 7 or more pixels from A to D and F to I are "1". In the same say, neuron 23, 24, 25, 26, 27 and 28 output an output data "1" when 6 or more, 5 or more, 4 or more, 3 or more, 2 or more and 1 or more pixels from A to D and F to I are "1", respectively. Neuron 29 outputs the data of pixels E as it is.

Neuron 31 in the second neural layer 30 outputs an output data "1" when only neuron 28 in neurons 21 to 28 in neural layer 20 outputs "1". That is, neuron 31 outputs the output data "1" when only one pixel in pixels from A to D and F to I is "1". Neuron 32 outputs the data of pixel E as it is. Neurons from 33 to 39 do not concern the judgment of the end points, substantially.

Neuron 91 in output layer 90 performs logical multiplication to judge if both of neurons 31 and 32 output "1" or not. It outputs an output data "1" when only one pixel in A to D and F to I is "1" and E is "1". Neurons from 92 to 99 do not concern the judgment of the end points, substantially.

The end point data is judged through 3 neural layers in this embodiment.

In the embodiments from the seventh to the twelfth, the degree of data is the number of processings performed to the data. Each processing is performed in each neural layer. Here, the examples of the processing is logical computation elements of "AND", "OR", "NAND" and "NOR". "EX-OR" and "EX-NOR" have to be converted into "AND" or "OR" because such as "EX-OR" cannot be processed by one neural layer.

The processings are not limited to the one expressed by logical elements. It can be decided by the character of output data.

As mentioned above, high quality recognition processing is possible by the above each embodiment because good thinned configuration can be extracted in high speed and a thinned configuration or the characteristic value of thinned configuration is inputted to recognition portion. Necessary recognition processing can be executed surely by exceedingly efficient structure because the recognition portion has a layer structure corresponding to the abstraction degree of data, and has data input structure. Therefore, extremely precise configuration recognition is possible: it is possible to verify seal-imprint or check to find the lack of wiring of print wiring board or so, and it is possible to realize a security system structured to process one's appearance by thinning data. As mentioned above, the present invention can offer an image processing system able to perform configuration recognition using thinning data with smaller memory capacity in high speed more precisely.

A neural network for performing configuration recognition according to configuration vector data is described below.

As for the data for recording a configuration, vector data is often used for configuration recognition because the data quantity is smaller than raster data and it is easy to indicate a configuration by enlarging, reducing or deforming.

Vector data is inputted to the predetermined neural layer of configuration recognition means so as to recognize a configuration. Configuration recognition means, comprises minimum neurons necessary to recognize configuration, configuration recognition is accurately performed with small memory in high speed.

In such an image processing system, characteristics data of the contour can be given to recognition portion 100 by performing thresholding, binarizing and contour extracting on the image to be processed, thereby generating the vector data of the contour. Figuration characteristics data, such as stroke, of a configuration can be given to recognition portion 100 by performing thresholding, binarizing and thinning on the image to be processed, thereby generating the vector data of the thinned image. For the vector data, it is considered as having arranged the coordinates of vector points in the order of trace, the number and the coordinates of corners of convexities and concavities, the judgment of existence of a hole and the number, the length of contour, and so on. For the generation of these data, CPU is used partially.

Vectorizing configuration performed in image processing portion 300 is explained below.

Figure 29:
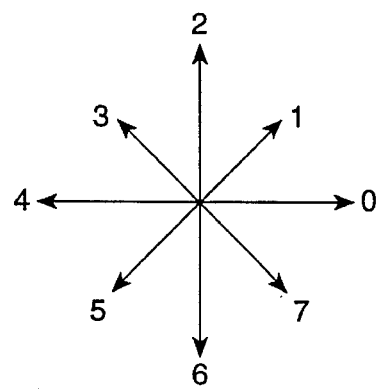
FIG. 29 shows Freemann's chain code.

In the present embodiment, boundary pixels of a configuration are extracted first and they are coded by Freemann's chain code. Freemann's chain code is shown in FIG. 29: set the right direction of the object pixel to be "0" the directions, added 45° each counterclockwise, are given from "1" to "7", respectively. When boundary pixels of a configuration are traced in a direction, the direction of the next boundary pixel to a boundary pixel is the chain code. It is possible to perform a similar processing using the mark equivalent to chain code.

Figure 30:
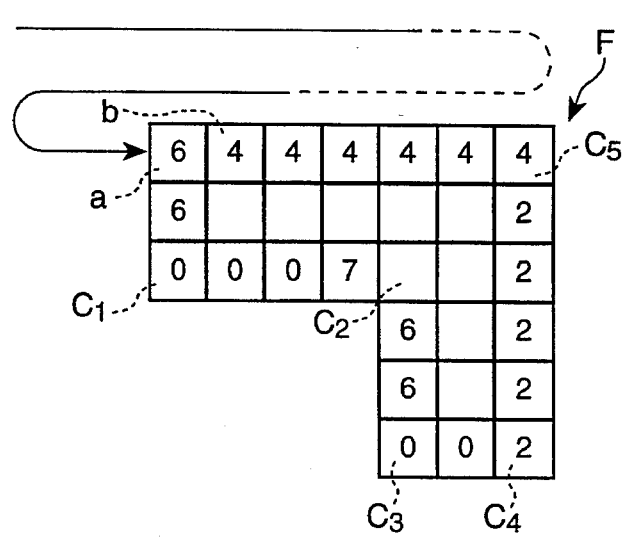
FIG. 30 shows a configuration with chain codes of counterclockwise direction.

In FIG. 30, there is shown a configuration F. On scanning to image along the ordinal scan line, the upper left pixel "a" is first found in the configuration F.

Chain code is generated counterclockwise from the start point "a" along the boundary. Each chain code indicates the direction to the following pixel from the current pixel (Watching "a", "a" is the current pixel.). The current pixel means the pixel to which chain code is to be given at that time.

FIG. 30 is a chain code diagram indicating chain code on each boundary pixel when the boundary is tranced in counterclockwise direction. In FIG. 30, the last pixel "b" adjacent to the start pixel "a" is given the chain code indicating the direction toward the pixel "a".

Chain code train in FIG. 30 is "66000766002222244444" which indicates a vertical downward line by "66", a horizontal right-ward line by "00", a vertical upward line by "22" and horizontal leftward line by "44".

When the configuration of FIG. 30 is vectorized, the start pixel "a" the pixel c1 on the right angle convex corner beneath the pixel "a" the pixel c2 on the right angle concave corner rightward from the pixel c1, the pixel c3 on the right angle convex corner beneath the pixel c2, the pixel c4 on the right angle convex corner rightward from the pixel c3 and the pixel c5 the right angle convex corner above the pixel c4 should be extracted as vector points from the boundary pixels above. Pixels "a", "c1", "c3", "c4" and "c5" on convex corners of vector points are located on the directions increased "2" of chain codes "66", "00", "22" and "44", respectively. In this calculation, "0" is deemed to be the result of the addition of "6" and "2". It will be understood from the above that the chain code reflects the characteristics of boundary of a configuration.

However the corner point c2 on the right angle concave corner should be extracted as a vector point, the corner has no chain code because it is not a boundary pixel. This is one difficulty in vectorizing. The solution of this difficulty according to the present invention is described later. The continuity of one chain code means a straight line.

Hereafter, a description is made concerning the chain code counterclockwise for outer boundary.

When a pixel has a chain code of "k" the chain code "k'" of the following pixel is as follows;

a) when "k" is even number
k'≠(k−2) and (k−3)
b) when "k" is odd number
k'≠(k−3)

where, k' is calculated under the modulus of "7", therefore "0"−"2"="6".

FIG. 29, k' never becomes "1" and "2" when k=4. Therefore, the chain code of one pixel limits the chain code of the following pixel.

The pixel of the chain code is a pixel on the right angle convex corner when k'=(k+2), which is applied to be a vector point.

As mentioned, it is indispensable to extract a corner of the characteristics of a configuration for performing vectorizing. It is also important to make high data efficiency so that middle pixels on straight line or similar straight line are not extracted.

Figure 31:
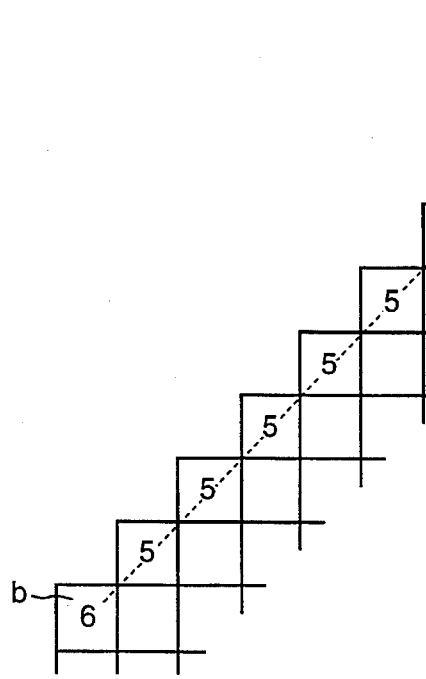
FIG. 31 shows a process manners for liner portion.

FIG. 31 shows the line in the oblique direction of down and left, whose chain code train is "5555555556". As for a line, the pixel on the both ends are to be vector points and other pixels are not to be vector points. That is, when the same chain code exist continuously, the first pixel of the continuity "a" and pixel "b" corresponding to the first chain code after the end of the continuity are to be vector points. This is applied in the same way to a horizontal line, vertical line, oblique lines in the directions of down left, up right, and up left.

Figure 32:
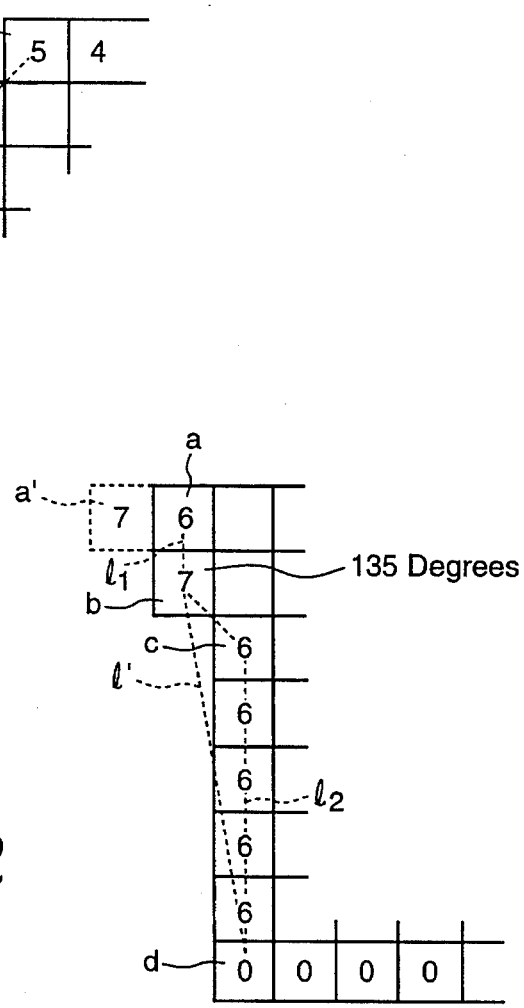
FIG. 32 shows a line consisting of pixels shifted by one dot successively.

In FIG. 32, the chain code of continuous pixels "a", "b" and "c" is "676" and "666-6" is followed to it Generating it, the pattern is (k−1), k, (k−1) ("k" is from 0 to 7 under the modules of "7".) and (k−1) continues after it. In this case, "k" and the mark other than (k−1) after the continuity of (k−1) are to be vector points. As in FIG. 32, the line of "ab" and line l2 are parallel lines with deviation of one pixel. Such deviation of one pixel does not have significance in many cases in digital configuration. Particularly when natural image is digitalized, a little difference of coordinates generates one pixel deviation because a coordinates are allocated to one of four adjacent pixels. Therefore, the lines with one pixel deviation have no influence for reproduction of a configuration by indicating with polygonal line or with step style line connected two lines by another line. Data efficiency of vector points is increased by indicating with polygonal line. When the previous pixel of pixel "a" is "k" which is equal to that of pixel "a" ("7" of pixel a'), pixel "c" after pixel "b" is extracted as a vector point: this is the processing of line described previously.

The processing of right angle of concavity in a configuration is described below.

FIG. 33(*a*) shows a corner opens downward as well as leftward. The chain code train advances ". . . 007" on the horizontal line toward the corner point "a" then changes "66. . ." on the vertical line. In the chain code train, the last two chain codes on the horizontal line "b" and "c" together with the first chain code on the vertical line "d" define the right angle corner. In FIG. 33(*a*), the chain codes defining right angle corner are "076". It means that there exists a left-and-downward opening right angle corner when the chain codes "076" are included in the chain code train.

Figure 33A:
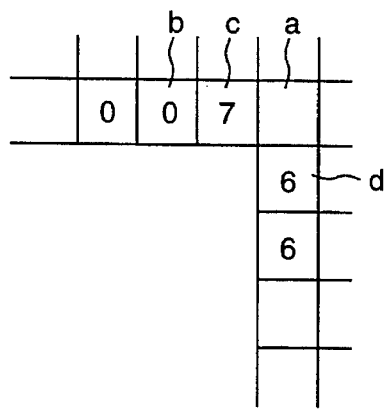
FIGS. 33(a) and 33(b) show a process of concavity with an angle of 90 degree.
Figure 33B:
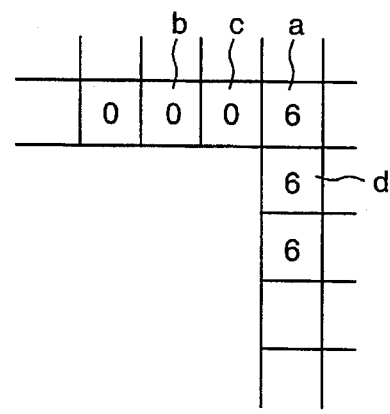

FIG. 33(b) shows a chain code diagram in which the chain code train in FIG. 33(a) is changed according to the present invention. In FIG. 33(b), the last chain code on the horizontal line of "i" is changed from "7" to "0" and a new chain code "6" is appended after the changed chain code as the chain code of "a". Therefore, the chain code train "076" is modified to be "0066". By this modification, the last chain code "c" on the horizontal line indicates the corner point "a" and the chain code on the corner point indicates the first pixel "d" on the vertical line.

This shows the structure interpretation as follows. When chain code train is k, (k–1), (k–2), it is changed into k, k, (k–2), (k–2) and the first (k–2) is the vector point.

Figure 34:
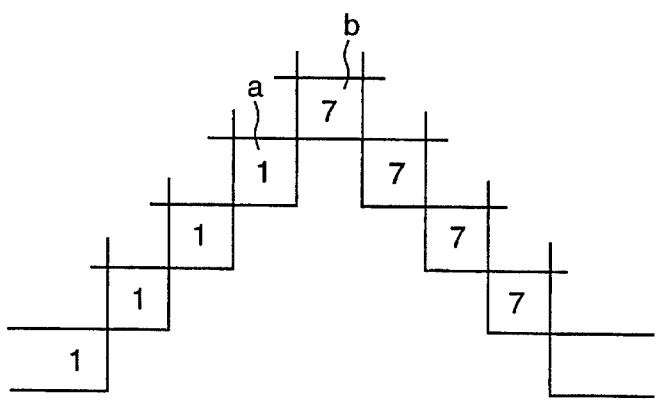
FIG. 34 shows another process of concavity with an angle of degree.

Such a pixel on a concave right angle corner is indispensable. When the both sides of the concave right angle are horizontal or vertical, it is necessary to add a chain code as above. When the both sides of the concave right angle are 45° inclination, the pixel on the right angle is expressed as a boundary pixel. In FIG. 34, the concave right angle is expressed with chain codes of "1" and "7" ("a" and "b" in FIG. 34), and the right angle corner is "7". This shows the structure interpretation as (k–2) is the vector point in the chain code of k, (k–2) (k is 1, 3 and 7 under the modules of "7").

In this way the corner of a concave right angle is extracted as a characteristic pixel. The corners of a convex right angle and on acute angle are to be extracted as characteristics points.

Figure 35:
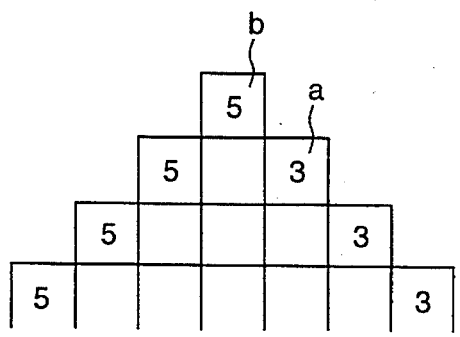
FIG. 35 shows a process of a convexity with an angle of 90 degree.
Figure 36:
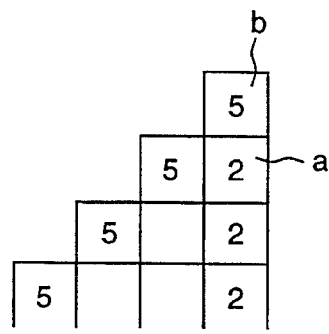
FIG. 36 shows a process of a convexity with a sharp angle.

FIG. 35 shows a configuration including a convex right angle. FIG. 36 shows a configuration including an acute angle.

In FIG. 35, "ab" (chain code "35")expresses the right angle corner. In FIG. 36, "ab" (chain code "25") expresses the acute angle corner Expressing these code train by k and k' the condition of them are as follows.

k' is (k+2)or (k+4).

k and k' are from 0 to 7.

k and k' are under the modules of "7".

The pixel of k' is to be vector point.

The processing above is processing for outer boundary. The processing for inner boundary, that is, the processing for a hole, can be performed in the same way by adding codes to boundary pixels in the opposite direction of the outer boundary.

FIG. 37(a) shows a chain code diagram of an inner boundary of a rectangle added clockwise. The chain code train is "0007666544432221". When the last chain code of the train is deemed to be continued to the first thereof, the concave right angle corners are defined by the chain codes "076", "654", "432" or "210", similarly to the outer right angle corner.

The chain code trains are processed or modified similarly to the outer boundary, that is, "076" is changed to "0066", "654" is changed to "6644", "432" is changed to "4422" and "210" is changed to "2200", as shown in FIG. 37(b).

An example for generating chain code train is explained here. With regard to the generation of chain code train, the first boundary pixel must be found first. It can be recognized from the situation of peripheral pixels by limiting the scanning direction.

When the direction of scanning is from leftward to right ward as well as from upward to downward—the usual scanning direction—, as shown in FIG. 38, boundary pixel "a" without no neighbors on upside and leftside of it can be applied as the first boundary pixel; and as shown in FIG. 39, boundary pixel "a" with a neighbor in left down direction, without a neighbor below can be applied as the first boundary pixel. Finding the first boundary pixel, then, the next chain code is searched successively along the boundary pixels clockwise or counterclockwise within the range of it, as the chain code of the next boundary pixel is limited to the predetermined range, as mentioned above. When an outer boundary pixel is given a chain code counterclockwise, the scanning direction is also counterclockwise: when it is given a chain code clockwise, the scanning direction is also clockwise. The chain code generation of inner boundary pixels can be processed with the same algorithm as the outer boundary pixels. That is, when the chain code of the previous boundary pixel is "k", the next boundary pixel is searched counterclockwise successively from (k–1) direction if "k" is an even number: when the direction of the first boundary pixel is found is the chain code of the boundary pixel, a counterclockwise chain code of outer boundary pixels is generated. When "k" is an odd number, the next boundary pixel is searched counterclockwise from the direction of (k–2) successively. Using this algorithm, it is efficient to generate all chain codes by scanning once a frame memory, and it is possible to distinguish if the boundary pixel is inside or outside. Therefore, it is possible to reproduce a configuration from the vectorized data and obtain significant information to paint out it. When the chain code is decided to trace the boundary of a configuration in the opposite direction of the above, it is possible to perform the equivalent processing if the relationship of increase and decrease of the code above is reversed. It is possible to perform the equivalent processing using other codes equivalent to chain code.

As shown in the embodiments above, by extracting vector points according to the chain code or any other equivalent code, vector data can be easily be generated without complex angular calculation. A high quality configuration can be reappeared from the vector data.

In the embodiment above, vector data is obtained from boundary pixels. The vector data can be the pixel data obtained by thinning a configuration.

As mentioned, practicing the embodiment above, it is possible to perform high-quality recognition processing with minimal number of neurons because satisfactory vector data including concave right angle is generated and the vector data is given to the recognition portion. It is also possible to perform necessary recognition processing surely by extremely efficient structure because the recognition portion itself has the layer structure corresponding to the abstraction degree of data, and the structure for inputting data is also corresponding to the abstraction degree of data. Using it, seal-imprint verification or quality control such as finding a wiring break of a print wiring board, for example, can be executed precisely.

As shown above, the present embodiments can offer an image processing system for perform a configuration recognition more accurate in high speed with small memory capacity.

Hereafter, a neural network for performing recognition processing using characteristics values based on density coocurfence matrix.

Assuming the distance in x-direction and y-direction to be δ(x, y), density coocurrence matrix is expressed by matrix the relationship between two pixels of the distance: the number of change from density d1 to density d2 is indicated on the row d1, column d2. Another density coocurrence matrix is proposed as: arranging the relationship on the objective row, the summation number of the change from d1 into d2 and from d2 into d1 is indicated on row d1 column d2 and on row d2 column d1 (This is called Haralick's characteristics value. ). Contrast, second order moment, correlation and so forth can be calculated from this density coocurrence matrix.

In an image processing system relates to the present invention, a configuration data output means and a neuron are set parallelly: the configuration data output means calculates a density coocurrence matrix of pixel data of a configuration, as well as extracts characteristics data to show the characteristics value of a configuration from the density coocurrence matrix; the neuron is connected to the configuration data output means and outputs the data corresponding to the comparison of threshold and the total sum of the inputted data multiplied a predetermined weight. An image processing system relates to the present invention is characterized in that it comprises a neural layer of layer structure corresponding to the abstraction degree of the above characteristics data, and a means for recognizing a configuration based on the characteristics data.

The characteristics data obtained from a density coocurrence matrix is inputted to the predetermined neural layer in the configuration recognition means and configuration recognition is performed. The configuration recognition means comprises necessary minimum number of neurons for configuration recognition and performs it in high speed and surely with small memory.

The generation of density coocurrence matrix to be preformed in image processing portion 300 is described below.

Figure 40A:
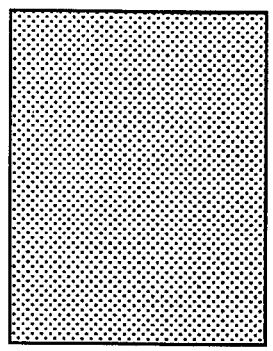
FIGS. 40(a), 40(b), 40(c) and 40(d) show configurations to be processed.

In FIG. 2, an original image to be processed is stored first in memory 330. The original image is represented by FIG. 40(a). When the distance of density coocurrence matrix is $\delta(x, y)$, the original image is shifted by x in x-direction and by y in y-direction and stored in the frame memory 331 (memory 330 in the output side). Here, $\Delta x$ corresponds to the shift quantity in x-direction (the right direction is the positive direction in a display, for example) and $\Delta y$ corresponds to the shift quantity in y-direction (the down direction is the positive direction in a display, for example). For shifting an image, reading timing from the memory 330 and writing timing to memory 331 are shifted. And other methods can be applied.

The original image is inputted to status computation portion 325 through numerical computation portion 321. The shifted image is inputted to converting portion 313 from memory 331. The both images are inputted synchronously.

In status computational portion 325, a density d0 to be processed is registered. The status computation portion 325 outputs a signal F only when the density of the pixels in the original image coincides with d0. F is called "objective pixel flag" hereinafter.

The converting portion 313 has an address input A and data input D/I. The counter in converting portion 313 is increased by a value inputted from D/I of the data stored in an address designated by address input A.

The objective pixel flag F has a value of "1" which is inputted to D/I of converting portion 313. Therefore, density input times of each density of the shifted image is counted. It is equivalent to counting the number of change from density d0 into density "d" on distance of $\delta(\Delta x, \Delta y)$ (the processing of one row of the density coocurrence matrix). By changing d0 to each of all densities, total elements of density coocurrence matrix is calculated.

Usually the density coocurrence matrix is generated according to an image diminished in gradation from an original image into approximately 16 gradations. In this case, d0 is changed into 16 gradation, all elements can be obtained.

For a process of one row, total data of the frame memories 330 and 331 are inputted one time to the converting portion 313. It is processed in one scan processing time. In 16 gradations image, total processing is performed in 16 scanning time. When one scan is processed in $\frac{1}{60}$ second, the processing is completed in 0.27 second. Such general density coocurrence matrix is evaluated by calculating contrast x1, second order moment x2, correlation x3, the mean value of peripheral distribution in m-direction and in n-direction, the scattering of peripheral distribution in m-direction and n-direction, and so forth. These computation is rather complicated.

For overcoming it, inventors propose a simple characteristic value as below and obtain good results in texture analysis.

Figure 40B:
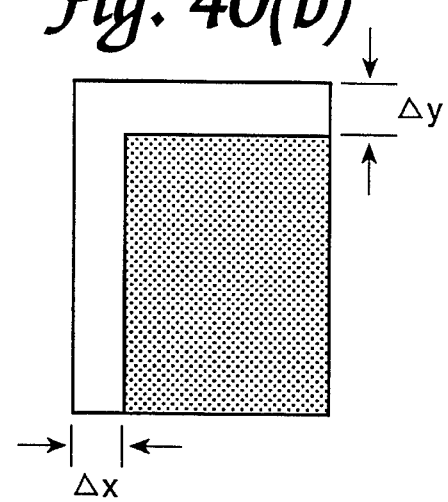

As shown in FIGS. 40(a)–40(d), a shifted image is generated, similar to the above processing, by a distance $\delta(\Delta x, \Delta y)$ (FIG. 40(b), shifted image, hereafter), from original image (FIG. 40(a)). The circuit for the calculation is the same one as in FIG. 2. But it is different in that both data from memories 330 and 331 are inputted to numerical computation portion 321 and each pixel is compared. Numerical computation portion 321 outputs a comparison signal C. The signal C is "0" when both data coincide with each other, and is "1" when both data are different from each other. The comparison signal C is inputted to the data input D/I of the converting portion 313 which multiplies the value of the signal C. A constant value, for example "0", is inputted to the address input of converting portion 313, therefore, the total counted value is stored in one address.

Figure 40C:
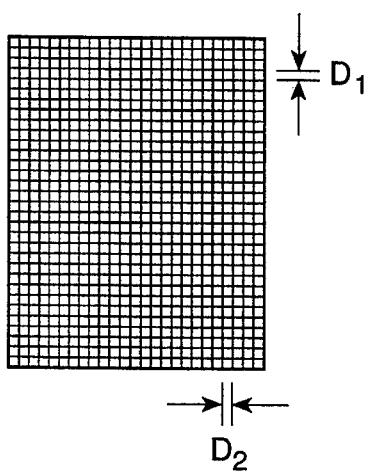

The original image in FIG. 40(c) has rough checked pattern with horizontal pitch D2 and vertical pitch D1. On comparing the original image with the shifted image, the number of discordance of both images is "0" or the minimum every time when x changes D2 and $\Delta y$ changes D1 on $\delta(\Delta x, \Delta y)$.

Figure 40D:
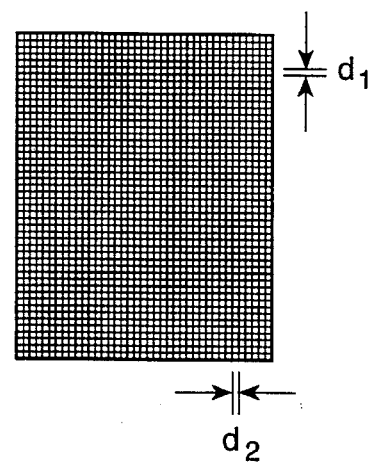

While in FIG. 40(d), a fine checked image is shown with the pitch of d1 in y-direction and d2 in x-direction. On comparing the image in FIG. 40(d) with the shifted image thereof, the number of discordance becomes "0" or the minimum every time when $\Delta x$ changes by d1 and $\Delta y$ changes by d2.

As will be understood from the description above, the period of the number of discordance for $\delta$ represents a texture characteristics. This period is independent from the density itself, rather presents the roughness or fineness of the texture. It means that human impression of a texture is quantitatively evaluated. Since the evaluation is performed by more simple calculation than the conventional parameters, it is possible to process in high speed, as well as possible to obtain the evaluation result according to the computations of many $\delta$s.

Figure 41:
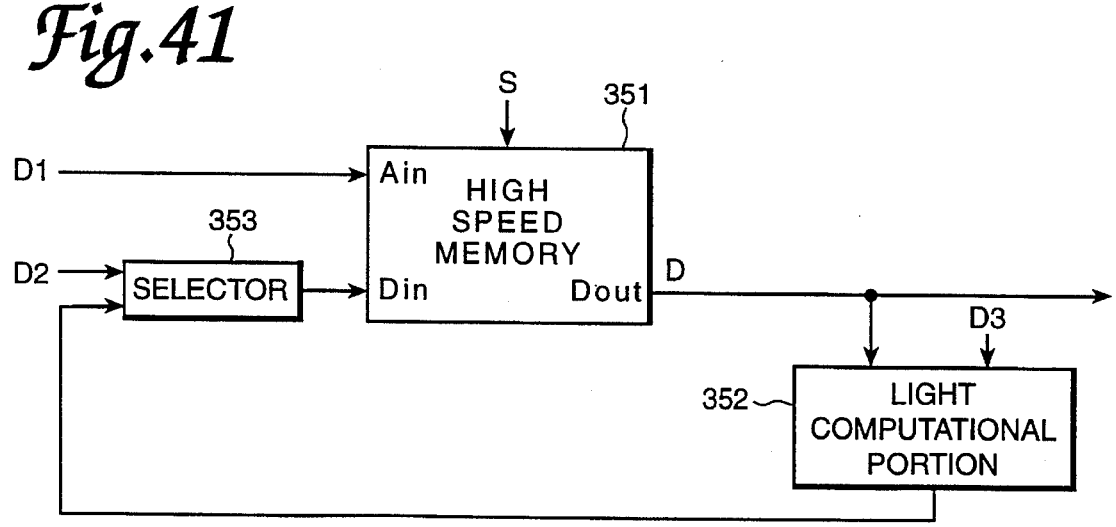
FIG. 41 shows an embodiment of a converting portion.

FIG. 41 shows an example of the converting portion 313 in the above circuit. Converting portion 313 connects light computational portion 352 by a junction of "D out" of the output of high speed memory 351. The output of light computational portion 352 is inputted to data input "D in" of high speed memory 351 through selector 353. The address input A of converting portion 313 is connected to the address input "A in" of the high speed memory 351. The data input D/I of converting portion 313 is inputted as the data D3 of the light computational portion 352. When high speed memory 351 is in read mode, the high speed memory 351 outputs data D stored in the address D1. The data D is inputted to the light computational portion 352. The light computational portion can be defined as various computational modes. For the performance as a counter, the light computational portion 352 is defined as an adder. Therefore, D3 is added to D, then the additional result (D3+D) is outputted from the light computational portion 352. The outputted value is inputted through the selector 353 to the data input "D in" of the high speed memory 351 and stored in the address D1 Since D3 is "1" data in an address of the high speed memory 351 is increased by "1" in every process cycle.

Converting portion 313 has the same performances as the above, by inputting constant "1" as D3 as well as inputting signal F or C to chip select terminal or chip enable terminal of the high speed memory 351.

As mentioned, the texture characteristic value calculated by density coocurrence matrix is high quality compressed data showing the characteristic of density distribution of a whole image, which can represent the impression to give visual system of organism. Therefore, it is possible to perform extremely effective recognition processing by giving such characteristic value to recognition portion 100: practical image processing and recognition system can be realized. When pixel data itself is the input data as conventional neural network, enough recognition processing cannot be performed because of an inappropriate learning method in many cases as well as the necessity of numerous neurons.

When data is obtained by density coocurrence matrix, the data has high abstraction degree compared with that of pixel data, concerning to contrast x1, the second order moment x2, correlation x3, the mean value of peripheral distribution in m-direction and n-direction, the scattering of peripheral distribution of m-direction and n-direction and so on. It means that contrast etc. have higher degree data than 0-degree of pixel data. Therefore, in neural network, pixel data have to be inputted to the first neural layer, and the data of contrast etc. have to be inputted to the later step of neural layer.

As mentioned, each example above can perform processing with small quantity of data and texture analysis is executed in high speed because density coocurrence matrix is obtained according to the comparison of an original image and a shifted image. The characteristics value of "pitch" which is the one near human impression, can be obtained. It is utilized for quality control of textile, knitting, etc. The above each embodiment can also perform high quality recognition processing by the minimal number of neurons because characteristics data such as contrast etc. obtained by density coocurrence matrix are given to recognition portion. Necessary recognition processing can be performed surely by extremely efficient structure because recognition portion itself is structured by layers according to abstraction degree of data, and the structure for inputting data of it is also corresponding to the abstraction degree of data. It is possible to perform extremely precise configuration recognition: weather data, remote sensing data, marine data, for example, can be analyzed extreme precise level.

As described, the present embodiment can offer an image processing system for performing configuration recognition by the data obtained from density coocurrence matrix in high speed and more surely with small memory capacity.

Hereafter, the neural network for performing recognition using characteristic value of the configuration area or the one relating to it is explained below.

The area of each group in an image (one configuration, for example) can be used for an indication for distinguishing the image from other ones. The data based on area such as occupation ratio is often used as the characteristics value for the recognition of the configuration.

FIG. 41 shows an embodiment of converting portion 313 in processing portion 310. Light computational portion 352 is connected to the junction of "D out" which is the output of high speed memory 351 of such as static RAM. The output of light computational portion 352 is inputted to data input "D in" of high speed memory through selector 353. Address input A of converting portion 313 is connected to address input "A in" of high speed memory 351. Data input D/I is set as data D3 for light computational portion 352. On reading mode of high speed memory 351, it outputs data D in which the address D1 is stored, and data D is inputted to light computational portion 352. Light computational portion 352 is set so that various computation can be executed. When it is settled set to addition mode, data D is outputted from light computation portion 352 after added to data D3. The outputted addition result is inputted to data input "D in" of high speed memory 351 through selector 353, and stored in address D1 again. As D3 is timely given "1", the data in high speed memory 351 is increased by "1" in every cycle.

When area in a labeled image is calculated, light computational portion 352 is to be set in addition mode. That is, designating pixel value as address D1, the stored data in the address is inputted from high speed memory 351. The value added D3 to this data is stored again in address D1 in high speed memory 351 through selector 353. The number of pixels of each pixel value in an image is counted and each labeled area is calculated.

Vertical fillet diameter Fv and horizontal fillet diameter Fh are the length and width of a configuration, respectively. They are also calculated in converting portion 313. That is, maximal values of X-coordinates and Y-coordinates of a configuration are calculated for the one applied light computational portion 352 as a maximum extracting portion. Minimal value so x-coordinates and y-coordinates of a configuration are calculated for the one applied light computational portion 352 as a minimum extracting portion. Horizontal fillet diameter Fh is calculated by subtracting the minimal value from the maximal value of x-coordinates. Vertical fillet diameter Fv is calculated by subtracting the minimal value from the maximal value of y-coordinates.

Peripheral length is calculated by summing boundary pixels, for example, of each labeled area, which is calculated in converting portion 313 by setting light computational portion 352 as addition mode.

Occupation ratio, circleness and complicatedness are the data obtained based on area, which are calculated in CPU500. Occupation ratio is the area ratio of a configuration compared with the area of the minimal horizontal rectangle surrounding the configuration. It is calculated by the formula below.

$$\text{Occupation Ratio} = (\text{Area})/(Fh \times Fv)$$

Circleness "R" shows the similarity of the configuration contrast to a circle, which is calculated by the formula below.

$$R = 4\pi(\text{area})/(\text{Peripheral Length})^2$$

Complicatedness "θ" shows the complication of the configuration, and indicates the unsimilarity contrast to a circle, which is calculated by the formula below.

$$e = (\text{Peripheral Length})^2/(\text{Area})$$

As in the description above, area, fillet diameter and peripheral length is calculated in converting portion 313 in image processing portion 300. Occupation ratio, circleness and complicatedness is calculated in CPU500. These characteristics data of area, fillet diameter, peripheral length, occupation ratio, circleness and complicatedness is high quality compressed data to be recognized by human being's visual sense for expressing the characteristics of a figure. Accordingly, recognition portion 100 can execute configuration recognition in high speed by the minimal number of neurons because of the structure to be inputted such characteristics data directly to recognition portion 100. When pixel data itself is input data as in conventional neural network, enough recognition process cannot be executed in many cases because of inappropriate learning method.

As mentioned, above embodiments can perform high quality recognition processing by the minimal number of neurons because characteristics value of a configuration near human being's impression such as occupation ratio, circleness and complicatedness obtained based on area is directly given to recognition portion. Recognition portion itself has the layer structure corresponding to the abstraction degree of data, and the structure for inputting data is also corresponding to the abstraction degree of data. Therefore, necessary recognition processing can be executed surely by such extremely efficient structure of recognition portion. Consequently, it is possible to execute exceedingly precise configuration recognition.

As above, the present embodiment can offer an image processing system for performing configuration recognition in high speed with small memory capacity more surely.

Euler number is a significant indication for showing global configuration characteristics. The number of holes of a configuration can be obtained from it. The number of holes is an important characteristics for recognizing the configuration.

Figure 42:
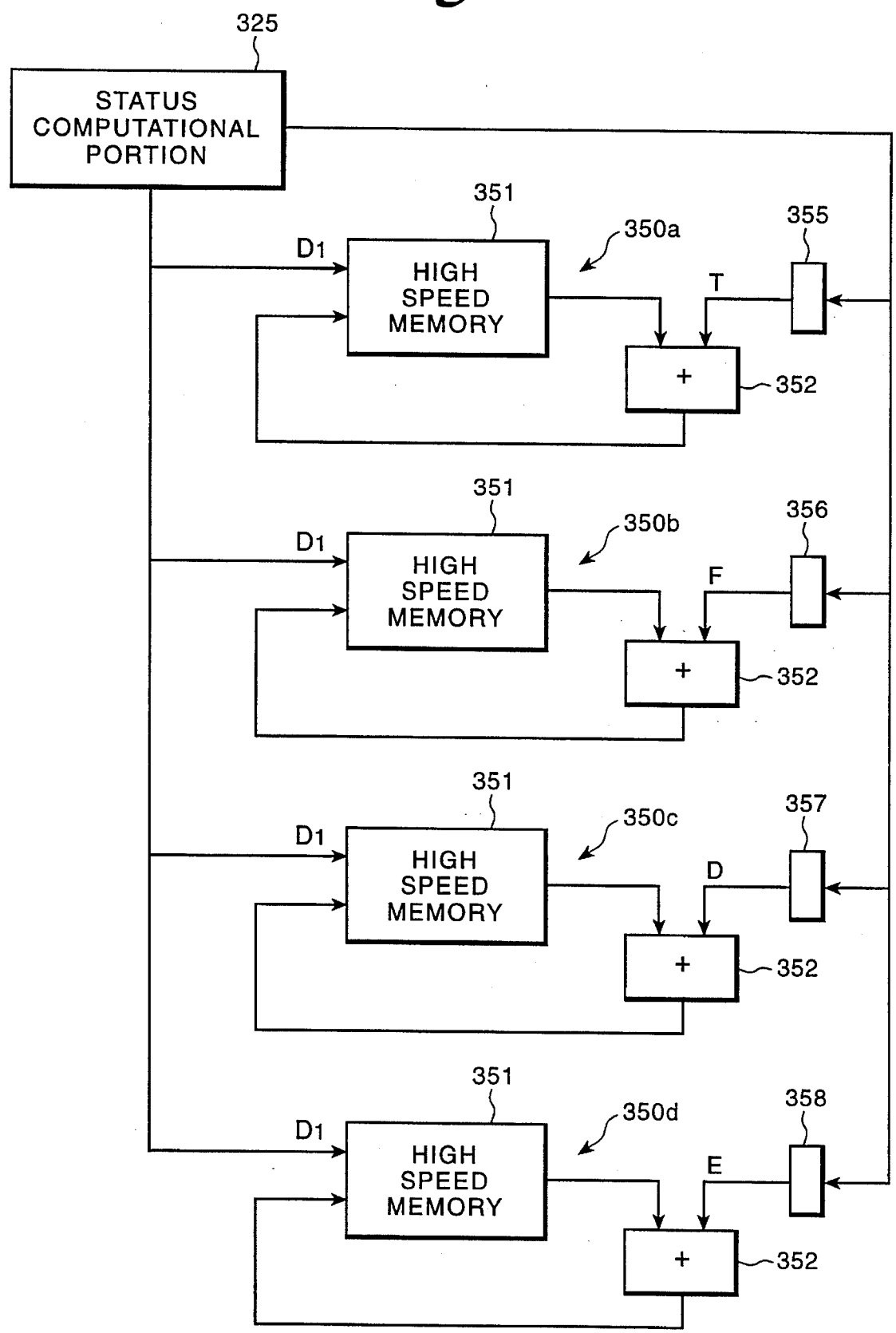
FIG. 42 shows another embodiment of the converting portion.

FIG. 42 is an example of converting portion 313 for calculating Euler number. It comprises circuits 350a, 350b, 350c and 350d which are similar to the one in FIG. 41. Status computational portion 325 (shown in FIG. 2) is connected to each address input of high speed memory 351 of them. Status computational portion 325 inputs the pixel value of each pixel as D1 to high speed memory 351, and outputs the number of indications T, F, D and E for calculating Euler number as information I (T, F, D, E) of sequential bit train. The information I (T, F, D, E) is inputted to each light computational portion (adder) 352 through "T" extracting circuit 355, "F" extracting circuit 356, "D" extracting circuit 357 and "E" extracting circuit 358. Each extracting circuit extracts each number of T, F, D and E, which are stored in each high speed memory 351 after the accumulation of each labeled area. Euler number is indicated by G4 in the case of 4-neighborhood and G8 in the case of 8-neighborhood. Assuming each labeling area to be V, it is calculated by the formula below.

$$G4 = V - E + F$$

$$G8 = V - E - D + T - F$$

Area V is already calculated by converting portion 313 which is equivalent to light computational portion 352 set in addition mode. As explained preciously, labeling is performed in sequential processing portion 314 (shown in FIG. 2). After performing labeling, the number of groups in the image is calculated. The number of holes of a configuration is calculated as the difference between the number of groups and Euler number.

Image processing portion 300 calculates Euler number, as well as outputs characteristics data such as the number of groups, the number of holes, and so on. The characteristics data of the number of holes, etc. is high quality compressed data expressed the characteristics of a configuration recognized by human being's visual sensor. Therefore, recognition portion 100 can perform configuration recognition in high speed by the minimal number of neurons by inputting directly such characteristics data to recognition portion 100. When pixel data itself is input data as in conventional neural network, it is impossible to perform enough recognition processing because enormous number of neurons and inappropriate learning method in many cases.

As explained above, the present embodiment can offer an image processing system for executing configuration recognition more surely in high speed with small memory capacity.

Hereafter, a neural network for performing recognition processing based on the minimal width data of a configuration is described.

The minimal width of a configuration is the minimal distance between parallel line across a configuration. It is an important characteristic value as is the maximal length of a configuration and which is indispensable for calculating occupation ratio, the ratio of the maximal length to the minimal width, for example. Though the algorithm for calculating the minimal width is not known generally, it can be conceivable that the minimal value among all "Fh" s and "Fv" s is approximately to be the minimal width when a configuration is rotated by 1 (deg) until 360 (deg) and the fillet diameter (Fh, Fv) on every rotation is calculated.

The data of the minimal width is inputted to the predetermined neural layer of configuration recognition means and configuration recognition is performed. The configuration recognition means, comprising the necessary minimal number of neurons, performs configuration recognition surely in high speed.

The calculation method for the configuration minimal width performed in image processing portion 300 is describe below.

Figure 43:
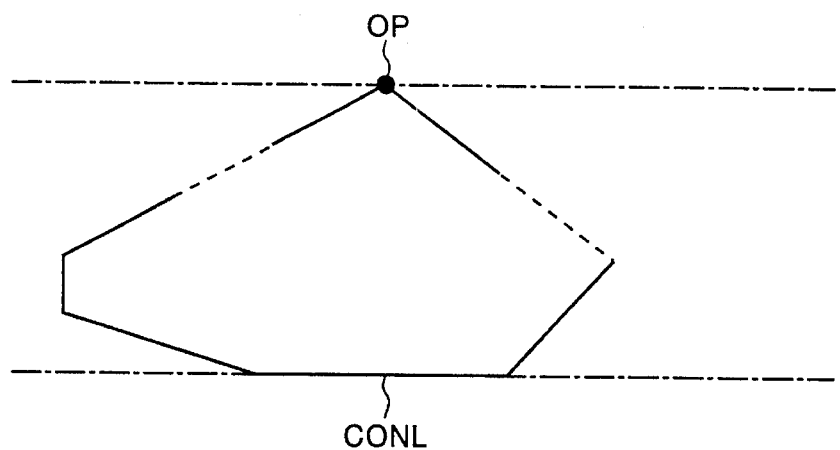
FIGS. 43 and 44 show an diagram for expressing an algorithm for obtaining the minimum length.
Figure 44:
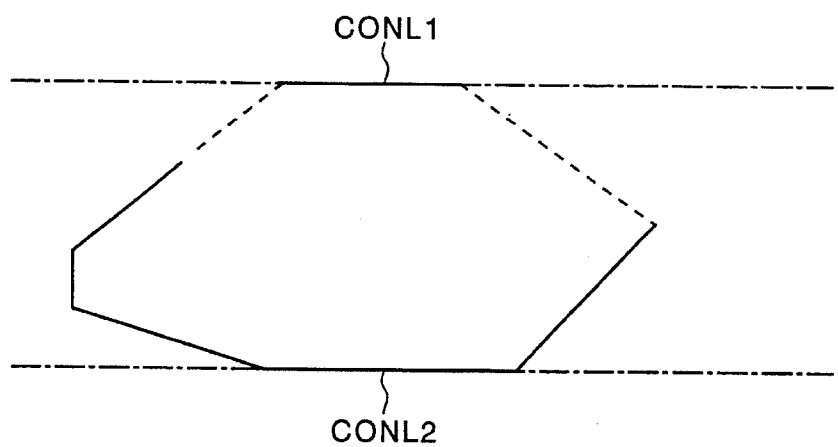

As shown in FIGS. 43 and 44, it is clear from the inventor's study that there are only 2 types concerning to the relation between a digital image and parallel lines across the minimal width of the configuration. The condition of one of the types is, overlapping the one side of parallel lines (indicated by alternate long and short dash line) on a side of convex hull CONL, another side of parallel lines extends through the top point opposite to a side of convex hull OP (shown in FIG. 43). Another condition of the types are that, both of the parallel lines overlap the sides of convex hull CONL1 and 2 (shown in FIG. 44). In the latter case, there is no influence on the distance of the parallel lines even when one of the end points of a side of convex hull is considered as the top point opposite to a side of convex hull. Therefore, it can be considered without considering other cases that the minimal width of a configuration exists within the distance between a side of convex hull and a top point opposite to a side of convex hull.

Though it is clear that the minimal width is within the distance between a side of convex hull and a top point opposite to a side of convex hull, the distance between a line and a point is expresses only by complicated function. On the other hand when the lines are parallel to x-axis or y-axis, the distance between a line and a point can be expressed by parameter of first dimension, and the calculation of the distance is extremely easy. Affine transformation is the computation of the addition of x-coordinates multiplied by sine and y-coordinates multiplied by cosine, which is extremely simple compared with such as the computation for obtaining square root. When calculating the distance between a side of convex hull and a top point opposite to a side of convex hull, it is not necessary to perform affine transformation to the side of convex hull itself. It is enough to perform it to one end point of a side of convex hull and the top point opposite to a side of convex hull. Assuming that a side of convex hull is performed affine converting in order to be parallel to x-axis, the difference of y-coordinates between one end point of the side of convex hull and the top point opposite to a side of convex hull is the distance. Assuming that a side of a convex hull is performed affine converting in order to be parallel to y-axis, the difference of x-coordinates between them is the distance. The minimal width of a configuration can be obtained by calculating the distance of all the pairs of the side of convex hull and the top point opposite to the side of convex hull and selecting the minimal value among them.

The number of the points of contact of envelop and the configuration is 2n when the number of the top points opposite to a side of convex hull is "n". When conventional affine transformation and fillet diameter is performed by 1 (deg), all the points contact to the convex hull is the object of the processing on every affine transformation and the number of pixels to be processed is 360n. Even if such a large computation is performed, the result is nothing but an approximate value.

The minimal width in strict meaning of a configuration can be calculated in extremely high speed by the present embodiment. It is necessary to extract the points contact to the convex hull, and the combination of the point opposite to a side of convex hull and the side of convex hull corresponding to it.

There is well-known method as extracting method of the points contact to convex hull in A. F. Rosenfeld and A. C. Kak, translated by Makoto Nagao, "Digital Picture processing" Kindaikagakusha Company Ltd., 1986, the ninth impression, p406). The extracting method of the points contact to convex hull in Japanese Patent Application number Sho 62-105098 is the processing method in exceedingly higher speed than it.

In the method of extracting the points contact to convex hull extracts the minimal number of candidate pixels in status computational portion 325, and after it, the points contact to convex hull is defined in CPU according to the method in the above application.

Various methods can be considered for extracting the combinations of the sides of convex hull and the top points opposite to a side of convex hull. According to the inventor's study, the method below is the most superior.

The pixels to give vertical fillet diameter or horizontal fillet diameter is extracted first. Here, the case for vertical fillet diameter is described referring to FIG. 45. With respect to the method of the case for horizontal fillet diameter, it is possible to apply the same way by rotating the drawing in FIG. 45 by 90 (deg).

Figure 45:
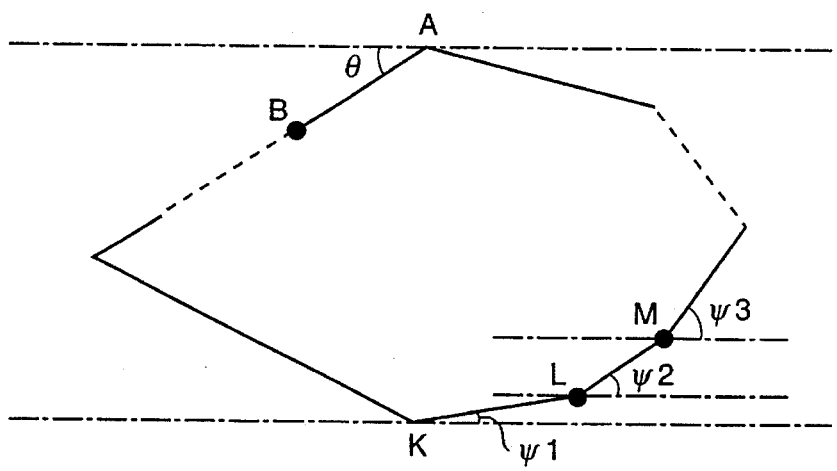
FIG. 45 shows a method for calculating minimum length.

In FIG. 45, the pixel to give vertical fillet diameter is A on the upper side and K on the down side. The points contact to convex hull is searched from start points A or K. The direction of chain code can be counterclockwise and clockwise. Here, counterclockwise direction is applied which is generally applied. Seeing in the chain order, the inclination from the point contact to convex hull A to the next pixel B θ, and the point contact to convex hull K to the next pixel is $\psi1$. The point contact to convex hull of smaller angle makes a side of convex hull and another one is the top point opposite to the side of convex hull. Here, $\psi1$ is assume to be less than $\theta(\psi1<\theta)$. The top point opposite to a side of convex hull does not always make a pair with a side of convex hull. For example when angle $\psi2$ from the point of convex hull L next to K and $\psi3$ from the point of convex hull M next to L are smaller than θ, the sides of convex hull KL, LM, M . . . have the common top point opposite to the sides of convex hull A. When $\psi1$, $\psi2$, . . . $\psi k$ are larger than θ, the point contact to convex hull A advances to the next top point contact to the side of convex hull B. The combination of the sides of convex hull and the top points opposite to a side of convex hull, and the inclination angles of the sides of convex hull can be obtained by performing such examination on all the points contact to convex hull once, that is, it can be obtained by comparing the angles (n−1) times when the number of the points contact to convex hull is "n". In the example above, the inclination angles are $\psi1$, $\psi2$, . . . .

As mentioned, in this embodiment, the minimal width of a configuration in strict meaning can be calculated in extremely high speed, different from conventionally.

As described above, image processing portion 300 extracts the minimal width of a configuration efficiently and outputs the minimal width data in high speed. The minimal width data is high quality compressed data expressing the characteristics of a configuration same as what is recognized by human being's visual sensor. Therefore, recognition portion 100 can perform configuration recognition processing in high speed by the minimal number of neurons by the structure for inputting directly such characteristics data to recognition portion 100.

As mentioned above, it is possible to execute extremely precise recognition processing by the minimal number of neurons by each embodiment above because the minimal width data is extracted in high speed and efficiently from the configuration to be processed, which is inputted to the recognition portion as characteristics value. As the recognition portion itself has the layer structure corresponding to the abstraction degree of data, and the structure for inputting data is also corresponding to the abstraction degree of data, necessary recognition processing can be executed surely by such extremely efficient structure. Consequently, extremely precise configuration recognition and character recognition can be possible. Extremely precise quality control can be possible, such as seal-imprint verification, examination for finding broken wiring on print wiring board, and so forth.

As described above, the present embodiment can offer an image processing system for performing configuration recognition in high speed and more surely with small memory capacity.

Next, neural net work will be explained that performs recognition processing using maximal length and data related to it.

A proportion of configuration has not related to the size of the configuration and it is useful data for determing a configuration. For calculating this proportion, at first, the maximal value (maximal length) of distance between pixels constructing a configuration is necessary to be calculated. For calculating maximal length, assuming that number of all the pixels is n, distance calculation n (n−1)/2 $\alpha n^2$ has been necessary. Also after maximal length is calculated, distance between two parallel lines parallel to the direction of maximal length (width perpendicular to the maximal length) is necessary to be calculated. However, no effective processing manner has been found for calculating width perpendicular to the maximal length.

Next, the manner of calculating maximal length and width perpendicular to the maximal length will be explained that is processed in image processing portion 300.

Figure 46:
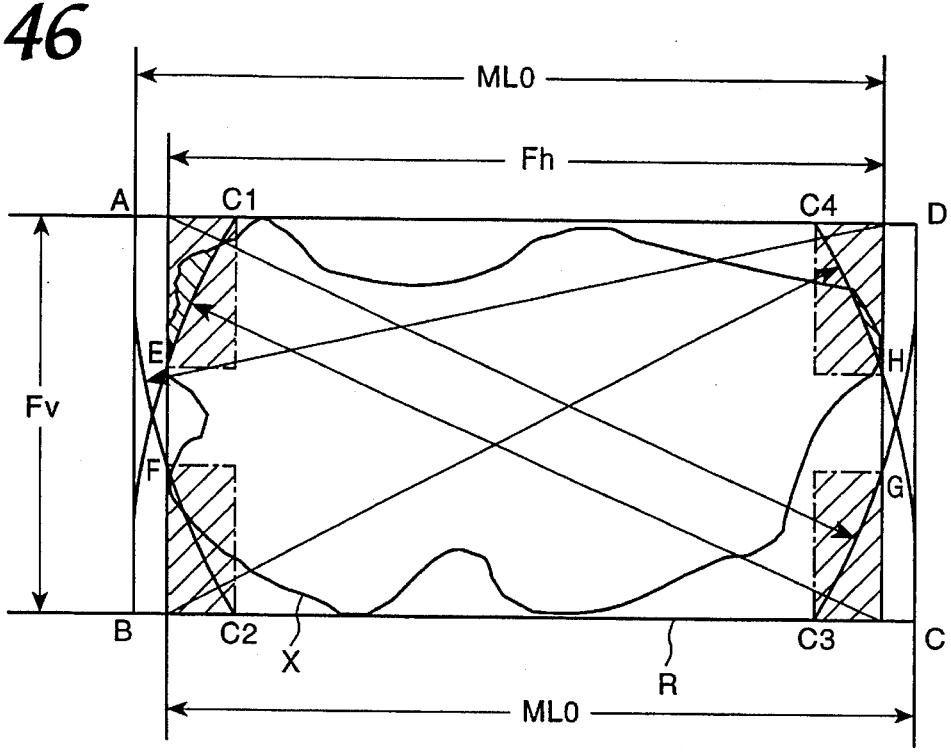
FIG. 46 shows an embodiment of a method for calculating maximum length.

In FIG. 46, when configuration X is given, a horizontal rectangle R circumscribing the configuration X gives a horizontal fillet diameter Fh and vertical fillet diameter Fv of configuration X. All pixels on this rectangle gives a fillet diameter and maximal length is the maximal value of distance between all pixels, then maximal length is bigger than any other fillets. Moreover, there is a possibility that some distances between those pixels that give fillet diameters are longer than the longest fillet diameters, and maximal length should be longer than the distance between pixels. For making processing of distance calculation the smallest, it is calculated by the maximal distance MLO between pixels that give a fillet diameter. However when calculation of a fillet diameter at one side is relatively difficult, it can be calculated by only fillet diameters that is easier to be calculated and not considering the size of themselves or calculated by longer fillet diameter.

When calculating fillet diameter, sequential comparison of the coordinate X and Y for each configuration, in light calculation portion of converting portion 313, is to be made and the maximal value and the minimal value of the coordinate X and Y will be eventually register to static RAM. This tells the differences between the maximal value and the minimal value is a fillet diameter.

As explained later, since pixels that give maximal value and width perpendicular to the maximal length are defined as points on envelope curve, extraction of points on envelope curve of each configuration can be made first or extraction of nominated pixels that give maximal length from points on envelope curve also can be made. The manner of extracting points on envelope curve and pixels explained above has been already stated in Show 62-105098.

In this embodiment, centering each mentioned apexes of rectangle R, which are A, B, C, D, an arc, the radius of which is MLO, the intersecting points of the arc and the longer side of a rectangle are designated as C1, C2, C3, C4. C1 to C4 are put in order to define a rectangle by moving from one longer side of the rectangle to the other longer side of the rectangle and return to the side on which they were at first. Also the intersecting points of the four arcs stated before and the shorter side of the rectangle are designated as E, F, G, H. E, F, G, H are put in order to define a rectangle by moving from one shorter side of the rectangle to the other shorter side of the rectangle, on which they were at first.

When considered with a reference of radius MLO, pixels giving maximal length exist only in the outside of the arc. Therefore, in FIG. 46, there exist pixels that give maximal length among inside the rectangle R and outside each arc (located by diagonal lines from upper left to lower right). Since calculation for determing this part takes relatively a long time, in practical processing, all pixels are defined to be processed that are existing in these four parts (located by diagonal lines from upper right to lower left), which are excluding rectangle C1, C2, C3, C4 and rectangle E, F, G, H from rectangle R. There is no possibility of two pixels' existence that give maximal length to inside of each four parts. The pixels must exist having rectangles C1, C2, C3, C4 inside. The distances is calculated and examined in combinations as follows.

That is, a combination of "pixels in a small rectangle defined by points A, E, C1 crossing the apex A" and "pixels in a small rectangle defined by points C, G, C3 crossing the apex C" and "pixels in a small rectangle defined by points D, H, C4 crossing the apex D" or a combination of "pixels in a small rectangle defined by points B, F, C2 crossing the apex B" and "pixels in a small rectangle defined by points C, G, C3 crossing the apex C" and "pixels in a small rectangle defined by points D, H, C4 crossing the apex D" or a combination of "pixels in a small rectangle defined by points C, G, C3 crossing the apex C" and "pixels in a small rectangle defined by points A, E, C1 crossing the apex A" and "pixels in a small rectangle defined by B, F, C2 crossing the apex B" or a combination of "pixels in a small rectangle defined by points D, H, C4 crossing the apex D" and "pixels in a small rectangle defined by points A, E, C1 crossing the apex A" and "pixels in a small rectangle defined by B, F, C2 crossing the apex B".

In calculating distances between each pixels in these combination, when the value that is bigger than MLO is found, C1 to C4, E, F, G, H should be renewed by new MLO and the combination of next pixels should be considered. As processing is continued, pixels to be processed will get smaller and processing at highspeed will be possible.

As above, when pixels that give maximal length are calculated, width perpendicular to the maximal length will be calculated as fillet diameter by affine transformation of a configuration in order to put these pixels in a horizontal position or a vertical position.

Figure 47:
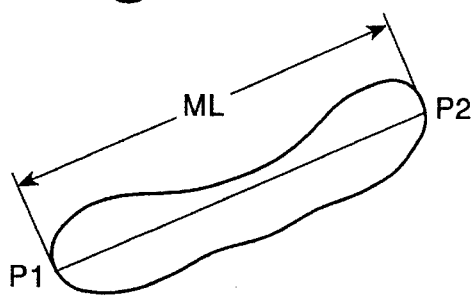
FIG. 47 shows an embodiment of a method for calculation a width perpendicular to the maximum length.
Figure 49:
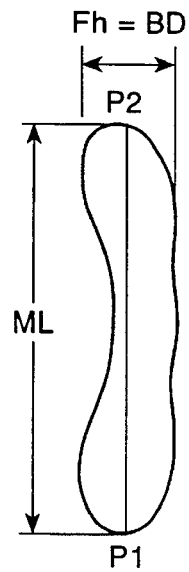
FIG. 49 shows a transformed configuration in vertical direction.
Figure 48:
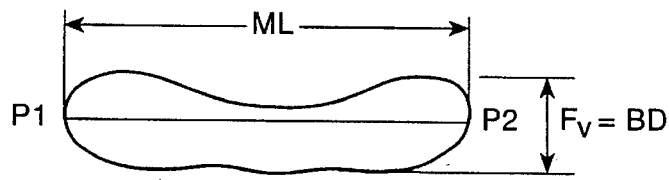
FIG. 48 shows a transformed configuration of FIG. 47 through affine transformation in horizontal direction.

As shown in FIG. 47, when pixels P1 and P2 that give maximal length ML are calculated, affine transformation should be performed in order to put P1 and P2 in a horizontal position, then a vertical fillet diameter Fv will be equal to width perpendicular to the maximal length BD. A vertical fillet diameter Fv is calculated by the example method as follows. When all border pixels of configuration are calculated, the maximal value ymax and the minimal value ymin of a coordinate Y are to be found and the difference (ymax−ymin) will be diameter Fv.

Pixels to be performed by affine transformation are not necessary to be all pixels constructing a configuration. Pixels that give maximal length are points on envelope curve, then affine transformation for points on envelope curve are enough to be performed or all border pixels also can be considered to be performed. Here, when pixels to be performed are made smaller, processing at high-speed will be apparently possible.

When maximal length and width perpendicular to the maximal length are calculated, calculation of various characteristics parameter will be possible. They are occupation ratio of a configuration, proportion ratio (maximal length/ width perpendicular to the maximal length), maximal length gradient (gradient to the direction of maximal length), Nth moment around the centriod to the direction of maximal length, multiplied moment of inertia, density projection in direction of maximal length, density projection in a vertical direction of maximal length and soon. Such characteristic parameter can be input to recognition portion 100. These are highly precise characteristics parameter representing a configuration and related to the impression given to sense of vision of organisms. In other word, by giving these characteristics parameter to recognition portion 100, recognition processing with high efficiency will be expected.

According to the example performed above, precise and effective extraction of the characteristics of data for maximal length and width perpendicular to the maximal length from a configuration to be processed, then characteristics parameter are input to recognition portion. That enables precise recognition processing with the smallest numbers of neurons. Moreover, since recognition portion itself has a layer structure that appropriates to abstraction degree of data, so-called data entry configuration, recognition processing as hoped can be made with highly effective structure. Through this process, highly precise configuration recognition or character recognition will be possible. For example, checking seals and quality control such as check of lacking wires on printed circuit board will be made very precisely.

As explained above, through this process, image processing device that can recognize configuration at high-speed and precisely with a memory of small capacity can be produced.

In next step, Neural Net Work that executes recognition processing using characteristics data of concavities will be explained.

For example, for recognition of characters, concavities and convexities are very important characteristics of a configuration. The smallest convex configuration surrounding a configuration is designated as a convex hull. A configuration generated by subtracting the original configuration from the convex hull is the concavities and holes of the original configuration. These are important for analyzing the configuration. Number of concavities, concavity chord length, inner peripheral length of concavity and concavity ratio are characteristics for recognizing a configuration of concavity.

Characteristic data of concavity will be input to predetermined neural layer of a means for configuration recognition so that configuration recognition is performed. Means for configuration recognition has the smallest number of neurons necessary for recognizing configuration and performs configuration recognition precisely at high-speed with a little volume of memory.

In next, a manner of recognizing characteristics of concavity which will be processed in image processing portion 300 will be explained.

Figures 50, 51:
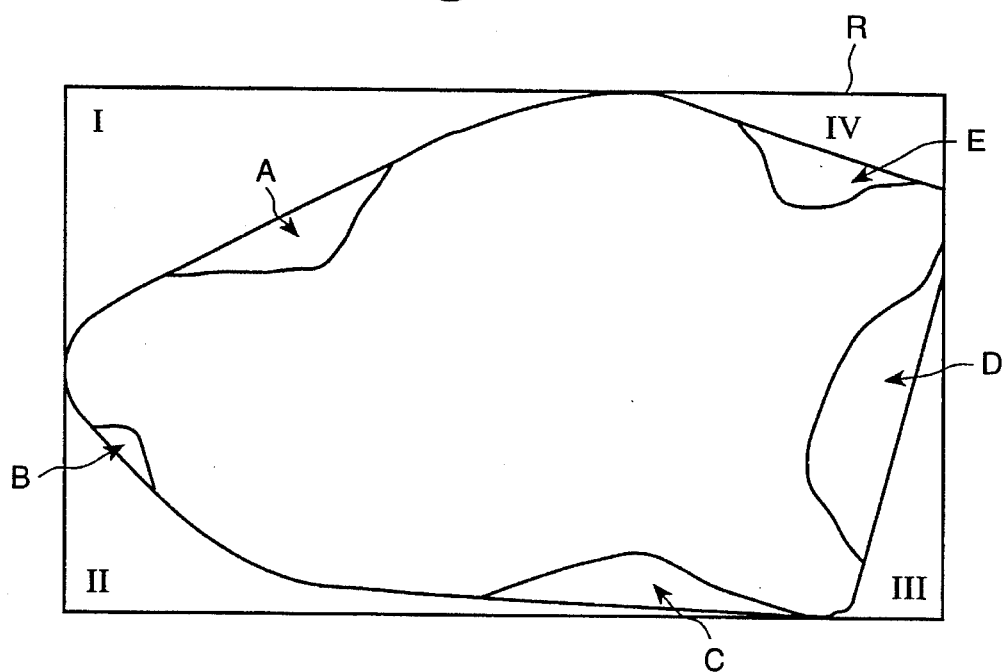
FIG. 50 shows a configuration with a concavity.
FIG. 51 shows a table of a data of boundary pixels.
Figure 52A:
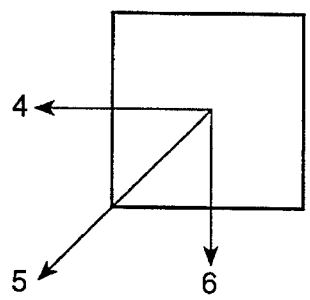
FIGS. 52(a), 52(b), 52(c) and 52(d) show chain codes for defining a concavity.
Figure 52B:
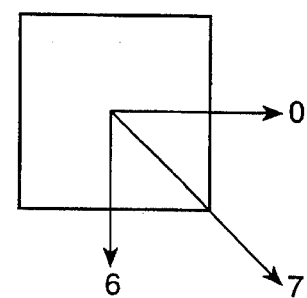
Figure 52C:
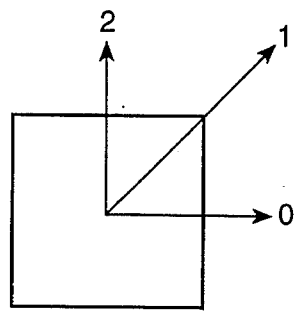
Figure 52D:
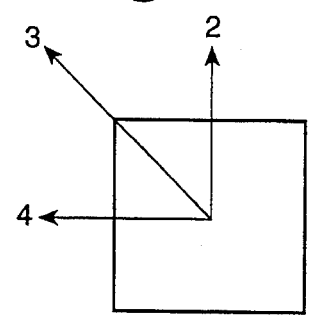

FIG. 50 shows a configuration that has concavities A, B, C, D, E and a horizontal rectangle R which circumscribe this configuration. The border pixels of this configuration will be divided into four quadrant by this horizontal rectangle R. In FIG. 50, the border pixels facing to the apex upper left of the horizontal rectangle is designated as quadrant I, the border pixels facing to the apex lower left of the horizontal rectangle is designated as quadrant II, the border pixels facing to the apex lower right of the horizontal rectangle is designated as quadrant III, the border pixels facing to the apex upper right of the horizontal rectangle is designated as quadrant IV.

These quadrants are powerful information in finding concavities. Using the information in these quadrants as shown in FIG. 51, a table is made that has the border pixels arranged in the order of chain codes shown in FIG. 51. This table contains information whether or not the border pixels are points on envelope curve (In FIG. 51, ○ represents points on envelope curve and X are not points on envelope curve.) and information of the coordinate X, the coordinate Y and chain codes.

FIGS. 52 from (*a*) to (*d*) show relationship between each quadrants and chain codes. FIGS. 52(*a*) shows chain code that pixel not in concavity may have in quadrant I. FIGS. 52(*b*) shows chain code that a pixel not in concavity may have in quadrant II. FIGS. 52(*c*) shows chain code that pixel not in concavity may have in quadrant III. FIGS. 52 (*d*) shows chain code that pixel not in concavity may have in quadrant IV.

In other word, in quadrant I, when chain code has number other than 4 to 6, the existence of concavity can be defined. In quadrant II, when chain code has number other than 6 to 0, the existence of concavity can be defined. In quadrant III, when chain code has number other than 0 to 2, the existence of concavity can be defined. In quadrant IV, when chain code has number other than 2 to 4, the existence of concavity can be defined. However there is a case in which it is difficult to judge the existence of concavities by only one chain code. In this kind of case, the processing as follows will be taken.

Figure 53:
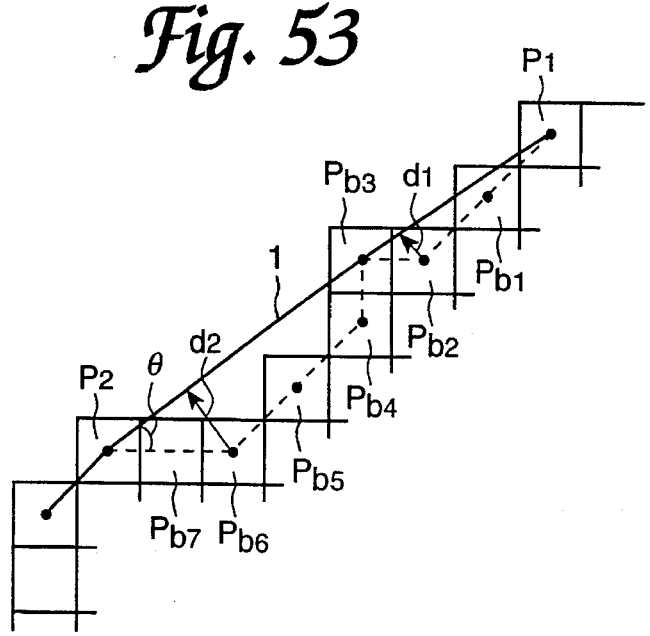
FIG. 53 shows a peripheral with a concavity.

In FIG. 53, when the adjacent points on envelope curve P1 and P2 are found, after calculation of inclination of the line L connecting the adjacent points P1 and P2 (In FIG. 53, the inclination of the line L is $5/7=0.714$, its inclination angle is $\theta=35.5$ ) the pixels are traced from one point P1 to the other point P2.

Distance d between each border pixel and the line is defined by sum of distance change given from each border pixel's chain code. In case of FIG. 53, the relationship between chain code and distance change $\Delta d$ is shown in table 1.

TABLE 1

| chain code | $\Delta d$ | |
|---|---|---|
| 4 | $-\sin\theta =$ | $-0.581$ |
| 5 | $\cos - \sin\theta =$ | $0.233$ |
| 6 | $\cos\theta =$ | $0.814$ |

In table 1, when a pixel is located below the line, the distance between the pixel and the line are defined as positive, when a pixel is located above the line, the distance between the pixel and the line are defined as negative.

The sums of distance change for the border pixels Pb1 to Pb7 between the points P1 and P2 on envelope curve in FIG. 53 are shown in table 2, when tracing border pixels from the pixel P1.

TABLE 2

| border pixel | distance |
|---|---|
| Pb1 | 0.233 |
| Pb2 | 0.466 |
| Pb3 | −0.115 |
| Pb4 | 0.699 |
| Pb5 | 0.902 |
| Pb6 | 1.135 |
| Pb7 | 0.554 |

As shown in table 2, Pb1 and Pb2 are located below the line L but since the distance d1 is 0.466 at its maximum, this is not judged as concavity. On the border pixel P6, the distance d2 finally shows 1.135 which is over 1 and this is defined as concavity.

Tracing the border pixels, number of pixels from Pb1 to Pb7 are counted. When it was not judged as concavity, the counted value is canceled. When it was judged as concavity, the counted value up to the pixel before the point P2 is defined as the inner peripheral length of a concavity and the counted value is canceled.

When the existence of concavity is defined between the points on envelope curve P1 and P2, the concavity chord length can be calculated from the coordinates X and Y of the adjacent points P1 and P2 on envelope curve. By calculating these concavity chord length, inner peripheral length of concavity and peripheral length, concavity ratio can be calculated as follows.

Concavity ratio=Inner peripheral length of concavity/(Peripheral length×Concavity chord length)

As stated above, the existence of concavity can be judged when the distance $d \geq 1$. However, considering noises of concavities, this can be alternated to an appropriate condition such as the distance $d>2$.

In processing the method above, read the table in FIG. 51 in the order and judge the existence according to the condition in the FIG. 52. The existence of concavities can be defined when the sum of the distance reaches the fixed value, with judging the condition in FIGS. 52(a)–52(d). Counting the border pixels by tracing them, inner peripheral length of concavity can be calculated at the same time. By calculation the distance between the adjacent points on envelope curve after defining the existence of concavity, value of concavity chord length can be found.

As the method for calculating concavity characteristics, a convex hull is generated once, and configurations generated by subtracting the original configuration from the convex hull are concavities. However as mentioned before, just connecting the adjacent points on envelope curve is not always sufficient find accurate convex hull.

For this strict method for making convex hull, the applicant of this patent has already applied for the Sho 62-266719.

Such a characteristics parameter of concavities indicates a distinguishing characteristics of configuration and could represent impression given to the sense of vision of organisms.

For this reason, very useful data in recognizing configuration such as characters, in which a characteristics parameter of concavities is very significant, will be given to the recognition portion 100 and enable an effective recognition processing.

According to the example performed above, precise and effective extraction of the characteristics of concavities from configurations to be processed, then characteristics parameter of concavities are input to recognition portion. That enables precise recognition processing with the smallest numbers of neurons. Moreover, since recognition portion itself has layer structure that appropriate to abstraction degree of data, so-called data entry configuration, recognition processing as hoped can be surely made with highly effective structure. By this process, highly precise configuration recognition or character recognition will be possible. For example, checking seals and management quality such as check of lacking plugs on plugging board will be made very precisely.

As explained above, through this process, image processing device that can recognize configurations at high-speed and precisely with a memory of small capacity can be produced.

Next, a neural network is explained, for performing recognition from characteristics data of configurations classified according to the distance between nearest centroids.

For example, in the microscopic image of a crystal structure of a metal, a structure has similar distances between centroids between nearest groups different from another structure. So a border of different structures can be found from the calculation of the distance between nearest centroids. The distance between nearest centroids is an effective means for classifying groups of an image. Classified image can be recognized for each group through various methods.

The image processing system according to the present embodiment comprises a means for outputting configuration data which classifies the image according to the distance between the nearest centroids calculated for each configuration element and extracts characteristics data from density coocurrence matrix of each group, and a means for recognizing a configuration consisting of neural layers with parallel neurons which output data according to a comparison between a sum of weighted input and a threshold. The latter means is connected to the former.

In a image of groups according to the distance between nearest centroids, density coocurrence matrix is calculated for each group. Characteristics data obtained from the density coocurfence matrix is inputted to a predetermined neural layer of the means for recognition so that the recognition is performed. The means has minimum number of neurons for recognition so that the configuration recognition is performed at a high speed with minimum neurons without fail.

The manner of calculation of distance between nearest centroids in the image processing portion 300 is described hereinafter.

In FIG. 54, centroids are calculated for a plurality of configuration elements from No.1 to No.6, which are shown by crosses. An image with index on the position of centroid is generated as shown in FIG. 55. 1st state moment and area are calculated in the converting portion 313 for calculating centroids. The image is stored on a frame memory, then the image is read in the raster order at a high speed. The x and y coordinates of indexes are written in a table in the order of detection, that is, the order of rasters. The table is storaged in the static RAM of the converting portion 313.

Table is generated as shown in FIG. 56, the combinations of x and y coordinates are registered in serial. As shown in FIG. 54 and 55, the origin is positioned on the upper left corner of the image and y and x directions are defined as vertical and horizontal directions of the image, respectively. The y coordinate in the table monotonously increases and x coordinate monotonously increases for one y coordinate.

The distance between nearest centroids can be defined for each element, distances are calculated from one element( reference element, hereinafter) to elements, from nearest one in the table to more remote one, successively.

As show in FIG. 57, when a configuration is the reference element with coordinate of centroid (xk, yk), distances from the centroid to the others are examined in the order of increment or decrement. Here, the examination is performed in the order of increment.

The distance dk,k+1 from the centroid of the reference element to the next one is calculated, as follows.

$$(d2k,k+1)=(xk-xk+1)^2+(yk-yk+1)^2 \qquad (a)$$

Then, the following elements are examined. When the following condition is satisfied, $$xk>=xk+1>=xk+2 \qquad (b)$$

$$xk<=xk+1<=xk+2 \qquad (c)$$

the distances dk,k+1 and dk,k+2 have the following relationship.

$$dk,k+1<=dk, k+2$$

The calculation of dk,k+2 can be omitted because it cannot be smaller than dk,k+1. Then the next element is examined. Since the complex calculation of distance can be omitted, the process efficiency is much improved.

When the condition(b) and (C) are not satisfied, dk,k+2 is calculated so that the smaller among dk,k+1 and dk,k+2 is registered.

Thereafter, the judgment of(b) and (c) and necessary distance calculation are performed and a registered distance is substituted by a smaller one, for (xk+3, yk+3), (xk+4, yk+4) etc.

The examination in the order of decrement is started after the completion of incremental examination. The condition formula is rewritten for the decremental examination, as follows.

$$xk >= xk-1 >= xk-2 \quad (d)$$

$$xk <= xk-1 <= xk-2 \quad (e)$$

At the beginning of the examination of decrement order, the minimal distance obtained in the incremental examination is defined as reference distance. And the following formula is evaluated.

$$dk,\ k-1 >= du,\ min$$

When the formula is satisfied and the condition (d) and (e) are not satisfied, the smaller among the newly calculated distance and du,min is advanced for examination.

The examination of increment to decrement can be reversed.

When the number of configuration elements is N, much fewer times of calculation than (N–1) is performed for one element. The (N–1) times process is only the evaluation of the condition formula.

The number of calculation times is much smaller than the conventional method, the difference of process times becomes bigger between the present invention and the conventional method, as the number of configuration elements increases.

The direction of x and y coordinate can be changed, and the the order of data in the table can be changed as far as the data are arranged in the raster order.

In an analysis of a crystal structure of a metal, it will be found that the distances between nearest centroids are similar for configuration elements within the same metal system. A histogram can be made with horizontal axis of distance between nearest centroids and a vertical axis of number of elements with the same distance. Each crystal system forms different peak in the histogram. So the classification of crystal systems or configurations can be performed. For each group, density coocurrence matrix can be calculated, the contrast, correlation and other data can be calculated.

Texture characteristics is compressed data with high degree representing density distribution of a total image, so organic visual system can be modellized. The texture data enables the recognition portion 100 to perform efficient recognition. Since the classification according to distance between nearest centroids is performed for an image with a plurality of distribution of density patterns, precise calculation of characteristics value is performed. Abstraction data preferable for a neural network is given to the neural network. If a characteristics data is calculated for the total image, characteristics for each pattern are indefinite. The characteristics data for a combination of a plurality of groups cannot be obtained.

In the present embodiment, the image is classified according to the distance between nearest centroids in the image processing portion 300. The density coocurrence matrix is calculated for the data of each group. The characteristics data of the density coocurrence matrix is calculated. Data obtained from density coocurrence matrix are contrast x1, second moment x2, correlation x3, mean value of peripheral distribution in the m-direction, mean value of peripheral distribution in the n-direction, variance in the m-direction, variance in the n-direction, which are higher in the abstraction degree than a pixel data. These data are inputted to one of following neural layers to the 1st layer, when pixel data is defined as "0" degree data to be inputted to the 1st layer.

As mentioned above, the present embodiment enables precise recognition with minimal number of neurons, because groups of an image is classified in high speed and characteristics value is extracted for each group in high speed so that the extracted value is inputted to the recognition portion. The recognition portion has layer construction as well as input construction responsive to the abstraction degree of data, so the expected recognition processing is performed without fail. The recognition processing of high degree can be performed of a configuration. Crystal construction of a metal system, weather data, data of remote sensing, marine data and other data can precisely analyzed.

According to the present embodiment, an image processing system for image recognition with high speed and a little capacity of memory ca be provided.

Hereinafter, a data processing system for recognizing acoustic data is described according to drawings.

The conventional acoustic recognition system according DP-matching method is the most practical, which has obtained recognition ratio of 85% in average for vowel and consonant, according to a report.

In DP-matching, characteristics of frequency and power are extracted to be compared with a reference acoustic pattern for pattern matching. The matching rule should be artificially determined for the pattern matching. The rule is prepared based on sampling data, it causes a limit of application range.

The acoustic recognition system according to the present invention comprises an input portion for generating a digital data pattern corresponding to input acoustic data, a characteristics processing portion for extracting characteristics from the digital data pattern and a recognition portion consisting of neural layers corresponding to abstraction degree of input data each of which has parallel neurons for outputting data according to comparison of sum of weighted input and a threshold, for recognizing mainly by means of neural network.

Data is extracted by characteristics extraction portion for representing characteristics of input phoneme, and inputted to neurons of a neural layer so that acoustic recognition is performed. The acoustic recognition is performed through processing characteristics data of phoneme by means of neural network, recognition ratio is improved by the learning and association functions of the neural network.

In FIG. 1, acoustic recognition system consists of input portion 200 for generating digital pattern corresponding to input phoneme, a characteristics processing portion 300, recognition portion 100 and a system memory 400, all of which are connected through system bus B with one another as well as with a CPU 500. Input portion 200 includes input device such as a microphone and an I/O, the I/O includes a data compression means and a memory for storing data etc. if necessary. Characteristics processing portion 300 has processing portion 310 and a memory 330 for holding the digital data pattern generated by the input portion 200. The portion 300 may include input portion 340 therein if necessary. The recognition portion 100 performs acoustic recognition from the data extracted in the portion 300. The portion 100 consists of a plurality of neural layers and a memory for holding data outputted from the neural layer.

FIG. 2 shows the processing portion 310 in the characteristics processing portion 300. The portion 310 transmits data, selectively inputted through a multiplexer 311 from the memory 330, through a local bus LB to a serial/parallel converter 312. The converter 312 holds data by predetermined bytes, for example 10 bytes, and inputs the data parallelly to the computational portion 320. The portion 320 has numerical computational portion 321 and status computational portion 325, the output from the converter 312 by which the convolution portion in the above embodiment is inputted to the portion 321. The portion 321 consists of multiplication portion 322, selector 323, integration portion 324, connected in serial, for calculation operator processing, such as differential. As a numerical computation, power levels of inputted phoneme are multiplied by multipliers and numerically integrated. According to an experience of the inventor, the multiplication portion is positioned on the 1st stage because the same data cannot be multiplied by different multipliers. The number of kernels of multipliers is minimized equal to the number of bytes simultaneously processed. The number of gates in the following selector 323 and integration portion 324 are minimized. Therefore, the numerical computational portion has maximal functions with a little volume of circuit. The process speed is high, as well.

The characteristics processing portion has similar construction to that of an image processing system. An image data has a dimension of "2" while an acoustic data has a dimension of "1" The acoustic data is more easily processed.

The processing in the portion 310 of characteristics processing portion 300 is as follows.

(a) SEGMENTATION (a-1) Registration of logarithmic power sequence

Acoustic signal is inputted to the input portion 200 in real time so as to be converted to a logarithmic power sequence by means of an analogue circuit. The power sequence is inputted to the memory 330.

(a-2) Smoothing of power sequence

Registered acoustic signal is smoothed so that steep power down due to noises are reduced. It simplifies the following processes. Smoothed data is registered in another memory than a memory holding the original data. The smoothing is performed in the process portion 310 in the characteristics portion. Acoustic data in a predetermined time interval is multiplied by "1" in the multiplication portion 322, then a mean value thereof is calculated in the integration portion 324. The calculation is performed by the function of addition and subtraction in the integration portion.

(a-3) Detection of concavities in the power sequence

The inventor of the present invention filed patent applications concerning convex hull and concavities detection. The applications are published as Sho 63-268078 and Sho 63-271584 in Japan. According to the inventions, the peripheral of a configuration is explained by direction code and the convex hull is obtained according to an inclination from a candidate of point on convex hull toward a border pixel. The concavities are detected by evaluating a distance between a theoretical line connecting adjacent two points on convex hull and border pixels. The distance is calculated by the direction code. Since the power is smoothed, a concavity with a depth deeper than a predetermined depth can be defined as a significant concavity.

(a-4) Detection of middle point of a chord of concavity

In order to detect a segment between adjacent phonemes clearly, a middle point of a chord of concavity is detected. The middle point is deemed to be the segment. The processing of (a-3) and (a-4) are executed in MPU.

(a-5) The power sequence is segmented at the middle point. The segmentation is performed by writing an index point in the original data.

(b) FREQUENCY ANALYSIS (b-1) Generating histogram of logarithmic power sequence Acoustic signal usually includes phoneme signal together with background noises. The phoneme signal should be extracted for the frequency analysis. The background noises have lower amplitude than the phoneme signal, so the phoneme signal can be extracted by a thresholding by the optimal threshold. Thresholding by optimal threshold is performed through "mode method" or "discrimination analysis method" similar to an image processing.

In this embodiment, "mode method" is applied.

The histogram is registered in the high speed memory of the converting portion 313 in the characteristics processing portion 300.

(b-2) Calculating optimal threshold

The inventor of the present invention filed a patent application concerning "mode method". The application is published as Hei 1-259465.

According to the published invention, number of pixels of each density is registered in the order of the number of pixels. In the acoustic recognition, numbers of power levels are registered in the order of the numbers. In a table of the registered data, the optimal threshold is calculated according to the following formula.

$$(Na-Nb) \times (Nc-Nb)$$

The evaluation of the formula is performed in the MPU.

(b-3) Binarization of power sequence

The original power sequence is binarized by the optimal threshold. The binarization is performed in the converting portion as a converting table.

(b-4) Integration of binarized power sequence

Binarized power sequence is integrated with respect to time. Therefore, an integration value at a time T1 is the integration value of binarized power from time "0" to "T1".

The integration is performed in the converting portion 313 of the characteristics processing portion. The light computational portion is used as an adder. Value held in the high speed memory is added to a new power level, then registered in the high speed memory again.

Integration value on each time is also registered in the memory 330.

(b-5) Differential of integrated power level

Integration value registered in the memory 330 is differentiated so that frequency on each time is obtained. The differentiation is performed by means of the serial/parallel converter 312 and computational portion 321. Power data in a predetermined time distance is registered once, then the multiplication portion 322 multiplies this data by a predetermined multiplier so as to differentiate it. The integration portion performs mainly division so as to obtain the final differentiated value. The value of differentiation is frequency on each time, that is registered in other memory than that for the original data.

(b-6) Input of differentiation value to recognition portion

Frequency data, that is, differentiation value is inputted from the memory 330 through the local bus LB to the recognition portion 100, by each word according to the above segmentation.

The data is inputted to a neural layer corresponding to the abstraction degree of frequency data.

As mentioned above, data processing system according to the present invention has advantages that expected recognition is executed without fail with minimal number of neurons.

What is claimed is:

1. A method for processing data including the steps of:

inputting a plurality of input data to be processed, each input data having an associated abstraction degree;

forming a neural network, a number of processing layers within said neural network corresponding to a number of different abstraction degrees associated with said input data;

generating an output from said neural network corresponding to said input data using said neural network; and determining a pattern of features of said input data corresponding to said output generated from said neural network.

2. A method for processing data according to the method of claim 1, wherein the number of processing layers within said neural network is increased with an increase in a number of different abstraction degrees associated with said input data.

3. A method for processing data according to the method of claim 1, wherein the number of processing layers within said neural network is increased proportionately with an increase in a number of different abstraction degrees associated with said input data.

4. A method for processing data including the steps of:

inputting a plurality of input data to be processed, each input data having an associated abstraction degree;

forming a neural network having a number of processing layers equal to a number of different abstraction degrees associated with said input data;

generating an output from said neural network corresponding to said input data; and determining a pattern of features of said input data corresponding to said output generated from said neural network.

5. A method for processing data including the steps of:

inputting a plurality of input data to be processed, each input data having an associated abstraction degree;

forming a neural network having a number of processing layers equal to a number of different abstraction degrees associated with said input data, whereby input data having a same abstraction degree are input to one of said processing layers;

generating an output from said neural network corresponding to said input data; and determining a pattern of features of said input data corresponding to said output generated from said neural network.

6. A method of processing as recited in claim 5, whereby at least one group of input data characterized with a same abstraction degree is input to each processing layer in said neural network.

7. A method for processing data including the steps of:

inputting a plurality of input data to be processed, each input data having an associated abstraction degree;

forming a neural network having a number of processing layers equal to a number of different abstraction degrees associated with said input data, where all input data having a lowest abstraction degree are input to a first processing layer, and where input data respectively input to each subsequent processing layer in said network increases sequentially in abstraction degree;

generating an output from said neural network corresponding to said input data; and determining a pattern of features of said input data corresponding to said output generated from said neural network.

8. A method for processing data including the steps of:

inputting a plurality of input data to be processed, each input data having an associated abstraction degree;

forming a neural network, a number of processing layers within said neural network being related to a number of different abstraction degrees associated with said input data;

generating an output from said neural network corresponding to said input data using said neural network; and determining a pattern of features of said input data corresponding to said output generated from said neural network.

9. A method for processing data including the steps of:

inputting a plurality of input data to be processed, each input data having an associated abstraction degree;

forming a neural network, wherein a relationship exists between a number of processing layers within said neural network and a number of different abstraction degrees associated with said input data;

generating an output from said neural network corresponding to said input data using said neural network; and determining a pattern of features of said input data corresponding to said output generated from said neural network.

* * * * *